United States Patent
Blalock et al.

(10) Patent No.: US 11,061,978 B1
(45) Date of Patent: Jul. 13, 2021

(54) AUTOMATIC FINDING OF ONLINE PROFILES OF AN ENTITY LOCATION

(71) Applicant: Reputation.com, Inc., Redwood City, CA (US)

(72) Inventors: Tyler William Blalock, Santa Clara, CA (US); Manish Balsara, Foster City, CA (US); Shrey A. Bhatia, Los Altos, CA (US)

(73) Assignee: Reputation.com, Inc., Redwood City, CA (US)

(*) Notice: Subject to any disclaimer, the term of this patent is extended or adjusted under 35 U.S.C. 154(b) by 35 days.

(21) Appl. No.: 16/525,216

(22) Filed: Jul. 29, 2019

Related U.S. Application Data

(63) Continuation of application No. 15/197,642, filed on Jun. 29, 2016, now Pat. No. 10,430,478.

(60) Provisional application No. 62/247,402, filed on Oct. 28, 2015, provisional application No. 62/249,154, filed on Oct. 30, 2015, provisional application No. 62/247,403, filed on Oct. 28, 2015, provisional application No. 62/249,155, filed on Oct. 30, 2015.

(51) Int. Cl.
  *G06F 16/9535* (2019.01)
  *G06F 16/955* (2019.01)

(52) U.S. Cl.
  CPC ...... *G06F 16/9535* (2019.01); *G06F 16/9566* (2019.01)

(58) Field of Classification Search
  None
  See application file for complete search history.

(56) References Cited

U.S. PATENT DOCUMENTS

| | | | |
|---|---|---|---|
| 6,611,835 B1* | 8/2003 | Huang | G06F 16/951 |
| 2002/0085025 A1* | 7/2002 | Busis | G06Q 30/06 |
| | | | 715/738 |
| 2003/0158953 A1* | 8/2003 | Lal | H04L 29/06 |
| | | | 709/230 |
| 2003/0200192 A1 | 10/2003 | Bell | |
| 2005/0149507 A1 | 7/2005 | Nye | |
| 2008/0263193 A1* | 10/2008 | Chalemin | H04L 67/02 |
| | | | 709/224 |
| 2009/0012853 A1* | 1/2009 | Nolet | G06Q 30/0273 |
| | | | 705/14.47 |
| 2009/0119268 A1 | 5/2009 | Bandaru | |

(Continued)

*Primary Examiner* — Uyen T Le
(74) *Attorney, Agent, or Firm* — Van Pelt, Yi & James LLP

(57) ABSTRACT

Automatic finding of online profiles of an entity location is disclosed. Reference location data for location attributes of an entity location are obtained. A search for a profile of the entity location on a source is performed using at least some of the obtained reference location data. One or more search results are obtained. A search result includes a Uniform Resource Locator (URL) and corresponding search result location data. The search result is evaluated. Evaluating the search result includes normalizing the search result location data included with the search result and comparing the normalized search result location data against the reference location data. Based at least in part on the evaluation, it is determined whether the search result matches to a profile of the entity location on the source. In the event that the search result matches to a profile of the entity location on the source, the search result is provided as output.

15 Claims, 27 Drawing Sheets

(56) References Cited

U.S. PATENT DOCUMENTS

| | | |
|---|---|---|
| 2011/0087966 A1* | 4/2011 | Leviathan ............ G06F 16/9577 |
| | | 715/745 |
| 2012/0150846 A1 | 6/2012 | Suresh |
| 2012/0151323 A1* | 6/2012 | Szalai ..................... H04L 67/02 |
| | | 715/234 |
| 2012/0259832 A1* | 10/2012 | Walker ................ G06F 16/9566 |
| | | 707/709 |
| 2014/0059043 A1 | 2/2014 | Sundara |
| 2014/0229462 A1 | 8/2014 | Lo |
| 2015/0012501 A1 | 1/2015 | Xing |
| 2017/0235713 A1 | 8/2017 | Martensson |

* cited by examiner

| Locations | Sources | | | | | |
|---|---|---|---|---|---|---|
| Locations with Complete Profiles 697/697 | | Locations Mostly Correct 606 681 (98%) | | | Locations Incorrect 608 16 (2%) | |
| Import ▶ | Export ▶ | 604 | | | Search | |
| Location — 602 | Address | % Correct ▲ | Last Audited | Incomplete Profile | Opted Out | |
| Clarence Holt MD | 200 Oak Blvd. View,... | 89% | Oct 20, 2015 | | ☐ | |
| Natasha Goff MD | 300 Snow Ave. Ste 2, S... | 89% | Oct 20, 2015 | | ☐ | |
| Dan Kyle MD | 400 School Peak Ln., La... | 88% | Oct 20, 2015 | | ☐ | |
| Karina Love MD | 300 Snow Ave. Ste 2, S... | 88% | Oct 20, 2015 | | ☐ | |
| Steven Boming MD | 400 School Peak Ln., La... | 88% | Oct 20, 2015 | | ☐ | |
| Emily Boyenga MD | 300 Snow Ave. Ste 2, S... | 88% | Oct 20, 2015 | | ☐ | |
| Mitchell Gaspar MD | 400 School Peak Ln., La... | 89% | Oct 20, 2015 | | ☐ | |

FIG. 6A

| Locations > Clarence Holt MD<br>200 Oak Blvd. View, CA 91234-7890 US<br>View Location Profile Data last updated: | | 89% ~636<br>Correct | 18 ~640<br>Listings Mostly Correct | 2 ~642<br>Listings Incorrect<br>638 |
|---|---|---|---|---|
| Source ~632 | % Correct ~634 | | Last Audited | Opted Out |
| Rank Health ⧉ | 75% ▭ | | Oct 20, 2015 | ☐ |
| Signs ⧉ | 75% ▭ | | Oct 20, 2015 | ☐ |
| Reviews123 Local ⧉ | 90% ▭ | | Oct 20, 2015 | ☐ |
| Compare! ⧉ | 50% ▭ | | Oct 19, 2015 | ☐ |
| Healthness ⧉ | 78% ▭ | | Oct 20, 2015 | ☐ |
| A-Revs Local ⧉ | 95% ▭ | | Oct 19, 2015 | ☐ |
| Best Docs ⧉ | 50% ▭ | | Oct 19, 2015 | ☐ |
| NetDocs ⧉ | 75% ▭ | | Oct 19, 2015 | ☐ |
| Premier Business Listings ⧉ | 100% ▭ | | Oct 19, 2015 | ☐ |
| Small Biz Search ⧉ | 100% ▭ | | Oct 19, 2015 | ☐ |

FIG. 6B

| Rank Health | 75% Correct | ✕ |
|---|---|---|
| | 🔒 Correct Data: | Rank Health Listing: 664 |
| Name | Clarence Holt MD | ✓ Correct Dr. Clarence Holt, MD » Revert<br>We have Smart Matched your business<br>name. Click Revert to mark as incorrect. |
| Address | 200 Oak Blvd. View, CA 91234-7890 US | ✓ Correct |
| Phone | (555) 123-4567 | ✓ Correct |
| Website | http://doctors.uni.edu/details/12345 | ⓘ Missing — Accept  662 |
| Long Description | Dr. Clarence Holt specializes in Primary Care at View – Oak Blvd. This is one of many locations, please check doctors.uni.edu for more information and locations | ⓘ Missing   Accept |
| Business Hours | | ✓ Correct |
| Categories | Family Medicine<br>Internal Medicine | ⓘ Internal Medicine   Accept |

FIG. 6C

| | Locations with Complete Profiles<br>697 /697 ⓘ | Locations Mostly Correct<br>681 (98%) ⓘ — 702 | Locations Incorrect<br>16 (2%) ⓘ — 704 |
|---|---|---|---|
| | Locations \| Sources \| [Import ▶] [Export ▶] | 706 | 708 |
| Source | | Listings Mostly Correct | Listings Incorrect |
| Rank Health | | 76 | 621 |
| Signs | | 84 | 613 |
| Reviews123 Local | | 697 | 0 |
| Compare! | | 10 | 687 |
| Healthness | | 4 | 693 |
| A-Revs Local | | 696 | 1 |
| Online Omnipotence | | 697 | 0 |

FIG. 7A

| Sources » Rank Health | | 722  Q Search | |
|---|---|---|---|
| Location | Address | %Correct ▲ | Last Audited |
| Terrence Storm MD ↗ | 1000 Uni Peak Ln, City1, CA... | 100% | Oct 19, 2015 |
| Greg Baggins DO ↗ | 2000 Place Ave. Ste 2, City2,... | 80% | Oct 19, 2015 |
| Tess Horm MD ↗ | 3000 Loc Blvd, City3, CA... | 80% | Oct 20, 2015 |
| Thompson Duke MD ↗ | 4000 View Table St. Ste 3, City4,... | 80% | Oct 19, 2015 |
| Maximus Kaspar MD, PhD ↗ | 5000 Nice Road Rd, City5, CA... | 80% | Oct 19, 2015 |
| David Lang MD ↗ | 5000 Nice Road Rd, City5, CA... | 80% | Oct 19, 2015 |
| Shawna Lin MD ↗ | 5000 Nice Road Rd, City5, CA... | 80% | Oct 20, 2015 |
| Esmerelda Havish MD ↗ | 4000 View Table St. Ste 3, City4,... | 80% | Oct 20, 2015 |
| Selma Ark MD, MS ↗ | 6000 Orchard Dr, City6, CA... | 80% | Oct 19, 2015 |
| Tyler Ings MD ↗ | 5000 Nice Road Rd, City5, CA... | 80% | Oct 20, 2015 |
| Ace Kaplan MD ↗ | 2000 Place Ave. Ste 2, City2,... | 80% | Oct 20, 2015 |

FIG. 7B

Super Bakery

Please update your Location Profile. Once you have completed filling out your Location Profile, click Submit
☐ I choose to opt out of the Business Listing Program.

Basic Listing Information

Name*: Super Bakery

Address*: United States
123 Stockton Avenue
Address Line 2
San Joes | California | 95123-4567

Phone*: Value is required

Website*: http://www.superbakery.com

Additional Information

Phone - Mobile

Phone - Alternative

Fax

FIG. 9A

| Email | |
| Short Description | Super Bakery's Authentic Entremets Company has increased the range and variety of entremets available, including thinner entremets with more layers, with future plans to include oversize entremets with over 30 layers, plus we are open to our customers' suggestions and feedback. |
| Long Description | |

Social Media

| Facebook Link | https://www.youface.com/SuperBakery |
| Twitter Link | |
| YouTube Link | |
| Pinterest Link | |
| LinkedIn Link | |

FIG. 9B

Hours of Operation

Business Hours [Type]

| | | | |
|---|---|---|---|
| Mon | [Open ▾] | [8:00 AM] to [7:00 PM] × |
| | | Add | |
| Tue | [Open ▾] | [8:00 AM] to [7:00 PM] |
| | | Add | |
| Wed | [Open ▾] | [8:00 AM] to [7:00 PM] |
| | | Add | |
| Thu | [Open ▾] | [8:00 AM] to [7:00 PM] |
| | | Add | |
| Fri | [Open ▾] | [8:00 AM] to [7:00 PM] |
| | | Add | |
| Sat | [Open ▾] | [8:00 AM] to [7:00 PM] |
| | | Add | |
| Sun | [Closed ▾] | |
| Add | | | |

FIG. 9C

Categories

Categories [Bakeries ×] [×]

Add

Accepted Payment Methods

Payment Types [Cash ×] [Credit Card ×]

Add

[Submit]

FIG. 9D

| location code | Errors | opted out | business name | first name | middle Name | Last Name | npi | title | country | postal code | latitude |
|---|---|---|---|---|---|---|---|---|---|---|---|
| 5 | WEB_URL, PHONE_MAIN | N | KoopaTest | | | | | | US | 21234-3421 | 49.1588 |
| 5h | WEB_URL, PHONE_MAIN | N | 5 | | | | | | US | 5 | 47.7896635 |
| 7 | WEB_URL, PHONE_MAIN | N | 7 | | | | | | US | 98765 | 73.1665673 |
| BCM | WEB_URL, PHONE_MAIN | N | Beta Motors | | | | | | US | 1234 | 83.6870794 |
| BR | | Y | Bakery-Rave | Bakery | | Robins | 1851584700 | MD | US | 94123-1234 | 27.79644 |
| CSF | | N | Cooptown Food | | | | | | US | 95123-4321 | 77.31237 |
| CSFC | WEB_URL | Y | Cooptown Food | | | | | | US | 95123-4321 | 77.31237 |
| FJH | WEB_URL, PHONE_MAIN | N | Arrow Cars | | | | | | US | 68990-2468 | 51.90184 |
| JTM | | N | Pizza Party | | | | | | US | 95123-3456 | 17.32276 |
| KPS | | Y | Potato Patisserie | | | | | | US | 94123-4321 | 17.75239 |
| MBS | | N | Acme Art | | | | | | US | 95123-1830 | 17.34121 |
| MLN | FIRST_NAME, TITLES, NPI | N | Milhouse Bakery | | | / | | | US | 95987-2326 | 17.25533 |
| OAP | | N | Foxtrot Auto Supply | | | | | | US | 95987-3328 | 17.24877 |
| PB | WEB_URL, PHONE_MAIN | N | Peter Piper Bakery | | | | | | US | 95123-2901 | 17.36585 |
| SB | WEB_URL, PHONE_MAIN | N | Super Bakery | | | | | | US | 95123-2433 | 17.34049 |
| SPB | WEB_URL, PHONE_MAIN | N | Sour Patch Bakery | | | | | | US | 95123-2425 | 17.35035 |
| ST | | N | Orchid Taste | | | | | | US | 94098-6112 | 17.37691 |
| TCL | WEB_URL, PHONE_MAIN | N | testloc | | | | | | US | 1 | 4.5808827 |
| TLC | WEB_URL, PHONE_MAIN | N | Test Location Now | | | | | | US | 34567 | 61.4367034 |
| TV | WEB_URL, PHONE_MAIN | Y | Yotoba Valley | | | | | | US | 98765 | 79.9257202 |

FIG. 10A

| address line 1 | address line 2 | longitude | locality | region | phone-main | phone-mobile | phone-alternative | fax | email | web |
|---|---|---|---|---|---|---|---|---|---|---|
| 5 5th Ave SW | | -86.63042 | Glen Garry | MD | | | | | | |
| 5 | 5 | -129.2604047 | 5 | AL | | | | | | |
| 7 Route 7 | | -93.5370577 | Scootalusa | AL | | | | | | |
| 324 Buffett Avenue | | -73.3109285 | Dockplace | ME | | | | | | |
| 678 Charger St | | -222.40051 | San City | CA | (555) 888-7777 | | | | repex40-4365@gmail.com | http://www.bakeryrave.com |
| 1337 Rollzinger Rd | | -222.03417 | Cooptown | CA | (555) 223-3445 | | | | | http://ww.youfind.com |
| 1337 Rollzinger Rd | | -222.03417 | Cooptown | CA | (555) 223-3445 | | | | | |
| 1000 T Clark St | | -88.63147 | Chi City | IL | (555) 255-5000 | | | | | |
| 90210 Jasons Vale Blvd | | -222.0175 | Cooptown | CA | (555) 235-6789 | | | | | http://www.you |
| 3144 77th St | | -222.41444 | San City | CA | (555) 567-1234 | | | | | http://www.you |
| 808 N Tylor St | | -221.91278 | San Joes | CA | (555) 789-1234 | | | | | |
| 4665 Geolong Ave | | -221.89816 | San Joes | CA | (555) 654-1234 | | | | | http://www.h.com |
| 5678 Schnell Blvd | | -222.83014 | San Joes | CA | | | | | | http://www.test.com |
| 3210 Ale Rum Ave | | -221.82777 | San Joes | CA | | | | | | http://www.g.co |
| 123 Stockton Ave | | -221.91309 | San Joes | CA | | | | | | |
| 2100 Ale Rum Ave | | -221.86048 | San Joes | CA | | | | | | |
| 1724 Murphy Law Ave | | -242.02997 | Cloudy Valley | CA | (555) 234-5678 | | | | | https://orchidtas |
| 1 | | -83.0780887 | 11 | AL | | | | | | |
| 123 Highway 123 | | -75.6315463 | Ozark | AL | | | | | | |
| 200 Car Mall Pkwy | | -93.1261579 | Vallejo | CA | | | | | | |

FIG. 10B

| description-short | description-long | facebook link | twitter link | youtube link | pinterest link | linkedin link |
|---|---|---|---|---|---|---|
| | | | | | | |
| | test text | https://www.youface.com/bakeryrave | https://chatter.com/i/streams/category/2 | https://www.tubewatch.com/channel/UCenT6cat-aQtJGOzhutCard | https://about.boardem.com/en/browser-button | https://www.biznetwork.com/pub/maxima/59/320/b |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

| hours | hours | category | category | photo | payment types | officeName |
|---|---|---|---|---|---|---|
| | | | | | | |
| 1:09:00:19:00,2:09:15:1 0:15,2:10:15:00,3:00:2:00: 00:17:00,2:18:00:19:00, 3:19:00:19:00,4:09:00:1 9:00,5:09:00:19:00,6:09: 00:19:00,5:09:00:19:00,6:09: 9:00,6:09:00:19:00,7:09:00:19:00 | 1:09:00:19:00,2:09: 00:19:00,3:09:00:1 9:00,4:09:00:19:00, 5:09:00:19:00,6:09: 00:19:00,7:09:00:19:00 | FOOD_ICE_CRE AM_&_FROZEN _YOGURT | | | | |
| | | ACTIVE_LIFE_ | ACTIVE_LIFE_ | /repdata/tenant s/4365/location s/4365_BR/kio sk/foo_123486 9848.jpeg | CREDIT_CARD | San |
| | | | | | VISA\|VISA\|CRE DIT_CARD | |
| 1:08:00:21:00,2:09:30:2 0:30,3:09:15:16:45,4:09: 00:19:00,5:09:00:19:00, 6:08:15:18:15,7:08:15: 20:30 | | | | | | |
| | | | | | | |
| 1:09:00:19:00,2:09:00:1 9:00,3:09:00:19:00,4:09 :00:19:00,5:09:00:19:00, 6:09:00:19:00,7:09:00: 19:00 | 1:09:00:19:00,2:09: 00:19:00,3:09:00:1 9:00,4:09:00:19:00, 5:09:00:19:00,6:09: 00:19:00,7:09:00:19:00 | | | | | |
| 1:09:00:17:45,2:09:30:1 9:00,3:09:00:19:00,4:09: 00:19:00,5:09:00:19:00, 6:09:00:19:00,7:09:00: 19:00 | 1:09:00:19:00,2:19: 00:19:00,3:09:00:1 9:00,4:09:00:19:00, 5:09:00:19:00,6:09: 00:19:00,7:09:00:1 9:00 | | | | | dsmlsmlsd mfl |
| | | | | | | |

FIG. 10D

AUTOMATIC FINDING OF ONLINE PROFILES OF AN ENTITY LOCATION

CROSS REFERENCE TO OTHER APPLICATIONS

This application is a continuation of co-pending U.S. patent application Ser. No. 15/197,642, entitled AUTOMATIC FINDING OF ONLINE PROFILES OF AN ENTITY LOCATION filed Jun. 29, 2016 which is incorporated herein by reference for all purposes, which claims priority to U.S. Provisional Patent Application No. 62/247,402 entitled AUTOFIND filed Oct. 28, 2015 which is incorporated herein by reference for all purposes, and claims priority to U.S. Provisional Patent Application No. 62/249,154 entitled AUTOFIND filed Oct. 30, 2015 which is incorporated herein by reference for all purposes, and claims priority to U.S. Provisional Patent Application No. 62/247,403 entitled BUSINESS LISTINGS filed Oct. 28, 2015 which is incorporated herein by reference for all purposes, and claims priority to U.S. Provisional Patent Application No. 62/249,155 entitled BUSINESS LISTINGS filed Oct. 30, 2015, which is incorporated herein by reference for all purposes.

BACKGROUND OF THE INVENTION

Businesses are increasingly concerned with their online reputations. As more review websites are created, it is becoming increasingly difficult for businesses to monitor such sites.

BRIEF DESCRIPTION OF THE DRAWINGS

Various embodiments of the invention are disclosed in the following detailed description and the accompanying drawings.

FIG. 6A illustrates an example embodiment of an all locations summary.

FIG. 6B illustrates an example embodiment of a single location summary.

FIG. 6C illustrates an example embodiment of a single location detail view.

FIG. 7A illustrates an example embodiment of a source summary view.

FIG. 7B illustrates an example embodiment of a source summary detail.

FIG. 9A illustrates an example embodiment of a user interface for obtaining location profile information.

FIG. 9B illustrates an example embodiment of a user interface for obtaining location profile information.

FIG. 9C illustrates an example embodiment of a user interface for obtaining location profile information.

FIG. 9D illustrates an example embodiment of a user interface for obtaining location profile information.

FIG. 10A illustrates an example embodiment of a portion of exported data.

FIG. 10B illustrates an example embodiment of a portion of exported data.

FIG. 10C illustrates an example embodiment of a portion of exported data.

FIG. 10D illustrates an example embodiment of a portion of exported data.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
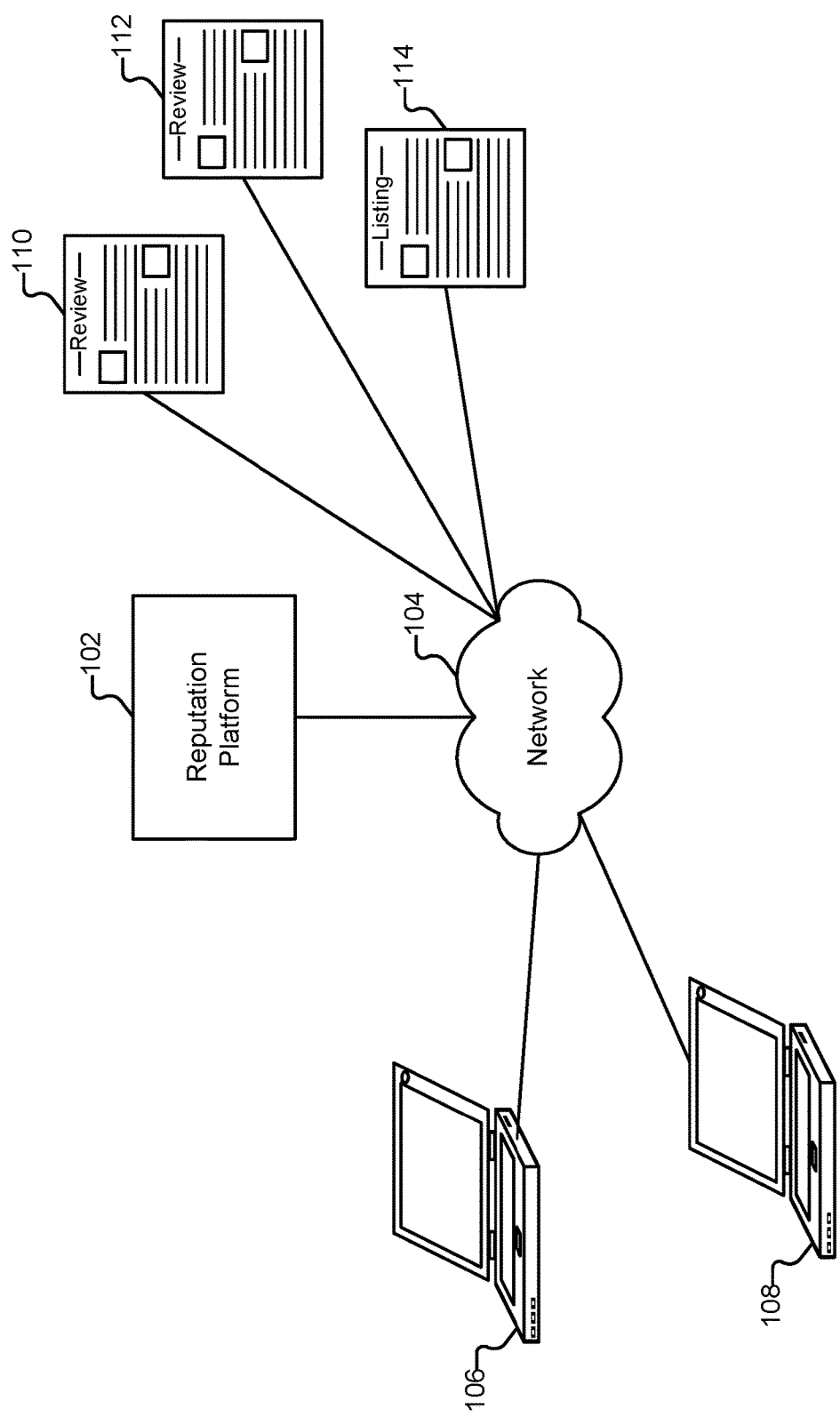
FIG. 1 illustrates an embodiment of an environment in which business reputation information is collected, analyzed, and presented.

FIG. 1 illustrates an embodiment of an environment in which business reputation information is collected, analyzed, and presented. In the example shown, the user of client device 106 (hereinafter referred to as "Bob") owns a single location pizza restaurant ("Bob's Pizza"). The user of client device 108 (hereinafter referred to as "Alice") is employed by a healthcare organization ("Acme Healthcare") with multiple locations (e.g., multiple medical facilities and doctors). As will be described in more detail below, Bob and Alice can each access the services of reputation platform 102 (via network 104) to track the reputations of their respective businesses or entities (also referred to herein as "tenants" of the reputation platform) online as well as manage the information about their businesses online. The techniques described herein can work with a variety of client devices 106-108 including, but not limited to, personal computers, tablet computers, and smartphones.

Reputation platform 102 is configured to collect reputation and other data from a variety of sources, including review websites 110-112. In some embodiments, users of platform 102, such as Alice and Bob, can also provide offline survey data to platform 102. In the examples described herein, review site 110 is a general purpose review site that allows users to post reviews regarding all types of businesses. Examples of such review sites include Google Places, Yahoo! Local, CitySearch, and Yelp. Review site 112 is a healthcare-oriented review site that allows users to find and post reviews of doctors and medical facilities. Examples of such healthcare-oriented review sites are Vitals and WebMD. Listing website 114 provides a directory/list of businesses and associated business information. One example of a listing site is Yellow Pages. Some sites may provide for both reviews of businesses and listings of businesses. Review and/or listing sites 110-114 include profiles for businesses such as Bob's Pizza and Acme Healthcare. Other examples of websites that include profiles for businesses include social networking sites such as Facebook, Twitter, Foursquare, etc. Websites that include profiles and information for businesses are also referred to herein as "sources" of business information on the web.

As will be described in further detail below, reputation platform 102 is also configured to perform autofinding of profiles for an entity, which includes searching for, identifying, and evaluating results associated with an entity.

Reputation platform 102 is also configured to provide a listing service, which is configured to audit the validity of business profile data on various review and listing sites, which will be described in further detail below.

Platform 102 is illustrated as a single logical device in FIG. 1. In various embodiments, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform the task. In some embodiments, the various components of platform 102 are implemented in a programming language such as Java.

Autofinding

Figure 2:
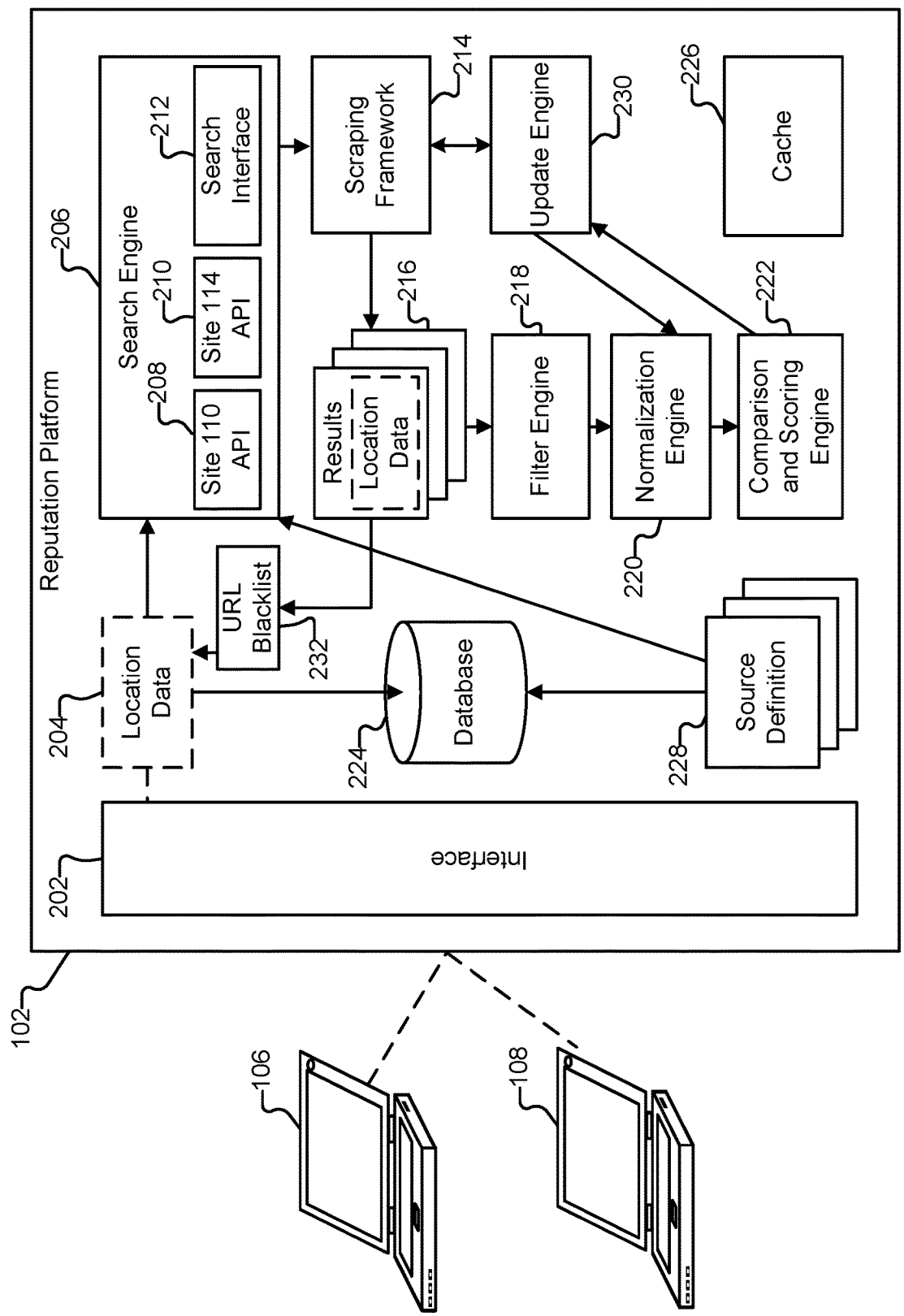
FIG. 2 illustrates an example of components included in embodiments of a reputation platform.

FIG. 2 illustrates an example of components included in embodiments of a reputation platform. In particular, FIG. 2 illustrates components of platform 102 that are used in conjunction with performing autofinding. As will be described in further detail below, performing autofinding for a business includes searching for, identifying, and evaluating URLs linking to profiles for the business on various sources.

In order to access the autofind services provided by reputation platform 102, Bob first registers for an account with the platform (a process also referred to herein as "onboarding" or account/business setup). At the outset of the process, he accesses interface 202 (e.g., a web-based interface) and provides information such as a desired username and password. He also provides payment information (if applicable).

Next, as part of the onboarding process, Bob is prompted by platform 102 to provide information for his business (also referred to herein as "reference location data" (204)), which includes the expected data values to be found on external sites or sources for various attributes of his business such as the name of his business (e.g., Bob's Pizza), a physical address of the pizza restaurant (e.g., 123 Main St., Cupertino, Calif. 95014), the phone number of the business (e.g., (408) 123-4567), website of the business (e.g., http://www.bobspizza.com), and the type/category of business that he owns (e.g., "restaurant" or "pizza"). The reference location data is stored to database 224, which, in one example embodiment, is implemented using Mongo DB. The reference location data can also be stored to cache 226 to improve speed. In one example embodiment, cache 226 is implemented as a Redis cache.

In some embodiments, the obtained reference location data is verified. For example, it is verified whether all requested attribute information for the business has been provided. If, for example, Bob forgot to provide a phone number (or reference data for any other business attribute), then he can be prompted/reminded to provide it.

The reference location data for a tenant location can be provided in a variety of ways. In one example, Bob is provided with a user interface by which he can enter reference location data into presented fields. In other embodiments, instead of manually entering reference location data, Bob can also upload (e.g., via an application programming interface (API)) the reference location data for his business to platform 102. For example, Bob can upload his restaurant's reference location data in a file such as a spreadsheet or comma separated value (CSV) file, or any other type of file, as appropriate. As another example, suppose that Acme Healthcare has 10,000 locations (medical facilities and physicians) throughout the United States. Instead of manually entering in the reference location data attributes for each location, Alice may instead elect to upload to platform 102 a spreadsheet or other file (or set of files, for example, in a batch) that includes the applicable information. Such uploading can be more efficient for tenants that have multiple locations, such as Acme Health.

As will be described in further detail below, the reference location reference data corresponding to various attributes of a business (e.g., name, phone, locality, full address, etc.) is used to find URLs that match to profiles of the business on various sources. In some embodiments, the autofinding process is controlled according to source definition 228, which includes configuration and rules for evaluating URLs for disparate sources. Further details regarding source definitions will be described below.

The reference location data provided by Bob for his pizza restaurant is provided to search engine 206, which is configured to locate, across various sources, the respective profiles on those sites pertaining to Bob's business (e.g., www.examplereviewsite.com/CA/Cupertino/BobsPizza.html), if present. Since Bob has indicated that his business is a pizza restaurant, reputation platform 102 will not attempt to locate it on site 112 (a healthcare related review site), but will attempt to locate it within sites 110 and 114. In some embodiments, Bob is provided (e.g., via a user interface) with options for indicating which sources he would like to have URLs searched for. For example, Bob can specify that he would like to find the URLs for his business's profile on Yelp, Google Places, Yellow Pages, Facebook, etc. A default set of sources searchable by platform 102 can be provided. In some embodiments, the reputation platform is associated with its own source that provides a site on which information about a business can be listed. Arbitrary external sources can be supported.

In the example shown in FIG. 2, sites 110 and 114 make available respective application programming interfaces (APIs) 208 and 210 that are usable by search engine 206 to locate business profiles on their sites. Site 112 does not have a custom site-specific search engine (also referred to herein as a "profile finder API"). In order to locate a business profile there, search engine 206 is configured to perform a site-specific search using a script that accesses a general search engine (e.g., through search interface 212).

In some embodiments, search engine 206 is configured to search/query for profiles for Bob's businesses according to predefined search strategies, which are used to generate search queries to be used on a search engine (either general or site specific). The search strategy includes a source of interest on which a profile of the entity is to be found, a combination of attributes (and corresponding reference location data values) to use in the search (e.g., name, phone number, locality, full address, etc.), and a search engine to use to perform the search. Various search engines can be used/queried, such as general search engines (e.g., Google, Bing, etc.), as well as custom search engines made for specific sites (e.g., using site-specific APIs 110 and 114). As will be described in further detail below, when searching for a profile of an entity on a source, multiple rounds or iterations of searches may be performed until a matching profile is found for an entity on a given source. For each search pass/iteration, a new search strategy can be used (e.g., with new combinations of attributes being queried and/or different search engines used).

As one example, suppose that a search is done for a profile of Bob's Pizza on the source "BestReviewSite." In this example, in a first search/query pass, a first search strategy is used that specifies that the source on which a profile is to be searched for is "BestReviewSite" (source of interest for this search), a search engine to use is the Google search engine, and the entity location attributes to be used in this first search pass are name ("Bob's Pizza") and city ("Cupertino"), where the reference or expected location data values for the attributes are those provided by Bob.

Based on this first search strategy, a query of "site:www.bestreviewsite.com 'Bob's Pizza' 'Cupertino'" is generated and submitted to the Google search engine using interface 212.

If "BestReviewSite" has its own custom site-specific search engine, then the search strategy can specify the site-specific search engine as the search engine to query (rather than the general Google search engine described in the above example). In some embodiments, search strategies can be defined in a definition for a source such that if a source for which URLs are desired has a custom site-specific search engine (which can be indicated, for example, using a flag or Boolean operator in the corresponding source definition), then the site-specific search engine is first searched, while general search engines are used as fallback options if no matching search results are found using the site-specific search engines (e.g., search strategies are predefined to prioritize searches using site-specific search engines before using general search engines). Further details regarding search strategies are described below.

In response to the Google query generated according to the first search strategy described above, a returned set of results 216 is obtained. In some embodiments, a subset of the returned results (e.g., top twenty results) is obtained. The obtained search results are also referred to herein as "candidate results," which potentially match to profiles of a business entity. An example of returned search results is described in further detail below.

Each search result includes, in various embodiments, a position, a URL, and associated profile page location data. The profile page location data in a search result may not be as much location data as could be obtained by scraping the page at the URL in the search result. For example, when performing the Google search, the top search result that is returned includes an indication of its position/rank in the returned search results (e.g., first returned result). The search result also includes a URL to a page. For example, the search result includes a URL which is potentially a link to the profile of Bob's Pizza on "BestReviewSite." The search result that is returned includes some location data associated with the page at the URL, such as a name of a restaurant. However, the page at the URL may include more location data (e.g., address, phone number, etc.) that would be available if the page were scraped. As will be described in further detail below, in some embodiments, the profile page location data included by default along with a search result is first used to determine whether the search result matches to a profile for the entity. If the search result does not match, but there is more location data associated with the search result that can be obtained (e.g., via scraping of the URL in the search result using scraping framework 214), then the additional location data for the search result is obtained (also referred to herein as a "collection result") and the match determination is performed again using the additionally obtained location data. In some embodiments, the determination of whether there is additional location data is performed using a source definition for the source of interest (where, for example, it has been determined that the URL in the search result is valid for the source of interest). For example, the source definition indicates what types of attributes are expected to be found on a profile on the source. If the attributes included along with a returned search result are less than the expected attributes on a profile for the source, then the profile page in the search result can be scraped to obtain the additional location data for those other attributes. An example of a collection result is described in further detail below. By waiting to perform scraping until after an autofinding pass using default provided location data does not yield results, scraping can potentially be avoided, reducing resources needed to obtain profile page location data from websites.

If a custom site-specific searcher is used, then it may be the case that the location data provided with a search result includes all of the location data associated with the search result. For example, if "BestReviewSite" has a custom site-specific search engine, then each of the search results returned in response to a query for Bob's Pizza will be for a profile on "BestReviewSite" and include all of the location data that is available for the profile as well (e.g., there may be no more additional location data that is obtainable via mechanisms such as scraping).

In some embodiments, filtering of search results is performed. For example, filter engine 218 is configured to filter out the URLs in search results that are not valid for the source for which a search is being performed. For example, in the above Google search, suppose that the first twenty returned search results are obtained. The URLs for the twenty search results are filtered to determine whether they are valid URLs for "BestReviewSite." For example, while some search result URLs may be links to profile pages on "BestReviewSite," other links may be to non-profile pages on "BestReviewSite", or not to pages on "BestReviewSite." In some embodiments, platform 102 is configured to distinguish between profile and non-profile pages on a source site. Those URLs directed to non-profile pages can be filtered out.

In some embodiments, the filtering is performed by evaluating the domain name portion of the URLs in search results. If the domain name of the URL does not belong to the expected domain of the source of interest, then the search result is filtered out. As one example implementation, a regular expression that specifies patterns for URLs for "BestReviewSite" is included in the source definition for "BestReviewSite." For each search result, the corresponding included URL is compared against the regular expression/URL pattern to determine whether the search result URL is a valid listing profile URL for "BestReviewSite." Those obtained search results that match the regular expression URL pattern are kept, while those that do not match are filtered out. Rules for performing filtering can be specified in a source definition, which, as described above, defines autofinding rules for each source for which profiles are to be searched.

In some embodiments, filtering is not performed for results obtained from custom site-specific search engines, as it is already known that the search results obtained from the site-specific search engine for the source are valid for the source. This reduces, for example, the computing resources used in evaluating search results.

In some embodiments, if a previous search pass has been performed (e.g., using a different search strategy) for the given request for a profile of the entity on a particular source, then the search results obtained for the current search iteration are merged with any previous search results that might exist for the same request (e.g., previous search passes for the URL of the profile of Bob's Pizza on "BestReviewSite"). Merging is described in further detail below.

Each obtained search result (e.g., that has been determined to be valid for the source of interest using filter engine 218) is then processed to determine whether a given search result is a link to a profile of Bob's Pizza on "BestReviewSite." As will be described in further detail below, determining whether the search result is the profile for the location on a given source includes comparing the page profile location data included in a search result against the reference location data obtained from Bob. In some embodiments, matching the included (or collected) page profile location data associated with a search result and the reference location data includes performing fuzzy matching. For example, for the same entity attribute, the reference location data value for the attribute and the location data value in a search result may not be exactly the same values, but nonetheless refer to the same entity. For example, suppose that Bob has provided the phone number of his business as "(408) 123-4567" while the phone number listed in a profile in a search result is "408-123-4567" (i.e., with no parentheses around area code and a dash following the area code). While the values are not an exact match, they are the same phone number, and should be considered a match. In some embodiments, fuzzy matching includes normalization of the search result location data and the reference location data and comparing the normalized data values. A match score for the search result is determined based on the comparison of the location data for attributes of the entity. For example, the score is determined based on what attributes of the entity match between the reference values provided by the entity to platform 102 and the search result location data values obtained from performing a search. In some embodiments, the search result that has the best match score that exceeds or meets a threshold score and also includes the expected attribute values for an entity (e.g., expected business name, physical address, etc.) is identified or designated as the entity's profile at the queried-for site/source.

The search result location data obtained as part of a search is normalized using normalization engine 220. Normalization engine 220 is configured to normalize location data values for attributes such as entity name, phone number, physical address, website, category of business, etc. In some embodiments, the manner in which attribute values (i.e., location data values for corresponding attributes) are normalized is specified on a per-attribute basis. For example, each type of attribute is associated with a corresponding normalizer implemented as part of normalization engine 220. For example, phone numbers are associated with their own corresponding normalization rules, while another attribute, such as name, has its own corresponding rules for how names are to be normalized. In some embodiments, the rules for the normalizers are specified on a per-source basis, as defined in a source definition. For example, different sources may categorize the same business differently, or use different terms. Different category normalization rules can be applied for different sources in order to normalize the categories to a canonical form.

As will be described in further detail below, values for an attribute are normalized in a consistent manner. Comparison of the normalized versions of the values is then performed to determine whether there is a match on the attribute. In various embodiments, the normalizers for different attributes include internal and external third party tools and/or services.

One example of an attribute normalizer is a phone number normalizer. In one example embodiment, the phone number normalizer is implemented as a Java library that is used to format phone numbers into a normalized/canonical form.

Another example of an attribute normalizer is a physical address normalizer. In one example embodiment, the physical address normalizer is implemented using a third party mapping service, such as Google Maps, where a physical address value is transmitted by platform 102 to the third party mapping service, which returns the address in a normalized format.

A name normalizer can be used to normalize names. The names that can be normalized include general business names, as well as the names of individuals (e.g., doctors, whose names are used in their profiles on various sources).

Further details regarding normalization of attribute values such as name normalization are described below.

Comparison and scoring engine 222 is configured to compare the normalized versions or values of search result location data and reference location data. Based on the attributes on which a search result matches to an entity, a score is generated for the search result. The score is then used to determine whether a search result matches to a profile of the entity. Matches can be determined for the various attributes described above, such as names, phone numbers, physical addresses, websites, etc.

For example, for each entity or location attribute for which there is a location data value included in a search result, the normalized search result location data value for the attribute is compared to the normalized reference location data value for that attribute provided by the entity. The comparison is performed to determine whether the search result matches on a given attribute or attributes. A score is then assigned to the attribute based on the comparison.

In some embodiments, different attributes are given different scores based on attribute type (i.e., scores assigned to attributes can be weighted based on attribute type). For example, suppose that if the name in a search result matches to a reference name, then a match on the name attribute has been found, and a score of half of a point is assigned to the name attribute. Similarly, a score of half of a point is assigned to the physical address if a match on the physical address attribute is found, while a phone number match is assigned ten points.

In some embodiments, a composite or overall score of the search result is generated based on the individual attribute scores (e.g., as the sum of individual attribute scores). The position of the search result in the obtained search results can also be used as a factor in determining the composite score for the search result.

An example of scoring is described as follows. As described above, in some embodiments, a search result is scored based on matches on various attributes, and a score is assigned for each attribute. Five example attributes and corresponding assigned scores are shown below:

Position in search results: 0.4/position (e.g., a position of 1 would be 0.4 points, 2 would be 0.2 points)

Name: 0.5 points if a full match, 0.4 points if a substring match (e.g., the name is not an exact match, but is almost identical)

Address: 0.5 points

Phone number: 10 points (basically guarantees a match)

Website url: 0.5 points

Provided below is an example of scoring of a URL in a search result using the above attribute scoring. In some embodiments, the score for the URL includes the numeric score for the search result and a list of the matching attributes. In some embodiments, the attributes are internally stored as numbers, an example of which is as follows:

0: Position in search results
1: Name
2: Address
3: Phone number
4: Website URL of the location In this example, the URL in the search result was given points for having a high position in search results, and for having a matching name and phone number.

{
"source": "YOUFIND_PLACES",
"url": "https://minus.youfind.com/1234567890123456789O1/about",
"rank": 10.9,
"matchingAttributes": [
1,//
0,// the url was given a score for the position in search results
3
],
"match": true,
}

The overall score for the search result is then compared against a score threshold to determine whether the search result matches to a profile for the entity on a given source. If the overall score for the search result exceeds or meets the threshold, then the search result is determined to be a match for a profile of the entity on the given source. In some embodiments, the scoring threshold is configurable. The behavior or rules for determining matches can be specified at various levels, such as at the tenant (overall business) level, at an industry level (e.g., industry specific rules that address issues that occur industry wide when attempting to determine matches), etc.

In some embodiments, custom expressions can be passed to the comparison and scoring engine 222 to fine tune or otherwise control the behavior of evaluating search results. The custom expressions can be used to configure custom changes to how scoring is performed by default. Suppose, for example, that for a multi-location business such as a supermarket chain, the phone numbers for the locations are used in scoring search results. Suppose that an administrator for the supermarket chain, when providing the reference location data used to perform the autofinding process, accidentally lists the phone number for all of the locations as the national number for the chain (where each location should have its own individual, different, phone number). When performing the autofinding process, matches may potentially be found on locations that should not match due to the incorrect phone numbers. In such a scenario, a custom expression/rule can be generated to ignore phone numbers if platform 102 has all of the locations of a business having the same phone number. For example, platform 102 can evaluate each element or attribute of location data across the multiple locations of a multi-location tenant. If a large proportion of the locations have the same phone number, addresses, website, etc., (e.g., all locations were given the address of the business headquarters, or all were given the same website URL) then the common elements or attributes of the reference location data may not be reliable in determining matching search results, and are thus ignored. This would facilitate, for example, preventing a review site URL for the location in one state being put into the location for another state, simply because the administrator of the business had provided the same 1-800 phone number for every store.

In addition to specifying conditions on which to ignore certain pieces of location data, custom expressions can be used to define custom parameters to perform any appropriate action based on some condition. As another example, a user of platform 102 can define custom parameters to detect duplicate data and ignore it. Suppose for example that Acme Health has some locations that are hospitals (facilities), and other locations that are doctors. The doctors work at the hospitals and have the same addresses and phone numbers as the hospitals. In order to prevent URLs for hospitals being put with the doctors (or vice versa), a custom parameter can be defined that specifies that in order for a search result to match a location, the names are required to match even if, for example, the score for the search result would exceed or meet a score threshold based on matches on other attributes. Thus, the custom expressions provide a mechanism by which to control the rules for determining whether a search result is a match to a profile of an entity.

As another example, chain businesses can present challenges because all locations have the same name. As one example scenario, suppose that the data provided to platform 102 includes the same phone number or website URL for each location, such that all of the locations are identical except for their physical address. For such a scenario, autofinding can be configured (e.g., using custom expressions) such that physical addresses in profiles returned in search results are required to match in order for the profile to be determined a match (regardless of whether the score for a search would have exceeded a threshold without a match on physical address), so that the individual locations can be uniquely identified.

In some embodiments, before making requests to perform autofinding, duplicate data in other locations in the same tenant is detected in platform 102. In some embodiments, if duplicate data is found, the autofinding process is configured to ignore that data. For example, if all locations in a tenant have the same address, the autofinding process will receive an indication that an address match is not sufficient to determine if a URL is a match.

One example of a custom expression that can be passed to comparison and scoring engine 222 to fine-tune scoring and match determination is a logical expression using Boolean operators such as the following: "ADDRESS||(PHONE && WEB_URL)."

In some embodiments, if the search result's corresponding overall score does not exceed or meet the threshold, it is determined whether the source being queried supports more location attributes than the search result currently has, and if the addition of those attributes could possibly enable the search result to pass the score threshold. For example, while a search result may include the name and business hours of a business as part of the search result, the page to which the search result points may include information for other attributes such as phone number, physical address, etc. If additional location attributes are supported by the source, then instructions are sent to update engine 230 to scrape and obtain (using scraping framework 214) the full location data from the URL associated with the search result. If the URL redirects to another URL, the result is updated with the redirected URL. The additional scraped and obtained location data is then processed using normalization engine 220 and comparison and scoring engine 222, as described above, to determine whether the search result now passes the score threshold.

Any of the obtained search results that pass the score threshold are returned as matches. If multiple search results are returned, this may indicate that there are duplicate profiles for the entity on a source. This may be undesirable, as the business's reviews are split among multiple pages. These duplicates can be provided as output in a report to users, allowing them to view the duplicate pages and decide whether to remove some of the duplicate pages. In some embodiments, the search result with the highest score that exceeds or meets the score threshold is returned.

If none of the obtained search results exceed or meet the score threshold, in some embodiments, a new iteration of the search for a profile of an entity location on a given source is performed. For example, suppose that none of the twenty search results returned from the Google search for Bob's Pizza on "BestReviewSite" using the first search strategy exceeded or met the score threshold. Another search strategy is selected from the predefined search strategy and used to generate a new query for a new search pass of the current request to find a profile of Bob's business on BestReviewSite. The search results are then evaluated as described above. The new search strategy will include a new combination of search engine, location attributes, etc. to use in generating a new search query. In some embodiments, search strategies are defined in a ruleset and iterated through until search results are found (or all pre-defined search strategies have been exhausted, as will be described in further detail below). One example of a search strategy progression is as follows: a search is performed, results of the search are merged with previous results. The results are scored. If no result scores exceed or meet a threshold, an updated search is performed with a new search strategy. The results of the new search are similarly merged and scored.

As one example search query iteration progression, suppose that in a first pass/iteration of the autofinding process, a Google search is performed using only the name of Bob's Pizza. In this first iteration, no matching results are found. The same query is then run on a different general search engine, such as Bing. If the Bing search also does not yield any results, then a new search strategy is used to generate a new query that, for example, includes a new combination of location data attributes (e.g., business name and phone number), starting again with a Google search. If the Google search again does not yield results, then a Bing search using the same query is performed. Thus, in this example, a first query is performed on all general search engines. If none of the general search engines yield matching results, then a new query (e.g., with a new combination of reference location data attributes) is constructed and performed on the various general search engines. The search iterations continue until a matching search result URL is found. Multiple iterations/passes of queries can also be performed for those sources that have profile finder APIs. For example, different queries with different combinations of tenant-provided reference location data (where the tenant is a customer or user of platform 102) can be submitted via the API until a matching profile is found. As described above, search queries can be composed of different combinations of one or more elements or attributes of tenant-provided reference location data. For example, a first query can be for the name of the business, the second query for the street address of the business, the third query for the business's phone number, etc. In some cases, querying with different combinations of location data can allow for matching profile URLs to be identified even if some of the tenant-provided reference location data is incorrect. For example, if the tenant-provided reference name is incorrect, the matching profile URL for the business on various sources may still be identified by querying for a combination of phone number and physical address.

In some embodiments, when another search strategy is used, the search results which have already been previously processed (obtained from queries generated in previous query passes) are not discarded. In some embodiments, if the same search results are found via another search strategy, they are ignored unless new information associated with the search results will allow them to potentially score higher than previously.

As one example, suppose that in a first search iteration, the Google search engine was used, and a particular search result was found in the second position in the returned search results. The particular search result did not exceed or meet a score threshold. On a second pass, using a second search strategy in which the Bing search engine was used, the same particular search result (URL) was again returned, but in this iteration, was in the first position in the returned Bing search results. The new higher position has the potential to cause the score for the search result to exceed or meet the threshold. When scoring the search result, the new position is used. If the URL position had worsened, then no change to the position is considered (i.e., the highest observed position for the search result has already been used in scoring the search result). In some embodiments, the combining of information associated with the same search result across different search passes is referred to as "merging" search results into an existing set.

If all predefined search strategies have been exhausted, and no search results across any of the search iterations exceed or meet a threshold, then it is determined that no profile for the entity on the source of interest could be found.

The autofinding process described above (e.g., search, collection of search results, normalization and scoring of search result location data, etc.) is performed for each source on which a profile of an entity (or entity location) is desired to be found or identified.

Where a business has multiple locations, such as Acme Health, the business owner (or a representative of the business, such as Alice) can be prompted to loop through the autofinding process for each of the business locations. For example, Alice can provide reference or expected location data for each medical facility and physician associated with Acme Healthcare. Alice can also provide the reference or expected location data in a file (or set of files). Separate autofinding requests are then initiated for each separate location, where each request is for URLs to profiles of an individual location on one or more sources.

Automatically running an autofinding process as described above provides various improvements. For example, the tenant Acme Healthcare has thousands of locations, where each location may have pages/profiles on numerous sources. Using the autofinding process described herein, the URLs for the profiles for each of the thousands of locations on various sources can be identified automatically, reducing, for example, the number of man hours that would be required to perform a manual search for the profiles.

In some embodiments, platform 102 presents search results to Bob for verification that the located profiles correspond to his business. As one example, Bob may be shown (via interface 202) a set of URLs (included in search results) corresponding to profiles on each of the sites 110-114 where his business has been identified and asked to verify that the profiles are indeed for his business. Once confirmed by Bob, the URLs of the profiles (also referred to herein as "subscriptions") and any other appropriate data are stored in database 224. Examples of such other data include overview information appearing on the business's profile page (such as a description of the business). The confirmed URLs can also then be used to perform other types of processing. For example, reviews can be extracted from the confirmed URLs. The collected data can then be analyzed to determine a business's online reputation. For example, the average review score of a business can be determined.

In some embodiments, if no matching search results for a particular source have been found, an indication (e.g., message) is presented to Bob that no profile matching to his business on the particular source was found.

If Bob indicates that an automatically found URL is not correct, Bob can elect (via interface 202) to delete the URL. In some embodiments, the deleted URL is placed into URL blacklist 232, in order to prevent the URL from being added by the platform in a future query/autofinding request. Thus, the URL will not be presented in a dashboard if it is manually deleted.

In various embodiments, users are given the option by platform 102 to enter the specific URLs corresponding to their business profiles on review sites. For example, if Bob knows the URL of the Google Places page corresponding to his business, he can provide it to platform 102 and use of the autofinding process is omitted (or reduced) as applicable.

In some embodiments, to improve autofinding efficiency and speed, various results of the operations performed as part of the autofinding process are cached, for example, to cache 226.

As one example, there may be a substantial amount of overlap between locations within a tenant. Suppose that a tenant of the platform is a fast food chain with multiple branches in the city of San Francisco. The autofinding process is used by the tenant to identify the profile URLs for each location of the chain in San Francisco. When, for example, performing a search using a general search engine for a particular location, URLs for other locations may also be returned. For example, while a Google search may be done for the branch on Market Street, results for the Van Ness location may also be returned in the search results and evaluated by the autofinding process. Rather than discarding or ignoring the results (e.g., URLs and/or associated location data) for the Van Ness location, the information associated with the Van Ness location is cached. When a search is done later for the Van Ness location of the fast food chain, the results can be obtained directly from the cache, rather than performing a search (e.g., the cache can be accessed first to determine any matching cached search results before performing a search). Thus, although the Market Street location was the intended target of the autofinding process, information for other locations that happened to be found can also be cached for later use. This reduces the number of searches (and scraping) that need to be performed, and increases the speed of obtaining results (which can be obtained from the cache rather than having to perform a search), as previous work done for a URL can be preserved and utilized if the same URL is returned again as a result of another query.

The results of normalization can also be cached and queried. As one example, suppose that a URL for a profile of a business is obtained. The URL is scraped. An address is scraped for the URL and normalized. The normalized information is stored to the cache. During a subsequent search, the URL is encountered again. As the normalized information from the URL has already been cached, it can be used, for example, to perform a comparison, without requiring re-normalization. In the example above in which information associated with a Van Ness location of the fast food chain is obtained during a search for the Market Street location of the fast food chain, when performing a search specifically for the Van Ness location, the normalized information for the previously identified URL can be directly used to perform comparisons and scoring to determine whether the cached URL matches to the Van Ness location of the business.

Self-Healing

The URLs for an entity's or business's profiles on various review and/or listing sites may become broken over time. The URLs may not work for a variety of reasons. For example, the URLs for a business's profile may change over time. As one example, suppose that Bob's Pizza moves from one city to another, and changes addresses. A source may have pages for both addresses, for example "examplereviewsite.com/bobs_pizza-1" and "examplereviewsite.com/bobs_pizza-2." As another example, Bob may change the name of his pizza restaurant, and pages for the restaurant under both its old and new names may be listed at a source. Having multiple websites for Bob's restaurants may be undesirable for Bob, as it may cause reviews to be split across different pages, or cause visitors to visit the incorrect page for his business.

Described herein are techniques for performing self-healing to automatically fix such broken links. Using the techniques described herein, in response to detecting that URLs associated with a business are broken, the autofinding process described above can be automatically re-run to find replacements for broken URLs. The autofinding process can be automatically triggered, without requiring a user to manually initiate the process. In some embodiments, users can also manually initiate re-running of autofinding (e.g., via interface 202).

One example of detecting broken URLs is as follows. URLs for a tenant location on various sources are periodically (e.g., daily) accessed and scraped (e.g., by scraping framework 214) in order to collect reviews, business listing data, social media data, etc. from the URLs. A failure in accessing a URL can be detected based on code identifiers. For example, if a URL is accessed and a 404 error is returned in response, this error is indicative of a potential issue with the URL. The autofinding process can be run again to determine whether there is a new URL for the business on the source.

When it is detected that a URL is inaccessible and/or potentially broken, in some embodiments, it is then determined whether the URL is broken due to a problem at the source (e.g., because a review site is down) or because the URL is broken and is no longer a valid URL. Reason codes are assigned to the URL that indicate or identify the reason for why the URL is broken. The reason codes can indicate whether an entire site is down, that a page has changed, etc. Appropriate actions can be taken based on the reason codes. Reason codes can be treated as representing either recoverable or non-recoverable errors. Recoverable errors include errors that are caused by temporary or avoidable circumstances. For example, if the URL is broken because the page has changed, and not because the site is down, the scraping framework can be updated to scrape the new page. If it is determined that the entire source site is down, then no changes to platform 102 need be made (the source can be visited periodically to determine when it is online or otherwise available again). Non-recoverable errors include errors which cannot be avoided or repaired. For example, if the URL is broken because it has been modified by, or removed from, the source site, the error is non-recoverable because the URL may never be functional again.

In some embodiments, the autofinding process is re-run automatically after a threshold number of failures for a URL is detected. For example, if a 404 error is received ten days in a row, then the autofinding process is run again. Waiting a threshold number of attempts/failures allows or compensates for time for sources to make fixes (e.g., if the source is down), as well as time for general search engines to index new URLs. For example, if Yelp changes a URL, a search engine such as Google may not index the new URL until the following day.

The autofinding process can also be repeated even if no errors with URLs are detected. For example, the autofinding process can be run periodically, on a recurring basis, to determine whether there are any new URLs related to a tenant location on various sources.

In some embodiments, the broken URL may be in multiple locations in platform 102. This may be, for example, because the same location exists under many tenants. For example, suppose that an auto manufacturer and a dealership group are both tenants of platform 102. Both the auto manufacturer and the dealership group have the same dealerships as locations. However, because the location is under two different tenants, it is represented twice in platform 102, as two separate instances of the location under two different tenants, each with its own corresponding set of tenant provided location data.

In some embodiments, when it is determined that a URL is broken and should be fixed by running autofind, locations associated with the broken URL are found in platform 102. The locations can be found by querying database 224 for locations that are associated with the broken URL. For each found location, the corresponding reference location data is obtained. Separate autofind requests are then run again for each found location using the location's corresponding location data (i.e., autofind is run for every location containing or otherwise associated with that broken URL).

In some embodiments, the broken URLs are added to blacklist 232, preventing them from being added or scraped again (in case they are returned in search results). In one example embodiment, the blacklist is a list of URLs that are not to be added, and for each URL, a corresponding set of location identifiers. When URLs are returned in the autofinding process, the list is accessed to determine which locations the URL should not be added to. In some embodiments, blacklist 232 is implemented as a portion of database 224.

Other triggers may cause self-healing to be initiated and the autofinding process to be automatically re-run to replace bad URLs. Examples of events that can trigger self-healing are described below.

As one example, the self-healing process can be triggered if the user explicitly indicates or instructs that they would like to perform autofinding again (e.g., by pressing an "Autofind URLs" button on a location editing page or a tenant editing page provided in interface 202).

As another example, in some embodiments, sources are enabled on a tenant level. For example, a tenant might have a Yelp business source, which indicates that all locations for the tenant are allowed to have a Yelp URL. In some embodiments, a tenant specifies a tenant configuration which indicates what sources each location of the tenant should have profiles on. However, some of the locations in platform 102 may not have Yelp URLs. This may be because URLs could not be previously found. Thus, because it has been indicated that all the locations for the business should have Yelp URLs, the autofinding process is performed automatically for those locations that do not have Yelp URLs. For example, the locations for a tenant can be periodically evaluated to determine whether they are missing any URLs. If so, then the autofinding process can be performed. The locations can be identified, for example, by querying database 224 for all locations that should have associated URLs, but do not. For example, on a periodic basis (e.g., every week, every twenty-four hours, etc.), existing locations in the database that don't have as many URLs as they should have are identified. Autofind is then automatically performed for the locations that should have a URL for a particular source (or sources), but do not. Thus, the autofinding process can be automatically triggered to fix missing URLs.

Source Definition

As described above, the autofinding process, in some embodiments, is performed according to source definitions. In some embodiments, a source definition includes rules and information for governing how the autofinding process is performed for a given source. New sources can be added for autofinding by adding corresponding new source definitions. Platform 102 is then configured to automatically perform searches of sources according to their source definitions. In some embodiments, the source definitions are stored as documents in database 224.

Described below is an example of a source definition for a source, "YouFind Places." The following example document is implemented in JSON. Any appropriate language can be used to implement source definition documents. In some embodiments, the autofinding process uses the following example fields of a source definition:

_id: The identifier (ID) of the source autofindable: In some embodiments, this field determines if a source is supported by autofind. If a source is designated as not autofindable, then autofind is not allowed to be performed for the source. For example, a user is not provided any UI option to find URLs for a location on a source that has been designated as not autofindable. The designation can be set manually or automatically.

urls: This field contains the base domains for URLs belonging to the source. In some embodiments, the autofind process uses these domains to restrict search results. For example, to search for pizza on a search engine "YouFind," and to make sure the results are restricted to "YouFind Places" URLs, the example search query "site:minus.youfind.com pizza" would be used. In some embodiments, this field supports the configuration of different domains for different countries, an example of which is shown below. For example, for a location in the UK, the search query could be "site:minus.youfind.co.uk pizza".

urlRegexp: This is a regular expression used to determine if a URL is a valid YouFind Places review URL. In some embodiments, the autofinding process will not consider any URLs that do not match this expression (i.e., the regular expression is used as a filter, where URLs that do not match the regular expression are filtered out). Any other appropriate signature can be used to determine valid URLs.

searchable: In some embodiments, this field denotes whether or not a site-specific searcher (e.g., profile finder API) has been written or is otherwise available for this source. If so, in some embodiments, autofind will attempt the site-specific searcher before trying general-purpose search engines (e.g., search strategies that use site-specific searchers are prioritized ahead of those search strategies that use general-purpose search engines). In this example, a site-specific searcher for YouFind Places pages exists (this may not be the same as a normal YouFind search).

attributes: In some embodiments, this field lists the elements that are expected to be found on any page belonging to this source, such as the location name, phone number, etc.

An example of a source definition document for "You-Find" is described below.

Figure 3A:
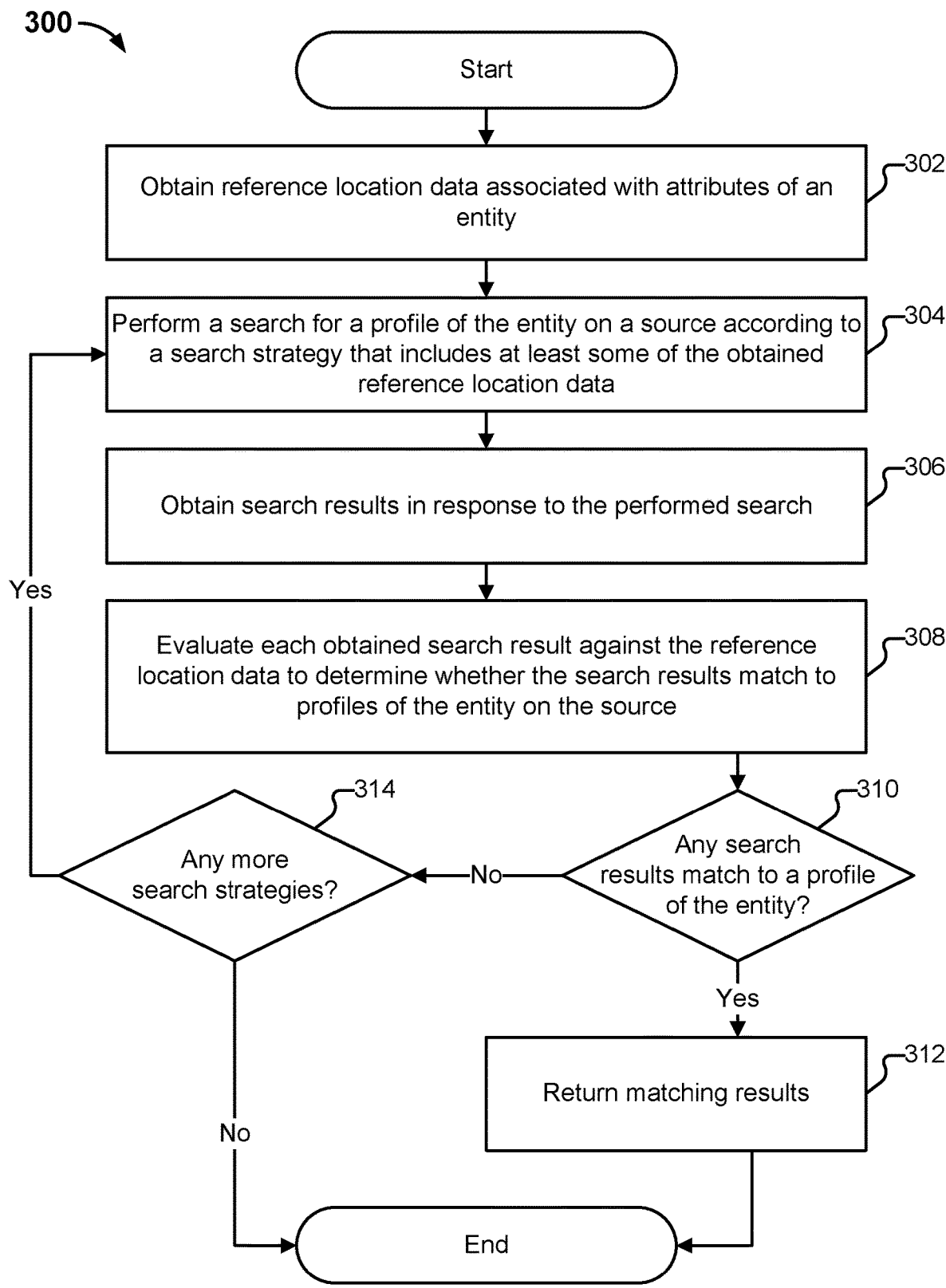
FIG. 3A is a flow diagram illustrating an embodiment of a process for automatically finding profiles of an entity on various sources.

FIG. 3A is a flow diagram illustrating an embodiment of a process for automatically finding profiles of an entity on one or more sources. In various embodiments, entities can include businesses, individuals, etc. In some embodiments, process 300 is executed by platform 102 of FIG. 2. The process begins at 302 when reference location data for attributes of the entity is obtained. The reference location data includes the tenant provided location data that is the expected or reference values for various attributes of the entity. In various embodiments, location attributes include name, physical address, website URL, phone number, etc. of an entity.

At 304, a search for a profile of the entity on a source is performed. In various embodiments, sources include external review sites, listing sites, social media sites, or any other sources that host a profile (or profiles) of the entity. In some embodiments, the search is performed according to a search strategy that includes at least some of the obtained reference location data. A particular search strategy can include a search engine to use and a combination of entity attributes to include in the search. The search engine in the search strategy can include a general purpose search engine or a site-specific searcher (e.g., profile finder API), if available. In some embodiments, the search strategy is included in a set of predefined search strategies. The predefined search strategies can be prioritized based on the order in which they should be used or attempted when generating queries to locate a profile of the entity on the source. A search query for a profile of the entity on the source is generated based on the search strategy, where the search query includes the reference location data for the attributes specified in the search strategy. The search query is submitted to the search engine specified in the search strategy.

At 306, search results are obtained in response to the search. For example, the top ten or twenty searches returned from the query of a general purpose search engine or site-specific searcher are obtained. In some embodiments, each search result includes a set of corresponding metadata, such as a position or rank of the search result among the other returned search results, a URL to a page, and location data associated with the search result. The search result location data may be less than the location data available on the page at the URL included in the search result.

In some embodiments, search results are filtered to determine whether they are valid for the source. This can include filtering the URLs included in the search results to determine whether they are valid URLs for the source. Any search results that have URLs that are not valid for the source are filtered out. In some embodiments, the filtering of URLs (and search results) is performed using regular expressions. As another example, URLs are filtered by determining whether the domain of the URL of the search result matches to the expected domain for the source.

In some embodiments, search results obtained from the current search that are the same as search results obtained in prior searches are merged with their counterpart search results from previous search iterations, as described above. For example, if the same URL is seen in results for two different queries, and new information about the URL will potentially increase the likelihood of the URL being determined a match (e.g., the URL has a higher position in the current search results as compared to the results for a previous search), then the URL is updated with the new information.

In some embodiments, a cache is accessed to determine whether there are any previously seen search results that may be relevant to the current search. If so, then the cached search result is obtained, thereby increasing the speed at which results can be obtained, and reducing the resources needed to obtain results (e.g., by performing a query and waiting for results to be returned).

In some embodiments, search results that are obtained as the result of a search are stored to a cache to increase efficiency.

Figure 3B:
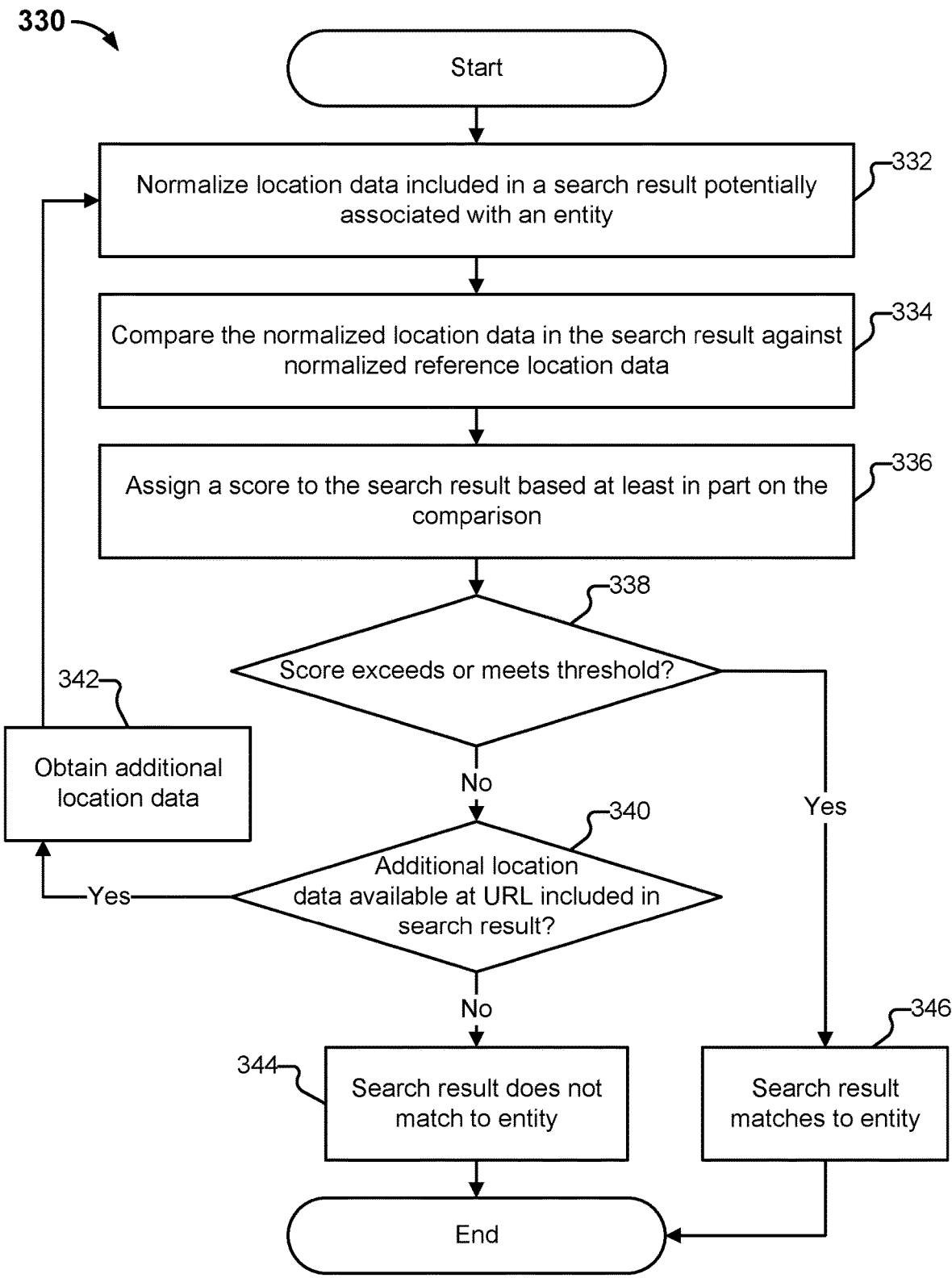
FIG. 3B is a flow diagram illustrating an embodiment of a process for evaluating a search result.

At 308, each of the obtained search results is evaluated to determine whether a given search result matches to a profile of the entity on the source. In some embodiments, evaluating a search result includes normalizing the location data in the search result. The normalized search result location data is compared, on an attribute-by-attribute basis, against normalized versions of the reference location data provided by the tenant. A score is generated and assigned for each attribute based on whether there is a match on a given attribute. The individual attribute scores are used to generate a composite or overall score for the search result. If the overall score for the search result exceeds the threshold, then the search result is determined to be a match to a profile of the entity on the source. In some embodiments, process 330 of FIG. 3B is used to evaluate each search result.

At 310, if, based on the evaluations performed at 308, any of the obtained search results match to a profile of the entity on the source, the process continues to 312, where matching results are returned. For example, the pages that have been identified as the profile pages for an entity on one or more sources are presented to a user in a dashboard or other interactive user interface. In some embodiments, the matching pages are provided as output to a user in a file (e.g., sent as an email or other type of notification).

If, based on the evaluations performed at 310, none of the obtained search results matches to a profile of the entity on the source, then the process continues to 314 where it is determined whether there are any more search strategies to attempt. If there are no more search strategies to attempt (i.e., all search strategies have been exhausted), then no profiles for the entity on the source could be found, and the process ends. In some embodiments, an indication that no matching profile for the entity could be found on the source is provided to a user (e.g., via a user interface or sent to the user via an email or any other type of communication, as appropriate).

If there are still available search strategies to attempt, the process returns to step 304 where a new search strategy is selected and a new search iteration is performed using the new search strategy that has been selected.

FIG. 3B is a flow diagram illustrating an embodiment of a process for evaluating a search result. In some embodiments, process 330 is used to implement step 308 of process 300 of FIG. 3A. The process begins at 332 when location data in a search result potentially associated with an entity is normalized. For example, the location data included in a search result obtained at step 306 of process 300 of FIG. 3A is normalized. In various embodiments, attributes such as entity name, phone number, physical address, website URL, etc. are normalized.

At 334, the normalized search result location data is compared against normalized reference location data. For example, for each location attribute for which there is a value in the search result, the normalized version of the search result location data for the attribute is compared against the corresponding normalized version of the reference or expected location data for the attribute. The reference location data value and the search result location data value for the attribute are normalized in a same, consistent manner. If the normalized search result location data value and the normalized reference location data values for the attribute are the same, then there is a match on the attribute. By performing normalization, fuzzy matching can be performed, where reference location data values and corresponding search result location data values can be determined as matches even if their original values are not exact matches.

In some embodiments, each attribute is assigned a score that is generated based on the comparison of normalized reference and search result location data values for the attribute.

At 336, a score is assigned to the search result based on the comparison. In some embodiments, the score for the search result is a composite or overall score based on the individual attribute scores (e.g., aggregate sum of individual attribute scores generated at 334). In some embodiments, the composite or overall score for the search result is also determined based on the position or rank of the search result among other returned search results.

At 338, it is determined whether the score for the search result exceeds (or meets) a threshold. If the score for the search result exceeds (or meets) the threshold, then the search result is determined to be a match to the entity (346). If the score does not exceed (or meet) the threshold, then the process continues to 340, where it is determined whether there is additional location data available at the URL included in the search result. In some embodiments, the determination of whether there is additional location data that can be obtained is based on a source definition for the source, which indicates what attributes are expected to be found on a profile page on the source. A comparison is then performed between the location attributes included in a search result and the expected available location attributes for profiles on the source. If there is no additional location data that can be obtained from the search result, then the search result is determined to not be a match to the entity (344). If there is additional data available at the URL included in the search result, then the process continues to 342, where additional location data is scraped or otherwise obtained from the page at the URL included in the search result. The process then returns to 332, where the search result is evaluated again using the additional location data obtained at 342.

Figure 3C:
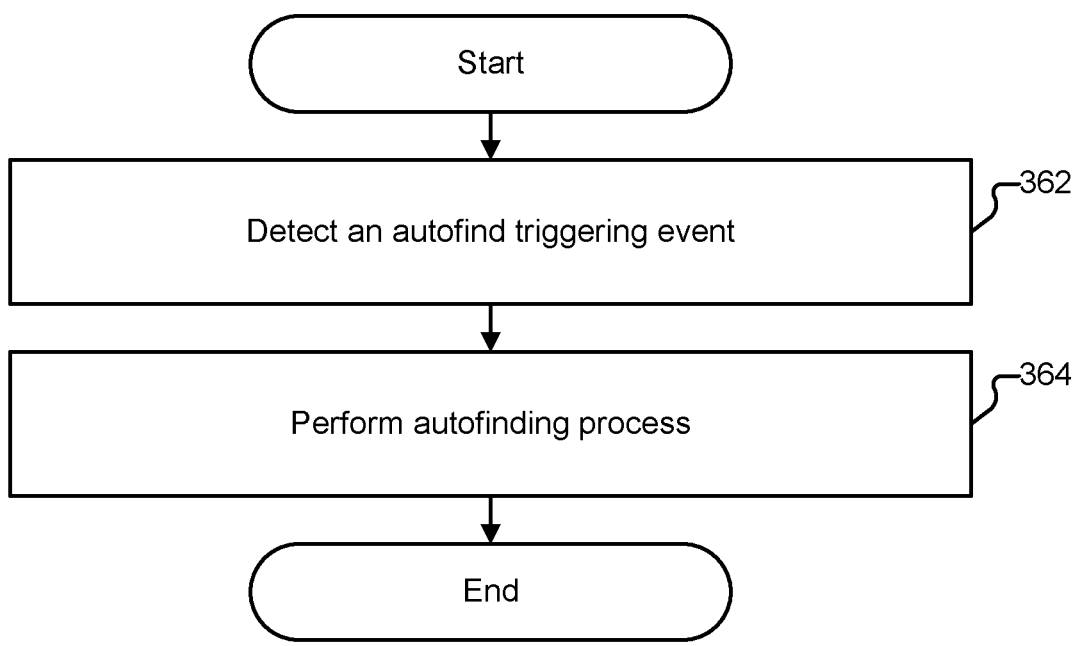
FIG. 3C is a flow diagram illustrating an embodiment of a process for performing self-healing.

FIG. 3C is a flow diagram illustrating an embodiment of a process for performing self-healing. In some embodiments, process 360 is executed by platform 102 of FIG. 2. The process begins at 362 when an autofind triggering event is detected. At 364, an autofind process is performed in response to detecting the autofind triggering event. For example, process 300 of FIG. 3A is performed or triggered in response to the event detected at 362.

One example of an autofind triggering event is a user indication to perform autofinding, for example, via an instruction provided via a user interface. Another example of an autofind triggering event is detection of an indication that a URL is broken or missing, as described above. In some embodiments, each location (e.g., business location) that contains or is otherwise associated with the broken or missing URL is identified. The autofind process is then run for every identified location.

In some embodiments, on a periodic basis, a search is performed to identify locations that should have profile URLs, but do not. The autofind process is then automatically triggered to run for those locations that do not have URLs but should.

As another example, profile URLs for a location are accessed (e.g., scraped) for information such as reviews on a periodic basis. If an error is received in response to accessing a URL, the error is indicative of the profile URL potentially being broken. In some embodiments, if a URL is inaccessible, reason codes are associated with the inaccessible URL, which indicate the type of error event that occurred. The reason codes can be assigned to the URL based on the type of error that is received, as described above. The autofind process is then automatically triggered to run for the broken URL.

Additional Autofind Details

Example Search Result

The following is an example search result that is returned for a search using a search engine (called "YouFind" in the below examples, with accompanying minus.youfind.com social network and YouFind places (business) listing site) for the "GoodFood" restaurant in Fun City. In this example, YouFind has returned 20 results. In some embodiments, the search results are obtained at 306 of process 300 of FIG. 3A. A single example result is shown below:

{
"title": "GoodFood—About-YouFind-",
"description": "GoodFood\nhasn't shared anything on this page with you . . . . \nGoodFood's\nprofile photo.\nGoodFood \n. 1234 Broadway\nFun City\n,\nCA 94123\n. (555) 123-4567.",
"domain": "minus.youfind.com",
"url": "https://minus.youfind.com/12345678901234567890l/about",
"displayUrl": "https://minus.youfind.com/12345678901234567890l/about",
"cachedUrl": "http://webcache.youfindusercontent.com/search?q=cache: sVOX1A2BCD3E:https://minus.youfind.com/12345678901234567890l/about+&cd=1&hl=en&ct=clnk&gl=us",
"rank": 1,
"page": 1,
"hasMap": false,
"advert": false,
"hasIndents": false,
"reviewUrl": false,
"additionalUrls":
"youfindminusUrl": "http://webcache.youfindusercontent.com/search?q=cache: sVOX1A2BCD3E:https://minus.youfind.com/12345678901234567890l/about+&cd=1&hl=en&ct=clnk&gl=us"

An example of an entire response (e.g., top twenty returned results) is shown below:

```
{
  "id": "4215d6bd-7e7c-11e5-8f3b-4505e935216b",
  "headers": {
    "dateGenerated": "2015-10-29T13:33:05-0700",
    "version": "1.3.1.1.RELEASE",
    "status": "SUCCESS"
  },
  "payload": {
    "request": {
      "id": "a1b615c0-7e7b-11e5-96e5-d7b9058994dd",
      "headers": {
        "searchCountry": "us",
        "resultPages": 2,
        "dateScheduled": "2015-10-29T13:28:36-0700",
        "source": "YOUFIND",
        "type": "Searcher",
        "timeout": 86400000,
        "resultsPerPage": 10,
        "terms": [
        ],
        "maxResults": 10,
        "locationId": "5452_test_location",
        "outbound": "twb",
        "action": "extract"
      },
      "payload": {
        "listing": {
          "name": "site:minus.youfind.com GoodFood",
          "streetAddress": "1234 Broadway St.",
          "locality": "Fun City",
          "region": "CA",
          "postalCode": "94123",
          "country": null,
          "phone": null,
          "webUrl": null,
          "industry": null,
          "organization": null,
          "redirect": null,
          "description": null,
          "isClaimed": false,
          "commentSummary": {
            "numComments": null,
            "overallRating": null,
            "properties": [
            ],
            "tags": [
            ],
            "subRatings": [
            ]
          },
          "comments": [
          ],
          "categories": [
          ],
          "competitors": [
          ],
          "photoUrls": [
          ],
          "geolocation": {
            "latitude": null,
            "longitude": null
          },
```

```
                "businessHours": [
                ]
            }
        }
    }
},
"content": [
    {
        "term": "site:minus.youfind.com GoodFood \"Fun City\"\"CA\" 94123",
        "totalHits": 36,
        "searchDate": "2015-10-29T13:33:04.453",
        "searchUrl": "https://www.youfind.com/search?null&hl=en&num=10&q=site%3Aminus.youfind.com%20GoodFood%20%20%22Fun%20City%22%20%22CA%22%2094123",
        "pages": [
            {
                "pageNumber": 1,
                "pageUrl": "https://www.youfind.com/search?null&hl=en&num=10&q=site%3Aminus.youfind.com%20GoodFood%20%20%22Fun%20City%22%20%22CA%22%2094123",
                "searchHits": [
                    {
                        "title": "GoodFood - About – YouFind-",
                        "description": "GoodFood \nhasn't shared anything on this page with you. ...\nGoodFood's \nprofile photo.\nGoodFood \n. 1234 Broadway\nFun City\n,\nCA 94123\n. (555) 123-4567.",
                        "domain": "minus.youfind.com",
                        "url": "https://minus.youfind.com/12345678901234567890l/about",
                        "displayUrl": "https://minus.youfind.com/12345678901234567890l/about",
                        "cachedUrl": "http://webcache.youfindusercontent.com/search?q=cache:sVOX1A2BCD3E:https://minus.youfind.com/12345678901234567890l/about+&cd=1&hl=en&ct=clnk&gl=us",
                        "rank": 1,
                        "page": 1,
                        "hasMap": false,
                        "advert": false,
                        "hasIndents": false,
                        "reviewUrl": false,
                        "additionalUrls": {
                            "youfindminusUrl": "http://webcache.youfindusercontent.com/search?q=cache:sVOX1A2BCD3E:https://minus.youfind.com/12345678901234567890l/about+&cd=1&hl=en&ct=clnk&gl=us"
                        }
                    },
                    {
                        "title": "GoodFood - Photos – YouFind-",
                        "description": "GoodFood's \nprofile photo.\nGoodFood \n. 1234 Broadway\nFun City\n,\nCA 94123\n. (555) 123-4567. American Restaurant. Today 11:00 am – 3:30 pm, 5:00 – 9:00 ...",
                        "domain": "minus.youfind.com",
                        "url": "https://minus.youfind.com/12345678901234567890l/photos",
                        "displayUrl": "https://minus.youfind.com/12345678901234567890l/photos",
                        "cachedUrl": "http://webcache.youfindusercontent.com/search?q=cache:n_MaBC1defgH:https://minus.youfind.com/12345678901234567890l/photos+&cd=2&hl=en&ct=clnk&gl=us",
                        "rank": 2,
                        "page": 1,
                        "hasMap": false,
                        "advert": false,
                        "hasIndents": false,
                        "reviewUrl": false,
                        "additionalUrls": {
                            "youfindminusUrl": "http://webcache.youfindusercontent.com/search?q=cache:n_MaBC1defgH:https://minus.youfind.com/12345678901234567890l/photos+&cd=2&hl=en&ct=clnk&gl=us"
                        }
                    },
                    {
                        "title": "BetterFood - About – YouFind-",
                        "description": "Better\nFood\nhasn't shared anything on this page with you. ... 456 El Camino Real\nFun City\n,\nCA 94123\n... (555) 456-7890\nBetterFood\n.com.",
                        "domain": "minus.youfind.com",
                        "url": "https://minus.youfind.com/223344556677889900111/about",
```

```
            "displayUrl":
"https://minus.youfind.com/2233445566778899001l1/about",
            "cachedUrl":
"http://webcache.youfdinusercontent.com/search?q=cache:dZYX09W-
VutsR:https://minus.youfind.com/2233445566778899001l1/about+&cd=3&hl=en&ct=clnk&gl=
us",
            "rank": 3,
            "page": 1,
            "hasMap": false,
            "advert": false,
            "hasIndents": false,
            "reviewUrl": false,
            "additionalUrls": {
                "youfindMinusUrl":
"http://webcache.youfindusercontent.com/search?q=cache:dZYX09W-
VutsR:https://minus.youfind.com/2233445566778899001l1/about+&cd=3&hl=en&ct=clnk&gl=
us"
            }
        },
        {
            "title": "Max Power - Posts – Youfind-",
            "description": "GoodFood \n· 1234
Broadway,\nFun City\n,\nCA 94123\n. Public - a year ... Crazy Shopping Center, 1985
Stevens Creek Blvd, Cooptown, CA 95345. Public - a ...",
            "domain": "minus.youfind.com",
            "url":
"https://minus.youfind.com/135791357913579135791/reviews",
            "displayUrl":
"https://minus.youfind.com/135791357913579135791/reviews",
            "cachedUrl":
"http://webcache.youfindusercontent.com/search?q=cache:yUmm0AbcD1EF:https://minus.youfi
nd.com/135791357913579135791/reviews+&cd=4&hl=en&ct=clnk&gl=us",
            "rank": 4,
            "page": 1,
            "hasMap": false,
            "advert": false,
            "hasIndents": false,
            "reviewUrl": false,
            "additionalUrls": {
                "youfindMinusUrl":
"http://webcache.youfindusercontent.com/search?q=cache:
yUmm0AbcD1EF:https://minus.youfind.com/135791357913579135791/reviews+&cd=4&hl=en
&ct=clnk&gl=us"
            }
        },
        {
            "title": "Homer S – YouFind-",
            "description": "Redwood Stop, 4567 W El Camino
Real,\nFun City\n,\nCA 94123\n. big store. service is good. ... City,\nCA 94123\n. Only tried
the\nhot dogs\nand they were good.",
            "domain": "minus.youfind.com",
            "url":
"https://minus.youfind.com/2345678902345678901 23",
            "displayUrl":
"https://minus.youfind.com/2345678902345678901 23",
            "cachedUrl":
"http://webcache.youfindusercontent.com/search?q=cache:pHlEvElislOW:https://minus.youfind.
com/2345678902345678901 23+&cd=5&hl=en&ct=clnk&gl=us",
            "rank": 5,
            "page": 1,
            "hasMap": false,
            "advert": false,
            "hasIndents": false,
            "reviewUrl": false,
            "additionalUrls": {
                "youfindMinusUrl": "http://webcache.youfind
usercontent.com/search?q=cache:
pHlEvElislOW:https://minus.youfind.com/2345678902345678901 23+&cd=5&hl=en&ct=clnk&
gl=us"
            }
        },
        {
            "title": "Max Power - About – YouFind-",
            "description": "MoreLoading...\nGoodFood \n.
1234 Broadway,\nFun City\n,\nCA 94123\n... Crazy Shopping Center, 1985 Stevens Creek
Blvd, Cooptown, CA 95345. Public - 10 ...",
            "domain": "minus.youfind.com",
            "url":
"https://minus.youfind.com/135791357913579135791/about",
```

```
                "displayUrl":
"https://minus.youfind.com/135791357913579135791/about",
                "rank": 6,
                "page": 1,
                "hasMap": false,
                "advert": false,
                "hasIndents": false,
                "reviewUrl": false
            },
            {
                "title": "Homer S - Posts – YouFind-",
                "description": "4567 El Camino, Redwood
Stop,\nFun City\n,\nCA 94123\n. big store. service is good. not ... City,\nCA 94123\n. Only tried the\nhot dogs\nand they were good.",
                "domain": "minus.youfind.com",
                "url":
"https://minus.youfind.com/234567890234567890123/reviews",
                "displayUrl":
"https://minus.youfind.com/234567890234567890123/reviews",
                "rank": 7,
                "page": 1,
                "hasMap": false,
                "advert": false,
                "hasIndents": false,
                "reviewUrl": false
            },
            {
                "title": "BestFood – YouFind-",
                "description": "BestFood. 9876 Broadway\nFun
City\n,\nCA 94123\n.... \"The Entremets and baklava \ndesserts\nare all winners.\" \"So few places\n ...",
                "domain": "minus.youfind.com",
                "url":
"https://minus.youfind.com/+BestFoodFunCity",
                "displayUrl":
"https://minus.youfind.com/+BestFoodFunCity",
                "cachedUrl":
"http://webcache.youfindusercontent.com/search?q=cache:OmnICoRPCOrP:https://minus.youfind.com/%2BBestFoodFunCity+&cd=8&hl=en&ct=clnk&gl=us",
                "rank": 8,
                "page": 1,
                "hasMap": false,
                "advert": false,
                "hasIndents": false,
                "reviewUrl": false,
                "additionalUrls": {
                    "youfindMinusUrl": "http://webcache.youfind
usercontent.com/search?q=cache:
OmnICoRPCOrP:https://minus.youfind.com/%2BBestFoodFunCity+&cd=8&hl=en&ct=clnk&gl=us"
                }
            },
            {
                "title": "BestFood - About – YouFind-",
                "description": "Russian Family Restaurant. 2086
Broadway\nRedwood City\n,\nCA 94063\n... \"The Entremets and Baklava \ndesserts\nare all winners.\" \"So few places\n ...",
                "domain": "minus.youfind.com",
                "url":
"https://minus.youfind.com/+BestFoodFunCity/about",
                "displayUrl":
"https://minus.youfind.com/+BestFoodFunCity/about",
                "cachedUrl":
"http://webcache.youfindusercontent.com/search?q=cache:sS2GCOoLKicK:https://minus.youfind.com/%2BBestFoodFunCity/about+&cd=9&hl=en&ct=clnk&gl=us",
                "rank": 9,
                "page": 1,
                "hasMap": false,
                "advert": false,
                "hasIndents": false,
                "reviewUrl": false,
                "additionalUrls": {
                    "youfindMinusUrl":
"http://webcache.youfindusercontent.com/search?q=cache:
sS2GCOoLKicK:https://minus.youfind.com/%2BBestFoodFunCity/about+&cd=9&hl=en&ct=clnk&gl=us"
                }
            },
```

```
                {
                    "title": "Peter Piper - YouFind+",
                    "description": "June 15, 2013 -\n3456
Broadway,\nFun City\n,\nCA 94123\n. Public - a week ago ... 22 Eddy St, SanCity, CA 94987.
Public - a week ... Map.\nGoodFood \n.",
                    "domain": "minus.youfind.com",
                    "url": "https://minus.youfind.
com/314159265358979323846",
                    "displayUrl":
"https://minus.youfind.com/314159265358979323846",
                    "cachedUrl":
"http://webcache.youfindusercontent.com/search?q=cache:ZlD1GpcaMBeRZJ:https://minus.you
find.com/314159265358979323846+&cd=10&hl=en&ct=clnk&gl=us",
                    "rank": 10,
                    "page": 1,
                    "hasMap": false,
                    "advert": false,
                    "hasIndents": false,
                    "reviewUrl": false,
                    "additionalUrls": {
                        "youfindMinusPlusUrl":
"http://webcache.youfind usercontent.com/search?q=cache:
ZlD1GpcaMBeRZJ:https://minus.youfind.com/314159265358979323846+&cd=10&hl=en&ct=c
lnk&gl=us"
                    }
                }
            ],
            "hitsOnPage": 10
        },
        {
            "pageNumber": 2,
            "pageUrl":
"https://www.youfind.com/search?q=site:minus.youfind.com+GoodFood
++%22Fun+City%22+%22CA%22+94123&hl=en&ei=foIyVq3rH8PKjwOY4YmYDA&start=1
0&sa=N&gl=us&num=10",
            "searchHits": [
                {
                    "title": "Goony Mikey – Youfind-",
                    "description": "369 Baldwin Ave, Tight City, CA
94432. 1st time I went was good service. ...\nGoodFood \n· 1234 Broadway,\nFun City\n,\nCA
94123\n. Will never ever be back.",
                    "domain": "minus.youfind.com",
                    "url":
"https://minus.youfind.com/271828182845904523536",
                    "displayUrl":
"https://minus.youfind.com/271828182845904523536",
                    "rank": 11,
                    "page": 2,
                    "hasMap": false,
                    "advert": false,
                    "hasIndents": false,
                    "reviewUrl": false
                },
                {
                    "title": "Naruto Japanese Restaurant - About -
Google+",
                    "description": "Naruto Japanese Restaurant's profile
photo. Naruto Japanese Restaurant. 543 El Camino Real\nFun City\n,\nCA 94123\n. (555)
369-1357. naruto-restaurant.",
                    "domain": "minus.youfind.com",
                    "url":
"https://minus.youfind.com/161803398874989484820/about",
                    "displayUrl":
"https://minus.youfind.com/161803398874989484820/about",
                    "cachedUrl":
"http://webcache.youfindusercontent.com/search?q=cache:oaTHbReAK-
ER:https://minus.youfind.com/161803398874989484820/about+&cd=12&hl=en&ct=clnk&gl=u
s",
                    "rank": 12,
                    "page": 2,
                    "hasMap": false,
                    "advert": false,
                    "hasIndents": false,
                    "reviewUrl": false,
```

```
                    "additionalUrls": {
                        "youfindMinusUrl":
"http://webcache.youfindusercontent.com/search?q=cache: oaTHbReAK-
ER:https://minus.youfind.com/161803398874989484820/about+&cd=12&hl=en&ct=clnk&gl=u
s"
                    }
                },
                {
                    "title": "Max Power - Photos - Youfind-",
                    "description": "GoodFood \n· 1234
Broadway,\nFun City\n,\nCA 94123\n. Public - 11 ... Crazy Shopping Center, 1985 Stevens
Creek Blvd, Cooptown, CA 95345. Public - a year ...",
                    "domain": "minus.youfind.com",
                    "url":
"https://minus.youfind.com/135791357913579135791/photos",
                    "displayUrl":
"https://minus.youfind.com/135791357913579135791/photos",
                    "cachedUrl":
"http://webcache.youfindusercontent.com/search?q=cache:b_pEjF1-
nOsJ:https://minus.youfind.com/135791357913579135791/photos+&cd=13&hl=en&ct=clnk&gl
=us",
                    "rank": 13,
                    "page": 2,
                    "hasMap": false,
                    "advert": false,
                    "hasIndents": false,
                    "reviewUrl": false,
                    "additionalUrls": {
                        "youfindMinusUrl":
"http://webcache.youfindusercontent.com/search?q=cache:b_pEjF1-
nOsJ:https://minus.youfind.com/135791357913579135791/photos+&cd=13&hl=en&ct=clnk&gl
=us"
                    }
                },
                {
                    "title": "Kenneth Parcell - YoufindYoufind-",
                    "description": "Orthogona -\nFun City\n, CA -
Professional/Business Working in different areas of technology since 2999. ... Decades ago a
coworker brought a box full of delicious bacon\nhotdogs\n, ever since ... 000 El Camino
Real,\nFun City\n,\nCA 94123\n.",
                    "domain": "minus.youfind.com",
                    "url":
"https://minus.youfind.com/+KennethParcell",
                    "displayUrl":
"https://minus.youfind.com/+KennethParcell",
                    "cachedUrl":
"http://webcache.youfindusercontent.com/search?q=cache:4Wdall-
wheel:https://minus.youfind.com/%2BKennethParcell+&cd=14&hl=en&ct=clnk&gl=us",
                    "rank": 14,
                    "page": 2,
                    "hasMap": false,
                    "advert": false,
                    "hasIndents": false,
                    "reviewUrl": false,
                    "additionalUrls": {
                        "youfindMinusUrl":
"http://webcache.youfindusercontent.com/search?q=cache:4Wfmma-
fs1EJ:https://minus.youfind.com/%2BKennethParcell+&cd=14&hl=en&ct=clnk&gl=us"
                    }
                },
                {
                    "title": "Naruto Japanese Restaurant - Photos -
Youfind-",
                    "description": "543 El Camino Real\nFun
City\n,\nCA 94123\n... City,\nCA 94123\n. 543 El Camino RealUSCalifornia\nFun
City\n94123 ... Good sushi, GREAT\nhotdogs\n.",
                    "domain": "minus.youfind.com",
                    "url":
"https://minus.youfind.com/161803398874989484820/photos",
                    "displayUrl":
"https://minus.youfind.com/161803398874989484820/photos",
                    "cachedUrl":
"http://webcache.youfindusercontent.com/search?q=cache:BsEEfuzzIdkJ:https://minus.youfind.c
om/161803398874989484820/photos+&cd=15&hl=en&ct=clnk&gl=us",
                    "rank": 15,
                    "page": 2,
                    "hasMap": false,
                    "advert": false,
```

```
                "hasIndents": false,
                "reviewUrl": false,
                "additionalUrls": {
                    "youfindMinusUrl":
"http://webcache.youfindusercontent.com/search?q=cache:
BsEEfuzzIdkJ:https://minus.youfind.com/161803398874989484820/photos+&cd=15&hl=en&ct
=clnk&gl=us"
                }
            },
            {
                "title": "Peppermint Patty - YoufindYoufind-",
                "description": "543 El Camino Real,\nFun
City\n,\nCA 94123\n. I really liked this place. Good sushi, GREAT\nhotdogs\n. Public - 8
months ago. reviewed 8 months ago. 1 review.",
                "domain": "minus.youfind.com",
                "url":
"https://minus.youfind.com/141421356237309504880",
                "displayUrl":
"https://minus.youfind.com/141421356237309504880",
                "rank": 16,
                "page": 2,
                "hasMap": false,
                "advert": false,
                "hasIndents": false,
                "reviewUrl": false
            },
            {
                "title": "Ethinc Food - Community -
YoufindYoufind-",
                "description": "A delicious soup with
puffy\nbuns\nthat fill you up without overwhelming. 4. Add a comment. ...\nFun City\n,\nCA
94123\n. Tel: 555.777.7777 / Cell: 555.888.",
                "domain": "minus.youfind.com",
                "url":
"https://minus.youfind.com/communities/17320508075 6887729352",
                "displayUrl":
"https://minus.youfind.com/communities/17320508075 6887729352",
                "cachedUrl":
"http://webcache.youfindusercontent.com/search?q=cache:quIdPrOqu0TE:https://minus.youfind.
com/communities/17320508075 6887729352+&cd=17&hl=en&ct=clnk&gl=us",
                "rank": 17,
                "page": 2,
                "hasMap": false,
                "advert": false,
                "hasIndents": false,
                "reviewUrl": false,
                "additionalUrls": {
                    "youfindMinusUrl":
"http://webcache.youfindusercontent.com/search?q=cache:
quIdPrOqu0TE:https://minus.youfind.com/communities/17320508075
6887729352+&cd=17&hl=en&ct=clnk&gl=us"
                }
            },
            {
                "title": "Mikey Mike - About - Youfind-",
                "description": "Soup\nHotdogs\n! Scoop them with
a .... 1984 Market St, San City, CA 94999. These people are ... 2450 Broadway,\nFun
City\n,\nCA 94123\n. Delicious\n!",
                "domain": "minus.youfind.com",
                "url": "https://minus.youfind.com/+Mad
Mike/about",
                "displayUrl": "https://minus.youfind.com/+Mad
Mike/about",
                "cachedUrl":
"http://webcache.youfindusercontent.com/search?q=cache:l0fO0thoOPBOO:https://minus.youfin
d.com/%2BMadMike/about+&cd=18&hl=en&ct=clnk&gl=us",
                "rank": 18,
                "page": 2,
                "hasMap": false,
                "advert": false,
                "hasIndents": false,
                "reviewUrl": false,
                "additionalUrls": {
                    "youfindMinusUrl":
"http://webcache.youfindusercontent.com/search?q=cache:
l0fO0thoOPBOO:https://minus.youfind.com/%2BMadMike/about+&cd=18&hl=en&ct=clnk&gl
=us"
                }
            },
```

-continued

```
            {
                "title": "Mike Michaelson - Posts - YoufindYoufind-",
                "description": "Studies show your little\nhotdogs\nknow they're communicating with you in a way that's more enlightening than .... 3456 Broadway,\nFun City\n,\nCA 94123\n.",
                "domain": "minus.youfind.com",
                "url": "https://minus.youfind.com/+MikeMichaelson/collections",
                "displayUrl": "https://minus.youfind.com/+MikeMichaelson/collections",
                "cachedUrl": "http://webcache.youfindusercontent.com/search?q=cache:f8TeSt4YNiTE:https://minus.youfind.com/%2BMikeMichaelson/collections+&cd=19&hl=en&ct=clnk&gl=us",
                "rank": 19,
                "page": 2,
                "hasMap": false,
                "advert": false,
                "hasIndents": false,
                "reviewUrl": false,
                "additionalUrls": {
                    "youfindMinusUrl": "http://webcache.youfindusercontent.com/search?q=cache:f8TeSt4YNiTE:https://minus.youfind.com/%2BMikeMichaelson/collections+&cd=19&hl=en&ct=clnk&gl=us"
                }
            },
            {
                "title": "Mikey Mike - Youfind-",
                "description": "Soup\nDumplings\n! Scoop them with a .... 1984 Market St, San City, CA 94999. These people are ... 2450 Broadway,\nFun City\n,\nCA 94123\n. Delicious\n!",
                "domain": "minus.youfind.com",
                "url": "https://minus.youfind.com/+MadMike",
                "displayUrl": "https://minus.youfind.com/+MadMike",
                "rank": 20,
                "page": 2,
                "hasMap": false,
                "advert": false,
                "hasIndents": false,
                "reviewUrl": false
            }
        ],
        "hitsOnPage": 10
        }
      ],
      "pageCount": 2
    }
  ]
 }
}
```

Example Collection Result

Below is an example collection output for the example URL https://minus.youfind.com/108536589886178286143/about. The full location data scraped from the URL is shown in this collection result. In one example embodiment, the location data for the example URL is scraped at step 342 of process 330 of FIG. 3B.

```
{
  "collectorOutput" : {
    "source" : "youfind_places",
    "url" : "https://minus.youfind.com/123456789012345678901/about",
    "entity" : {
      "name" : "GoodFood",
      "streetAddress" : "1234 Broadway",
      "locality" : "Fun City",
      "region" : "California",
      "postalCode" : "94123",
      "phone" : "(555) 123-4567",
      "isClaimed" : false,
```

```
        "commentSummary" : {
          "numComments" : 22,
          "overallRating" : 4.3
        },
        "categories" : [ "American Restaurant" ],
        "photoUrls" : [ "https://lh3.youfindusercontent.com/-
1LWTmksY4VA/Uwvt84Ic1yI/AAAAAAAANBg/Z-ArAPYHilQ/s250-c-k-no/",
"https://lh3.youfindusercontent.com/-
CXIpPNv7CME/Uwvt92Y2poI/AAAAAAAM1I/K0GA1_4ezuM/s90-c-k-no/",
"https://lh3.youfindusercontent.com/-tCiA4uWg6lM/VVTlKnOpqVI/AAAAAAAB2_o/T5e0-
pjg8iY/s90-c-k-no/", "https://lh3.youfindusercontent.com/-
wjYsfQe5isk/VVTlJseVn2I/AAAAAAAB3DM/uHvucWsJ108/s90-c-k-no/",
"https://lh3.youfindusercontent.com/-
lFbk5eWexrg/VVTlMrI9HEI/AAAAAAAB3Cw/P7z2xK92D-Q/s90-c-k-no/",
"https://lh3.youfindusercontent.com/-dK1ZQKLlfmM/Uwyt_-
mDWNI/AAAAAAAAOP8/ZUCPZIuGCac/s90-c-k-no/" ],
        "geolocation" : { },
        "businessHours" : [ {
          "dailyHours" : [ {
            "day" : "Monday",
            "timeRanges" : [ {
              "openHour" : 11,
              "openMinutes" : 0,
              "closeHour" : 15,
              "closeMinutes" : 30
            }, {
              "openHour" : 5,
              "openMinutes" : 0,
              "closeHour" : 21,
              "closeMinutes" : 0
            } ],
            "closed" : true
          }, {
            "day" : "Wednesday",
            "timeRanges" : [ {
              "openHour" : 11,
              "openMinute" : 0,
              "closeHour" : 15,
              "closeMinutes" : 30
            }, {
              "openHour" : 5,
              "openMinutes" : 0,
              "closeHour" : 21,
              "closeMinutes" : 0
            } ]
          }, {
            "day" : "Thursday",
            "timeRanges" : [ {
              "openHour" : 11,
              "openMinutes" : 0,
              "closeHour" : 15,
              "closeMinutes" : 30
            }, {
              "openHour" : 5,
              "openMinutes" : 0,
              "closeHour" : 21,
              "closeMinutes" : 0
            } ]
          }, {
            "day" : "Friday",
            "timeRanges" : [ {
              "openHour" : 11,
              "openMinutes" : 0,
              "closeHour" : 15,
              "closeMinutes" : 30
            }, {
              "openHour" : 5,
              "openMinutes" : 0,
              "closeHour" : 21,
              "closeMinutes" : 0
            } ]
          }, {
            "day" : "Saturday",
            "timeRanges" : [ {
              "openHour" : 11,
              "openMinutes" : 0,
```

-continued

```
                "closeHour" : 15,
                "closeMinutes" : 30
            }, {
                "openHour" : 5,
                "openMinutes" : 0,
                "closeHour" : 21,
                "closeMinutes" : 0
            } ]
        }, {
            "day" : "Sunday",
            "timeRanges" : [ {
                "openHour" : 11,
                "openMinutes" : 0,
                "closeHour" : 15,
                "closeMinutes" : 30
            }, {
                "openHour" : 5,
                "openMinutes" : 0,
                "closeHour" : 20,
                "closeMinutes" : 30
            } ]
        } ],
        "type" : "- , - "
        } ]
    },
    "status" : 0,
    "startTime" : 1446150992171,
    "endTime" : 1446150993465,
    "incremental" : false
},
"job" : {
    "uid" : "scraperUI-bd4d43f1-7e7c-11e5-8f3b-f50bc170c91e",
    "source" : "youfind_places",
    "url" : "https://minus.youfind.com/108536589886178286143/about",
    "callbackContext" : {
        "endpoint" : "scraperUI-bd4d43f2-7e7c-11e5-8f3b-f50bc170c91e"
    },
    "collectIncremental" : false,
    "dateScheduled" : 1446150992000,
    "parameters" : {
        "server" : "Scraper",
        "version" : "1.31.1.RELEASE",
        "locationSearch" : "true"
    }
},
"uid" : "ScraperUI-bd4d43f1-7e7c-11e5-8f3b-f50bc170c91e",
"status" : 0
}
```

Example Source Definition

The following is an example of a source definition document. In some embodiments, several services make use of these documents, where the documents may contain elements that may not be used by the autofinding process. In some embodiments, the source definition below is an example of source definition 228 of platform 102 of FIG. 2.

```
{
    "_id": "YOUFIND_PLACES",
    "_class" : "com.tool.product.app.business.domain.Source",
    "collectable" : true,
    "status" : 1,
    "alertable" : true,
    "reviewable" : true,
    "scoreable" : true,
    "publishable" : false,
    "schedulable" : true,
    "autofindable" : true,
    "viewable" : true,
    "requestReviewable" : true,
    "oauthable" : false,
    "name" : "youfind- Local",
```

-continued

```
  "urls" : [
    "US" : http://minus.youfind.com
    "GB" : http://minus.youfind.co.uk
  ],
  "domain" : "minus.youfind.com",
  "smallIconPath":
"/secure/images/en/business/common/logos/logo_small_youfind_places.png",
  "largeIconPath" :
"/secure/images/en/business/common/logos/logo_big_youfind_places.png",
  "hasItemizedRatings" : true,
  "commentable" : true,
  "sourceGroup" : "CORE",
  "urlRegexp" : "^https?:\\/\\/minus\\.youfind\\.com\\/(?:u\\/[0-9]{1,}\\/)?([0-
9a-zA-Z +-]{2,}\\/about(\\?.*)?$",
  "industryWeights" : {
    "GB" : {
      "hospitality-&-travel-hospitality-&-travel-other" : 0.3,
      "health-care-health-care-other" : 0.3,
      "automotive-oem" : 0.3,
      "automotive-automotive-other" : 0.3,
      "financial-services-accounting" : 0.3,
      "pets-animal-shelters" : 0.3,
      "technology-internet-service-provider" : 0.3,
      "restaurants-fast-food" : 0.3,
      "beauty-spa" : 0.3,
      "restaurants-carry-out" : 0.3,
      "restaurants-restaurants-other" : 0.3,
      "entertainment-museums-and-parks" : 0.3,
      "pets-pet-stores" : 0.3,
      "real-estate-real-estate-other" : 0.3,
      "automotive-repair-&-service" : 0.3,
      "health-care-senior-care" : 0.3,
      "real-estate-real-estate-agency" : 0.3,
      "health-care-physicians" : 0.3,
      "beauty-hair-grooming" : 0.3,
      "education-education-other" : 0.3,
      "entertainment-amusement-park" : 0.3,
      "financial-services-insurance" : 0.3,
      "health-care-hospitals-&-facilities" : 0.3,
      "automotive-dealer" : 0.3,
      "home-services-cleaning" : 0.3,
      "entertainment-live-performance-&-sports" : 0.3,
      "retail-retail-clothing" : 0.3,
      "automotive-rental" : 0.3,
      "real-estate-property-management" : 0.3,
      "beauty-skin-care" : 0.3,
      "technology-electronics" : 0.3,
      "pets-pet-services" : 0.3,
      "hospitality-&-travel-hotel-&-motel" : 0.3,
      "financial-services-financial-services-other" : 0.3,
      "health-care-dentists" : 0.3,
      "health-care-plastic-&-cosmetic-surgeons" : 0.3,
      "retail-retail-other" : 0.3,
      "wedding-&-special-events-party-venues" : 0.3,
      "home-services-general-contracting" : 0.3,
      "wedding-&-special-events-wedding-&-special-events-other" : 0.3,
      "home-services-interior-design" : 0.3,
      "legal-law-firm" : 0.3,
      "wedding-&-special-events-entertainers" : 0.3,
      "health-care-medical-spa" : 0.3,
      "automotive-parts" : 0.3,
      "automotive-tires" : 0.3,
      "technology-technology-other" : 0.3,
      "retail-special-services" : 0.3,
      "restaurants-fine-dining" : 0.3,
      "hospitality-&-travel-activities" : 0.3,
      "default-default" : 0.3,
      "wedding-&-special-events-event-planners" : 0.3,
      "beauty-beauty-other" : 0.3,
      "entertainment-other" : 0.3,
      "retail-department-stores" : 0.3,
      "health-care-pediatricians" : 0.3,
      "technology-computer-sales-&-repair" : 0.3,
      "financial-services-banks" : 0.3,
      "pets-pets-other" : 0.3,
      "health-care-optometrist-&-opthamologist" : 0.3,
      "retail-supermarkets" : 0.3,
      "home-services-landscaping" : 0.3,
      "home-services-moving-&-storage" : 0.3,
```

-continued

```
    "technology-mobile-provider" : 0.3,
    "retail-big-box" : 0.3,
    "home-services-home-services-other" : 0.3,
    "legal-legal-other" : 0.3,
    "real-estate-mortgage" : 0.3,
    "entertainment-movie-theaters" : 0.3,
    "pets-veterinarians" : 0.3
},
"US": {
    "hospitality-&-travel-hospitality-&-travel-other" : 0.330617284,
    "health-care-health-care-other" : 0.330617284,
    "automotive-oem" : 0.330617284,
    "automotive-automotive-other" : 0.490625,
    "financial-services-accounting" : 0.490625,
    "pets-animal-shelters" : 0.490625,
    "technology-internet-service-provider" : 0.490625,
    "restaurants-fast-food" : 0.422972973,
    "beauty-spa" : 0.490625,
    "restaurants-carry-out" : 0.238372093,
    "restaurants-restaurants-other" : 0.238372093,
    "entertainment-museums-and-parks" : 0.330617284,
    "pets-pet-stores" : 0.490625,
    "real-estate-real-estate-other" : 0.490625,
    "automotive-repair-&-service" : 0.490625,
    "health-care-senior-care" : 0.29,
    "real-estate-real-estate-agency" : 0.490625,
    "health-care-physicians" : 0.135108696,
    "beauty-hair-grooming" : 0.490625,
    "education-education-other" : 0.490625,
    "entertainment-amusement-park" : 0.490625,
    "financial-services-insurance" : 0.490625,
    "health-care-hospitals-&-facilities" : 0.385555556,
    "automotive-dealer" : 0.34,
    "home-services-cleaning" : 0.490625,
    "entertainment-live-performance-&-sports" : 0.490625,
    "retail-retail-clothing" : 0.490625,
    "automotive-rental" : 0.490625,
    "real-estate-property-management" : 0.348311688,
    "beauty-skin-care" : 0.490625,
    "technology-electronics" : 0.490625,
    "pets-pet-services" : 0.490625,
    "hospitality-&-travel-hotel-&-motel" : 0.264691358,
    "financial-services-financial-services-other" : 0.490625,
    "health-care-dentists" : 0.12,
    "health-care-plastic-&-cosmetic-surgeons" : 0.330617284,
    "retail-retail-other" : 0.490625,
    "wedding-&-special-events-party-venues" : 0.490625,
    "home-services-general-contracting" : 0.490625,
    "wedding-&-special-events-wedding-&-special-events-other" : 0.490625,
    "home-services-interior-design" : 0.490625,
    "legal-law-firm" : 0.490625,
    "wedding-&-special-events-entertainers" : 0.490625,
    "health-care-medical-spa" : 0.490625,
    "automotive-parts" : 0.490625,
    "automotive-tires" : 0.490625,
    "technology-technology-other" : 0.490625,
    "retail-special-services" : 0.490625,
    "restaurants-fine-dining" : 0.238372093,
    "hospitality-&-travel-activities" : 0.330617284,
    "default-default" : 0.490625,
    "wedding-&-special-events-event-planners" : 0.490625,
    "beauty-beauty-other" : 0.490625,
    "entertainment-other" : 0.490625,
    "retail-department-stores" : 0.490625,
    "health-care-pediatricians" : 0.330617284,
    "technology-computer-sales-&-repair" : 0.490625,
    "financial-services-banks" : 0.490625,
    "pets-pets-other" : 0.490625,
    "health-care-optometrist-&-opthamologist" : 0.330617284,
    "retail-supermarkets" : 0.490625,
    "home-services-landscaping" : 0.490625,
    "home-services-moving-&-storage" : 0.490625,
    "technology-mobile-provider" : 0.490625,
    "retail-big-box" : 0.490625,
    "home-services-home-services-other" : 0.490625,
    "legal-legal-other" : 0.490625,
    "real-estate-mortgage" : 0.490625,
```

```
            "entertainment-movie-theaters" : 0.490625,
            "pets-veterinarians" : 0.353026316
          }
      },
      "overallRS" : {
        "min" : 1,
        "max" : 5,
        "overallMin" : 1,
        "overallMax" : 5,
        "bucketUpperBounds" : {
          "1" : 1,
          "2" : 2,
          "3" : 3,
          "4" : 4
          }
      },
      "subRatingRS" : {
      },
      "colors" : {
        "bgColor" : "#3369E8",
        "bgColorStart" : "#5b8beb",
        "bgColorEnd" : "#3369E8",
        "borderColor" : "#3369E8"
      },
      "attributes" : [
        "phone",
        "address",
        "web",
        "categories",
        "photos",
        "claim",
        "credential",
        "hours",
        "description",
        "ADDRESS",
        "BUSINESS_HOURS",
        "CATEGORIES",
        "DESCRIPTION_LONG",
        "PHONE_MAIN",
        "PHOTOS",
        "WEB_URL"
      ],
      "idFields" : [
        "rating",
        "comment",
        "reviewerName",
        "reviewerId",
        "properties"
      ],
      "createUrl" : "http://www.youfind.com/business/placesforbusiness",
      "claimUrl" : "http://minus.youfind.com",
      "listable" : true,
      "preserveDate" : true,
      "sociable" : false,
      "searchable" : true,
      "redirectable" : true,
      "privateMsg" : false,
      "numExpectedPhotos" : 1,
      "handler" : "Scraping Framework",
      "tailSite" : false,
      "publishResponses" : 1,
      "numResponses" : 0,
      "publishReviews" : false,
      "listingsExportable" : true,
      "requireCredentials" : false,
      "replaceUrl" : true,
      "countries" : [
        "*"
      ],
      "industries" : [
        "*"
      ]
}
```

Business Listings

In some embodiments, reputation platform 102 is also configured to provide a listing service, which is configured to audit the validity of business profile data on various review and listing sites. For example, the listing service provided by reputation platform 102 is configured to automatically determine whether the information (e.g., name, phone number, physical address, website URL, etc.) on profile pages on various sources (e.g., review sites, listing sites, social network sites, etc.) for a location of a business is correct for the business location. Incorrect data on a location's profile on a source can be fixed by exporting the correct data to the source and updating the location's profile with the exported correct data.

Figure 4:
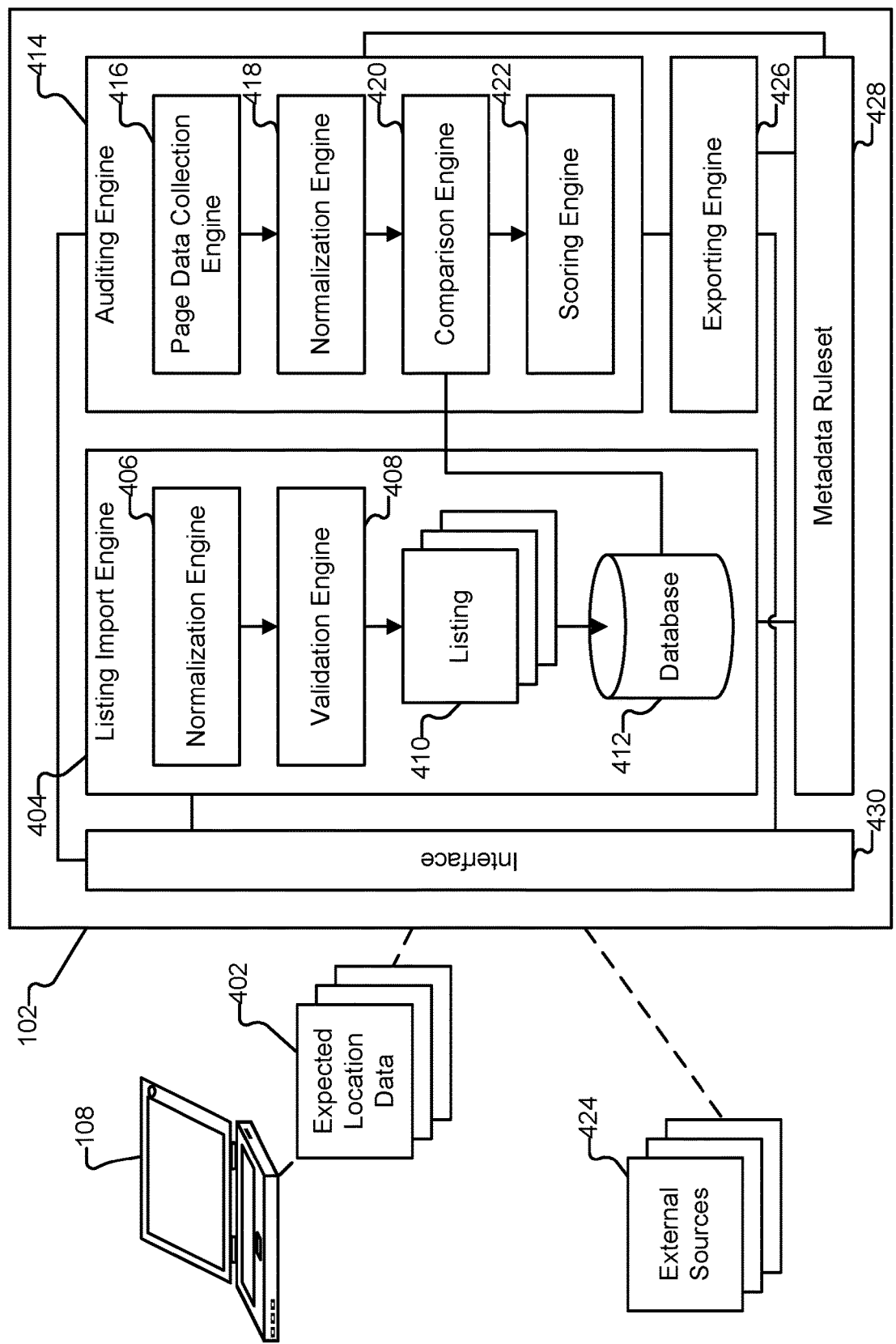
FIG. 4 illustrates an example of components included in embodiments of a reputation platform.

FIG. 4 illustrates an example of components included in embodiments of a reputation platform. In particular, FIG. 4 illustrates components of platform 102 that are used in conjunction with providing a listing service. As will be described in further detail below, the listing service is configured to import, normalize, audit, and export business listing data for customers of platform 102, such as Bob and Alice, who may be in various industries. In some embodiments, the various functionality of the listing service, such as auditing, normalizing, validating, scoring, etc. is supported on a per-industry basis. For example, physicians may be associated with industry-specific attributes such as National Provider Identifier (NPI) numbers and specialties that are handled in a particular manner by the listing service described herein.

As will be described in further detail below, in some embodiments, the listing service described herein uses a flexible metadata ruleset (428) to store data pertaining to different industries without requiring hardcoding expectations in a codebase. In some embodiments, every type of listing metadata (e.g., name, address, phone number, etc.) is mapped to a field, where each field has a defined ruleset in the metadata ruleset 428. In various embodiments, the rules defined in the metadata ruleset 428 control data entry and import, normalization, validation, auditing (e.g., comparing a source of valid information to data on business listing websites and scoring the audit), and exporting data to external sources (who may be business partners of the entity operating platform 102). In some embodiments, when auditing of businesses in a new industry is to be supported by platform 102, fields specific to the industry and accompanying rules can be added to the metadata ruleset 428, where the various functionality provided by the listing service, such as listing data ingestion, validating, auditing, exporting, reporting, etc. is performed according to the defined rules. An example of a metadata ruleset is described in further detail below.

In this example, Alice of Acme Healthcare (108) would like to have platform 102 perform an audit of the data on business profiles of the various medical facilities and doctors of Acme Healthcare (also referred to herein as the "locations" of Acme Healthcare) that are hosted on review sites, listing sites, social media sites, etc. (e.g., external sources 424). In order to access the listing services provided by reputation platform 102, Alice (using client device 108) accesses interface 430 (e.g., a web-based interface), and provides reference location data 402. Reference location data 402 includes the expected or intended values for the attributes or fields (e.g., name, physical address, website URL, phone number, etc.) of the locations of Acme Healthcare that should be on the locations' profiles on external sources (424).

In some embodiments, reference location data 402 includes industry specific information. For example, because Acme Healthcare is a business in the healthcare industry, Alice also includes healthcare provider related information pertinent to the healthcare industry, such as doctors' NPI (National Provider Identifier) numbers and their corresponding medical degrees.

Alice can provide the reference location data for the locations of Acme Healthcare, for example, by manually entering the reference location data for each location into fields of a web-based graphical interface. Alice can then be prompted to loop through the auditing process for each of the Acme Healthcare locations, where Alice provides the location data for each medical facility and physician associated with Acme Healthcare, one at a time. As another example, Alice can upload to platform 102 a spreadsheet or any other appropriate type of file (or set of files, for example, in a batch) that includes the applicable reference or expected information for the various locations of Acme Healthcare. Separate audits are then performed (e.g., automatically) for each separate location by platform 102. In some embodiments, the reference location data is provided as part of a process for filling out a profile for the location(s) of a business or any other entity, as appropriate.

In the following example, the auditing of location data for a single location is described for illustrative purposes. The processing performed by the listing service can be repeated for any number of locations for an entity.

The reference location data 402 (also referred to herein as reference listing data) provided by Alice is imported using listing import engine 404. The provided reference location data is then normalized using normalization engine 406. In some embodiments, normalization engine 406 is an example of normalization engine 220 of FIG. 2. Normalization engine 406 is configured to normalize the attribute data values included in the reference location data. In some embodiments, location attributes or fields (e.g., name, physical address, phone number, etc.) are normalized using a corresponding normalizer (e.g., name normalizer, address normalizer, phone number normalizer, etc.). If no normalizer for a field is specified, then the reference location data for the field is not normalized. In some embodiments, the rules for controlling the normalizer for a particular field are specified in metadata ruleset 428.

The normalized reference location data is then validated using validation engine 408 (the ordering of validation and normalization can also be swapped, in other embodiments). In some embodiments, the validation engine is configured to determine whether the provided location data is valid (e.g., whether there are any problems with the provided reference data). In some embodiments, each attribute or field or element of location data is associated with a corresponding validator. For example, validation engine 408 can include a phone number validator that is configured to determine whether a provided reference phone number is a valid phone number (e.g., whether a number includes ten digits). As another example, in the case of healthcare, validation engine 408 can be configured to use an NPI number validator to determine whether a provided NPI number is valid. In some embodiments, the validators or rules for validating fields are specified in metadata ruleset 428.

In various embodiments, the validators can be implemented using internal and/or external (e.g., third party) services. In some embodiments, validation rules are specified on a per-source basis. For example, different sources may have different rules/conditions for determining whether a value for an attribute is valid. For example, while a provided business location description may be valid for Yelp, the same provided description may not be valid for Google+ (e.g., because the description is too long for Google+). The rules can also be specified on a per-industry basis. For example, validators can be obtained and executed by validation engine 408 based on the industry of the location for which reference data is being processed. As with normalization engine 406, every attribute or field may not be associated with a corresponding validator and/or validation rules.

As will be described in further detail below, when fixing the information located on external sources, the provided reference data is sent to the external sources as the "correct" data (e.g., data on an external source's profile page that does not match to the reference data is replaced by valid reference data). In some embodiments, only valid reference location data is exported, while invalid data is not exported.

In some embodiments, results of the validation are provided to a user (e.g., via interface 430). For example, if a tenant only provided six digits for a phone number, the phone number is determined to be invalid by validation engine 408, and the invalid status of the provided phone number is presented or flagged to Alice. In some embodiments, a profile for a location on platform 102 is indicated as being complete when all of the reference data provided for the location is valid. Alice can then correct the invalid reference location data.

In some embodiments, the validated reference location data for a location is then placed in a data structure document referred to herein as a "listing" (410). In some embodiments, each location of an entity is associated with a corresponding listing document that contains the reference or expected location data for a given location. The listing documents (410) are stored to database 412. In one example embodiment, database 412 is implemented using Mongo DB. In some embodiments, the listings 410 are stored separately from the location data 204 described in FIG. 2 (e.g., where database 224 and database 412 are separate databases, or where location data 204 and listings 410 are stored in separate portions of the same database). Listings 410 and location data 204 may exist for the same location and may have a large amount of overlap (e.g., share the same attribute values). In some embodiments, the listings 410 and location data 204 for a location are synchronized. For example, if a phone number is changed in the listing document, the location data 204 for the location is also updated with the same modified phone number. In some embodiments, the location data (which may be stored in a separate document) and the listing for the same location are related by having the same location identifier, which is used to synchronize the two documents.

Auditing engine 414 is configured to audit the validity of business profile data (e.g., name, phone, address, etc.) on various sources such as review and listing sites. For each location data or listing attribute included in a listing, including industry-specific elements, a profile for a location on an external source is evaluated to determine whether the data on the profile page matches to the reference location data included in the listing document for the location.

Page data collection engine 416 is configured to obtain location data for a location from business profile pages on various sources such as external sources 424. In some embodiments, the links (e.g., URLs) to the profile pages of the location are provided to platform 102 by a user such as Alice. The links to the profile pages of the location can also be obtained using the autofinding process described above. In some embodiments, page data collection engine 416 is an example of scraping framework 214 of FIG. 2, which is configured to scrape profile data from profile pages on external sources 424.

Normalization engine 418 is configured to normalize the collected profile page data. In some embodiments, normalization engine 418 is an example of normalization engine 406. Normalization engine 418, for example, uses normalizers and/or normalization rules defined in metadata ruleset 428 to normalize various attributes of location data found on external sources.

Comparison engine 420 is configured to determine matches and/or mismatches between provided reference listing data and business profile data. In some embodiments, what is determined to be a match and/or mismatch is configured according to metadata ruleset 428, which includes rules for defining matching. In some embodiments, the matching is performed by comparing the normalized versions of provided reference listing data and business profile data (where location attribute data in the provided reference location data and the collected business profile data are normalized in the same manner). By comparing normalized versions of attribute values, a piece of provided reference data can be determined to be a match to collected business profile data, even if the original values for the provided reference data and the collected business profile data are not exactly the same. Various listing attributes for a location can be audited, such as name, phone number, address, website, categories, business hours, etc.

In some embodiments, auditing includes performing smart or fuzzy matching, where provided reference and collected location or listing data can be determined as a match even if the pieces of provided and collected location data are not exact matches. Thus, exact matches need not be required (and often may not be possible) to determine that information on a profile page of a source is valid or correct.

As will be described in further detail below, in some embodiments, matches that are smart or fuzzy matches are flagged by platform 102 and can be presented to users. The users then have an option of rejecting smart or fuzzy matches. In some embodiments, the rejected values will remain rejected after subsequent audits. For example, if a smart match determined a provided name and a collected name to be the same, but the user rejected the smart match, in a subsequent audit (e.g., where audits can be performed periodically), even if the provided name and collected name are again determined to be a smart match, the smart match will be automatically rejected based on the user's previous manual rejection. The provided and collected names will not be presented to the user as a smart match after the subsequent audit.

In some embodiments, the matching logic implemented using comparison engine 420 is configured to utilize normalizers and fuzzy-matching algorithms. For example, name matching, which utilizes the same logic as described above in conjunction with autofind, can be used, including matching of permutations of people's names. As one example, the name "J. S. Franklin" can be fuzzy matched to "John Smith Franklin" using the name normalization and name matching (also referred to herein as "entity extraction") techniques described in further detail below.

Fuzzy matching of phone numbers can be performed. As one example, phone matching can be used to identify "tracking" numbers, which include toll-free numbers used by listing sites to track a call to a business. For example, rather than listing a business's actual phone number on their page, a listing site instead lists a tracking number for the business that is controlled by the listing site. When a person calls the tracking number, the call is forwarded to the business, and an indication is provided to the listing site that a call was made to the business. This allows the listing site to track the number of people that called the business by tracking the number of calls made to the tracking number listed for the business on the listing site. When performing a comparison of location data on the listing site using tracking numbers, a rule for the listing site (source) can specify that a difference in the tracking number with the business's actual phone numbers is not a mismatch (as the tracking number will never match the actual phone number of the business, and the tracking number is not necessarily a wrong number). In such a scenario, a rule can be configured to determine that the business's number and the tracking number is a fuzzy match. In some embodiments, a user is provided a UI that indicates that the tracking number was determined to be correct based on a fuzzy match of the tracking number to the business provided number. An option to revert the determination of the match can also be provided.

Fuzzy matching of addresses can also be performed. In some embodiments, address matching uses different normalizers based on the country specified in an address.

In some embodiments, users can accept unmatched simple and complex values, which will be considered as matches in future audits.

In some embodiments, when performing matching, multiple values in a field can match against a single value for an audit to be successful. As one example, provided and collected categories can be determined to match if a subset of the provided and collected categories matches. For example, different review sites may have their own categories used in classifying the same business. These review site categories may be different from how the business categorizes itself in the listing (e.g., as indicated in provided reference location or listing data). As one example, suppose that three reference categories are provided for a location. A source being audited has only two matching categories. As long as the collected source categories match to reference categories, then a match on the attribute of categories is determined.

In some embodiments, values which are inconsistent on various listing sites, such as categories, are mapped to consistent representations internal to platform 102 for matching and auditing purposes.

For example, in some embodiments, platform 102 maintains/stores an internal set of category mappings. The category mappings include mappings of categories on sources to a reference set of categories. For example, suppose that the mapping includes a list of 2000 internal canonical categories that can be used to categorize businesses. A category on a source, for example, a Google category, is then mapped to one of the internal, canonical categories. In some embodiments, the mapping is specified using category codes. Categories with different names on different sources can be indicated as being the same if they are assigned the same canonical or definitive category code. For example, the category "amateur sports" on one source can be considered equivalent to the category "sports and recreational training" on another source if they are both assigned the same category code (e.g., corresponding to the internal category "sports").

The mapping can also be used to export categories. Exporting will be described in further detail below. For example, suppose that a business specifies itself as being under the "active" internal category. The business would like to export this category to Google. Google may not have an exact "active" category, but may have an equivalent, which is specified in the internal mapping stored by platform 102. For example, the internal mapping can indicate that the internal "active" category maps to the "sports" category on Google. Thus, when exporting the business category from the listing to Google, the equivalent category for the source is exported based on the mapping.

This mapping allows platform 102 to determine whether a category specified on a source for a business matches to a category provided by the business.

In some embodiments, for each listing field or attribute being audited, a status is generated based on the comparison. In one example embodiment, the statuses include "correct," "incorrect," and "missing." For example, if a match (fuzzy or exact) is found on a particular listing field, then that field is designated as "correct." If the value on a location profile page does not match to its corresponding reference value, then it is designated as "incorrect." If a value for an attribute was not found, then the attribute is designated as "missing." For example, if a value for an attribute is expected to be listed on the source (e.g., according to source definition), but was not, then the attribute value is designated as "missing."

Scoring engine 422 is configured to generate a score for an audit. In some embodiments, each listing metadata or field or attribute whose values are audited is assigned a score based on the comparison described above. In some embodiments, the score assigned to an attribute is based on the designation of whether the value for the attribute on the location profile was correct, incorrect, or missing. The score assigned to each field, in some embodiments, is defined in metadata rules (e.g., in metadata ruleset 428). For example, each listing metadata/field that is audited is assigned a scoring weight. For example, name and phone number can be assigned weights indicating that they are more important than other fields. In some embodiments, the metadata rules include the name of the field along with associated rules for the field with that name, such as how to score the field (along with other rules as described herein for normalizing the field, identifying what sources have that field, what sources will data for the field be exported to, etc.).

In some embodiments, the scores of the audits for an entity's listing (document) are combined to generate a score for the entity's listing. For example, the score of the listing is the average of the scores of the audits (across various sources) for the listing. In some embodiments, users can choose to exclude specific audits from an overall score. The audit data can still remain available for viewing.

One example of an audit score is a percentage correct score for the location profile page being audited (i.e., what percentage of the data on the location profile page at the source is correct (or matches) to the reference listing data). For example, the percentage correct score is generated by summing up all of the points assigned to the fields and dividing the summed points by the total number of possible points. Suppose, for example, that there are two fields being audited, name and physical address, where a match for each field is worth 0.5 points. Thus, the total number of possible points is one. If only the name matches, then a score of 0.5 points is generated. The percentage complete overall score is then 50%. As will be described in further detail below, the overall scores for the sources, as well as the individual scores for individual fields on a source can be presented via a user interface.

In some embodiments, an overall audit score for a location across audits of all sources is computed. For example, the audit scores for individual audits (for each source) are averaged together.

In some embodiments, the results of audits are stored in audit objects/documents in database 412 of platform 102 of FIG. 4. Examples of a data model for an audit document and an audit document are described in further detail below.

In some embodiments, the comparison and scoring of metadata fields or attributes is based on rules defined in metadata ruleset 428. As one example of a site-specific rule, suppose that a review site does not support listing business's websites. The ruleset for this site can be configured to disregard the missing website, and not indicate to the user that the business's website is missing on the review site (because it cannot be added). In some embodiments, the ruleset is able to determine that the review site does not support having a website because it is indicated in the source definition for the review site.

In some embodiments, rules in metadata ruleset 428 control or otherwise determine which location attributes or metadata is audited for each external source.

The results of audits can be presented in reports to users such as Alice. For example, interfaces (e.g., graphical user interfaces (GUIs)) that include a summary of the audits for locations can be presented. The reports can include summaries at various levels of granularities (e.g., all locations summary, single location summary, etc.). Detailed reports for individual locations can also be presented. Examples of interfaces for viewing location summary and detail reports are described below in conjunction with FIGS. 6A-6C.

Reports can also be generated for sources as well. For example, summary views of sources (e.g., where all locations are aggregated by source), detailed summaries of sources (e.g., data for a source and all locations), etc. can be presented to users. Examples of interfaces for viewing source summary and source summary detail reports are described below in conjunction with FIGS. 7A-7B.

In some embodiments, reports are also generated based on rules specified in metadata ruleset 428. What is shown can depend on the industry of a business as well as the source which is being audited. For example, different sources may support different attributes, and thus different fields may be displayed in the UI.

As one example, a report can be configured to display the results of audits of the business's profiles on various review sites. For example, suppose that a business has multiple locations. An overview page can be provided as output that displays the percentage of locations that have been found to have incorrect information based on audits. The locations can also be ranked based on the percentage of mismatch or amount of incorrect data.

Reports can also be provided on a per-location basis. For example, for a given location, all of the sites for which URLs are available for the location are presented. Each site can be associated with a corresponding measure that is indicative of the percentage of data on the site that is correct (i.e., that matches to the tenant-provided reference location or listing data). Further details about a particular site can also be viewed. For example, a report can display the elements that were corrected. The report can also display the elements that are missing on a profile (e.g., that the website for a business is missing from its Yelp profile). Options to accept or revert changes proposed by platform 102 can also be provided. For example, if the user is notified that the business's website is missing on a particular review site, the user can be provided an option that allows them to elect to accept that the business's website is missing on their page on the review site.

In some embodiments, if a missing or invalid or mismatched value is accepted, the accepted value is treated as correct, and the score for the audit is updated with the missing or invalid value that has now been accepted as correct. For example, if the auditing determined that there was a mismatch in one of the listing attributes, but the user decided to accept the mismatch, then the element is considered as a match, and given a score reflective of a match. This can increase the percentage match score calculated for the review site. Thus, the scores for sources can change based on whether users accept or reject the results of the audit.

If a user indicates that they would like to "revert" accepted values, then the score for the attribute is reverted back to its original value.

In some embodiments, if a value on a source is fuzzy or smart matched, the value is "accepted," which allows users to "reject" the fuzzy or smart match. Once rejected, the match is no longer considered to be fuzzy or smart matched.

In some embodiments, the user's choices are recorded. For example, suppose that the user accepts that a particular review site does not have the business's website listed, even though the review site supports websites. The user's decision to accept the missing website is recorded. When a subsequent audit is performed, platform 102 uses the user's previous acceptance of the missing website to automatically accept the missing website, and the website is therefore not considered as missing. For example, no output is to be displayed indicating that the website is missing on that particular review site. Also, the missing website does not count against the score for the review site.

In some embodiments, the user acceptance or rejection of matches (e.g., fuzzy matches) is performed on a per-source basis (e.g., a user can accept a fuzzy match for one source, but reject a fuzzy match for another source). The acceptances and rejections of the matches can also be recorded or stored on a per-source basis for a customer of platform 102.

Accepting the user's choices includes accepting the field value that the user has accepted. If, however, the value changes for a field that was previously accepted (i.e., the mismatch was accepted as okay/acceptable by the user for a previous value of the field), then the user is presented an indication in the UI that there is a mismatch.

Thus, the user's accepting or rejecting of prior auditing results influences the comparisons performed in future audits. If the user has accepted or rejected matches, then the values chosen by the user are maintained, otherwise the reference and collected listing field values are compared as described above.

In some embodiments, recommended fixes are provided for mismatches determined during the audit. In some embodiments, the recommended fix for the attribute on a location profile page is the corresponding reference listing data value provided by the tenant or customer of platform 102. The user is provided the option to accept the fix proposed in the audit. If the user selects the option to accept the proposed fix, the accepted data is used to fix the mismatch. In some embodiments, the accepted data value is then exported to the source of the location profile and used to update the location profile (e.g., instead of the value in the listing reference data). Exporting will be described in further detail below. In some embodiments, the user is also provided the option to opt out of fixing mismatches.

Exporting engine 426 is configured to perform exporting to fix data which failed audits, which includes generating files, calling APIs, etc. This allows the location profiles on sources to be updated with correct listing data. In some embodiments, exporting is performed according to per-source rules. Exporting by source can include exporting metadata values for specific sources by mapping fields to specific source fields, and mapping internal categories to source categories. In some embodiments, only valid data is exported. The valid data can include accepted data. As described above, the accepted data can include values that were determined to be mismatches to the reference listing data, but were nonetheless accepted (e.g., by a user) as correct.

In some embodiments, when performing exporting, exporting engine 426 is configured to obtain and evaluate the audits performed for an exported source. Values in the audits that have been accepted (e.g., by users) are exported. The listing document for the location is also evaluated, and the values in the listing document for the remaining attributes of the location profile page of the source are also exported. As one example, if for an audit for a Google URL, a user accepted a phone number in that audit that did not match to the phone number in the listing object (i.e., the user does not want the phone number on the Google URL to be changed), the accepted phone number is exported rather than the phone number in the listing object. This keeps the phone number listed on the Google URL the same. Thus, accepted values are exported. For other attributes, the listing values are exported.

In some embodiments, users can opt out (e.g., via a provided user interface) of exporting data to a source. For example, even if data on the review site is determined to be incorrect based on an audit, and the correct data can be exported to fix the error, the user can elect to opt out of exporting the correct information. Thus, platform 102 will take no action to export the correct data.

In some embodiments, the exporting supported by the listing service described herein is flexible, and the behavior for exporting any field can be customized as desired. The exporting can be controlled via metadata rules defined in metadata ruleset 428. For example, exporting rules (which can be specified or defined on a per-source basis) can control exporting of metadata and files (e.g., spreadsheet, comma separated value (CSV) exports), as well as exporting of data to external sources via application programming interfaces (APIs). For example, the metadata rules can be configured to control what information can be sent to different external sites (e.g., review sites, listing sites, etc.). The rules can also define how data is to be exported by a source. For example, some sources (e.g., listing sites, review sites, etc.), in order to accept the exported data, require fields to be in a specific format and/or order. As one example, one source may require phone numbers to be formatted as a single field, while another source may require that phone numbers be broken up into multiple fields. In some embodiments, the metadata rules are configured with knowledge of what data can be exported to a particular source (e.g., what attributes are supported for profiles on a given source).

As described above, only valid reference location data is used to "fix" profiles that have incorrect location data. What is determined as valid data that can be exported can be configured on a per-source basis. Consider, for example, NPI numbers. While a source such as Yelp does not support NPI numbers, other sources, such as WebMD do support NPI numbers. In the example of Yelp, even if the provided reference NPI number for a physician is invalid, because Yelp does not support NPI numbers, the reference NPI number will not be sent (and thus it does not matter whether the provided expected NPI number was valid or not since it cannot be exported). However, because WebMD supports NPI numbers, the provided reference NPI number must be valid before it can be exported to WebMD.

Thus, metadata ruleset 428 includes rules for exporters for different sources. As described above, the exporter rules define how data to be exported to a particular source is to be formatted (including headers, ordering of data, etc.) as well as what listing attribute data is supported by the particular source (and can be exported to the particular source). In some embodiments, new exporters can be added for additional sources by modifying exporter rules (without having to modify code for executing exporter rules). In some embodiments, a special source can be implemented that is in a format internal to platform 102.

The following is an example in which a metadata ruleset controls auditing behavior with respect to NPI fields. In this example, the rule applies only to locations that are in certain industries, such as healthcare. The rule specifies the order in which fields, such as the NPI field, are to be displayed. The rules also include an NPI validator, which applies to various sources. In some embodiments, the validity of an NPI number can be determined according to a mathematical formula, which is an industry standard. The rules also include exporter rules. For example, the rules can specify all of the sources that expect an NPI number to be in exported data. The rules also indicate whether the sources require the NPI number or if they simply wish to have it or will accept it. For example, if it is true that the NPI number is required for a given source (e.g., specified using a Boolean logic value, where required=true), then the NPI number will be exported.

In some embodiments, exporting is performed automatically. Exporting can be performed on a periodic basis (e.g., monthly). Exporting can also be performed on an on-demand basis (e.g., in response to a user request to perform auditing and exporting). Exporting can also be performed automatically (e.g. after listing reference data is modified, or when the data on the source site changes). Complete exports can also be performed. Incremental exports can also be performed, where only the data that has changed is exported to sources.

Figure 5A:
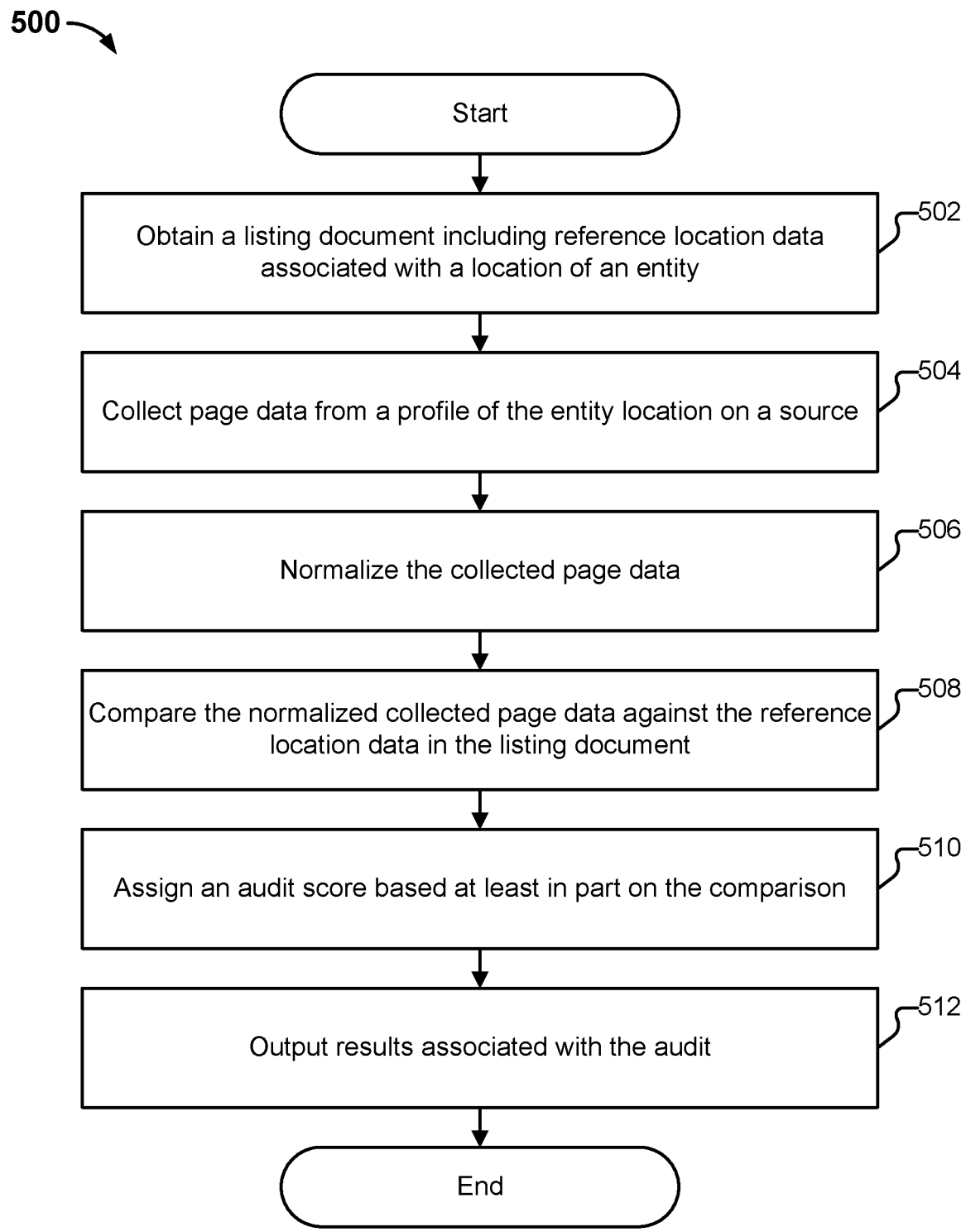
FIG. 5A is a flow diagram illustrating an embodiment of a process for auditing a business listing.

FIG. 5A is a flow diagram illustrating an embodiment of a process for auditing a business listing. In some embodiments, process 500 is executed by platform 102 of FIG. 4. The process begins at 502 when a listing document including reference location or listing data associated with a location of an entity is obtained. In some embodiments, the listing document includes tenant-provided reference or expected data values for listing attributes of a location of the tenant, where the values have been normalized and validated. A process for generating a listing document is described below in conjunction with FIG. 5B. The reference location data can be used, as will be described below, to audit the profiles of the entity location on various sources, for example, by comparing the reference location or listing data (i.e., source of valid information for the entity location) to the data on business listing websites.

At 504, page data from a profile of the location on a source is collected. For example, the profile page for the location on a source such as a review or listing site is accessed, and data on the profile page is obtained. In some embodiments, the page data is collected by scraping the page, or by invoking APIs provided by the source sites. In some embodiments, the identifier (e.g., URL) of the profile page is user-provided. In other embodiments, the URLs or links to the profile page are automatically obtained, for example, using the autofinding process described above.

In various embodiments, the collected page data includes data values for location attributes such as name, phone number, physical address, website, associated categories, etc. In some embodiments, the collected page data includes values for industry specific attributes (e.g., office/practice name for doctors).

At 506, the collected page data is normalized. For example, each collected value for a listing attribute is normalized to a standard form. In some embodiments, each attribute is associated with a corresponding normalizer, which includes rules that specify how values for that attribute are normalized. The normalizers can include name normalizers, phone number normalizers, physical address normalizers, website normalizers, etc. Normalizers for industry specific attributes can also be established. The normalizers can include internal (to platform 102) as well as external third party normalizers.

At 508, the normalized collected page data is compared against the reference listing or location data in the listing document. The comparison is performed to determine the validity of the data on the profile page. In some embodiments, an attribute by attribute comparison of the data values is performed. For example, the reference location name provided by the tenant is compared against the collected name of the location listed on the profile page. In some embodiments, the comparison includes determining a match, where the match can include a fuzzy match. In some embodiments, an attribute is designated a particular status based on the comparison. In various embodiments, the status includes correct, incorrect, and missing.

At 510, an audit score is assigned based at least in part on the comparison. For example, each attribute for which values were compared is assigned a score based on the comparison for that attribute. In some embodiments, some attributes are weighted more or less than others, which can be indicative of the relative importance of the attribute. In some embodiments, each attribute or field has a different score that is defined in metadata rules.

A total audit score for the profile page of the location is assigned to the profile page by combining the individual attribute scores. In some embodiments, the total audit score for the profile page is a measure indicative of the percentage of the profile page data that was correct. In some embodiments, the scores for audits across multiple profile pages on various sources can be combined to generate an overall audit score for the location.

At 512, results of the audit are outputted. In one embodiment, the results of the audit are provided to a user in one or more reports that are rendered or displayed in a graphical user interface. Various types of reports can be presented. For example, a summary report for all locations of a tenant can be presented. Summaries for individual locations can also be viewed. As another example, details of individual audits for a given location can be viewed. Summary views of sources can also be presented at various levels or granularities. The matches and mismatches that were determined as part of the audit can be presented to the user. Options for taking action with respect to the matching results can also be provided. For example, a user can be provided an option to reject fuzzy matches. As another example, a user can be provided an option to accept mismatches as correct. In some embodiments, a user is presented with an option to opt out of taking an action with respect to a match or mismatch, where no further action (such as exporting) is taken.

In some embodiments, accepted data is exported to the source. The exported data is used to replace or fix data that was determined to be incorrect or invalid on the profile page for the location on the source. In some embodiments, data values from the audit accepted by a user are exported to the source. The values for other attributes to be fixed via exporting can be obtained from the listing document for the location (which contains reference or expected listing data). In some embodiments, exporting the "correct" or "accepted" values includes generating a file or set of files such as a spreadsheet, comma separated values (CSV) file, or any other type of file or set of files. The generated file or set of files is then exported to the source (e.g., using an application programming interface (API), email, or any other communication channel, as appropriate).

In some embodiments, exporting is performed on-demand, for example, when a user elects to export accepted values to determined mismatches or missing attribute values. Exporting can also be performed automatically in response to performed audits, which can also be performed periodically. For example, the auditing can be performed on a weekly or monthly basis (or any other time driven basis, as appropriate). Exporting of values can be performed incrementally, where only changed data is exported. Complete exporting of all attribute values can also be performed.

In some embodiments, the results of the audit of the location profile on a source are stored to an audit object. An example data model of an audit object is described in further detail below.

Figure 5B:
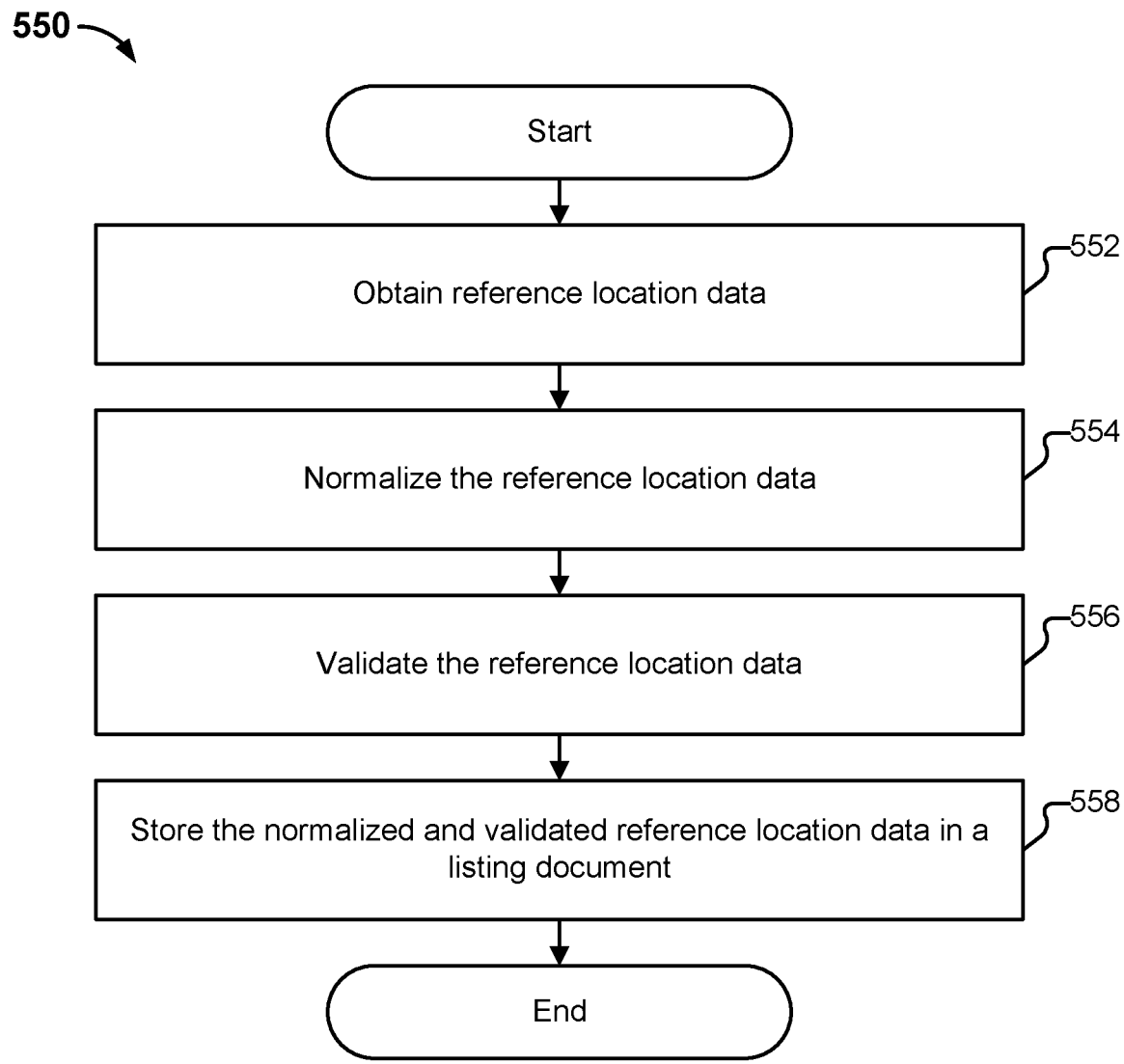
FIG. 5B is a flow diagram illustrating an embodiment of a process for generating a listing document.

FIG. 5B is a flow diagram illustrating an embodiment of a process for generating a listing document. In some embodiments, process 550 is executed by platform 102 of FIG. 4. The process begins at 552 when reference listing or location data is obtained. For example, a tenant of platform 102 provides the expected values for attributes of tenant locations. For example, for a given location of the tenant, the expected or reference values for the name, phone number, physical address, website, etc. of the location are provided. The location data can be provided via a user interface where a user is prompted to enter the expected values in fields of the interface. In other embodiments, the expected or reference location data is uploaded to platform 102 in a file or set of files such as a spreadsheet or comma separated values (CSV) file.

At 554, the obtained reference listing or location data is normalized. In some embodiments, each reference location attribute value is normalized. An attribute value is normalized into a standard form based on per-attribute normalizer rules. Examples of normalizer rules include normalizer rules for name, phone number, physical address, website, etc. attributes.

At 556, the obtained reference listing or location data is validated. The provided expected or reference location data is validated to determine whether there are any issues with the provided data, such as whether data for any attributes is missing, whether an attribute value is valid for the corresponding type of attribute, etc. For example, it can be determined whether a provided phone number is a valid phone number (e.g., includes an appropriate number of digits). In some embodiments, each attribute is associated with corresponding validation rules (i.e., validation rules can be specified for each attribute).

At 558, the normalized and validated reference listing or location data is stored in a listing document or object. The listing document or object can be used when performing audits, for example, in process 500 of FIG. 5A.

FIG. 6A illustrates an example embodiment of an all locations summary. In this example, each of locations 602 corresponds to a doctor, where there are 697 locations with complete profiles. A percentage correct for each doctor is shown (604), as well as when the last audit for the location was performed. Also shown are overall statistics for all locations (606), such as the percentage of locations that are mostly correct and the locations that are incorrect (608).

FIG. 6B illustrates an example embodiment of a single location summary. In this example, the first location of FIG. 6A, "Clarence Holt," has been selected. The sources for which Clarence Holt has a location profile are shown (632). The individual audit scores for each individual audit of a source are shown at 634. In some embodiments, the overall percentage correct for Clarence Holt shown in FIG. 6A at 636 is generated by combining (e.g., averaging) the percentage correct of the individual source audits. In some embodiments, the percentage correct is an example of an overall audit score as described above. In the example shown at 638 is a menu option that allows certain sources to be opted out as part of the audit. Also shown in this example is a count of the listings that are mostly correct (640) and the number of listings that are incorrect (642). In some embodiments, the determination of whether a listing is (mostly) correct or incorrect is based on a threshold audit score. Those audits whose scores exceed (or meet) the threshold are designated as correct, while those audits whose scores fall below the threshold are designated as incorrect.

FIG. 6C illustrates an example embodiment of a single location detail view. For example, details of the audit of Clarence Holt's profile on the site "Rank Health" are shown. In some embodiments, the interface of FIG. 6C is presented or displayed or rendered in response to a user selecting the first source (corresponding to Rank Health) in the list of sources shown in the example interface of FIG. 6B. As shown in this example at 662, a user can "accept" missing or invalid values. As described above, if the value is accepted, the accepted value is treated as correct and the audit scores are updated accordingly to reflect that the value, previously missing or invalid, is now treated as correct.

In the example shown, a user can "revert" accepted values at 664.

In the example shown, if a value is matched fuzzily, the value is designated as "accepted" by default, which allows users to also "reject" or "revert" the fuzzy match. Once rejected or reverted, the value is no longer treated as a fuzzy match.

FIG. 7A illustrates an example embodiment of a source summary view. In the example shown, all locations are aggregated by source. For example, for the same 697 locations shown in FIG. 6A, the number of listings that are mostly correct (702) and the number of listings that are incorrect (704) for each source that is audited are shown. An overall indication of the total number of locations that are mostly correct is shown at 706, while an overall indication of the total number of locations that are incorrect is shown at 708.

FIG. 7B illustrates an example embodiment of a source summary detail. In this example, data for a specific source and all locations that have profiles on the source are shown. For example, a specific source "Rank Health" is selected from the example interface of FIG. 7A. Results of the audits of Rank Health profiles for each of the 697 doctor locations are shown. For each Rank Health profile of a doctor, a corresponding percentage correct (audit score) is shown (722).

Thus, as illustrated in the example interfaces of FIGS. 6A-6C and 7A-7B, different views of audit results can be presented to users.

Example Data Models

The following is an example of data models associated with a listing service such as that provided by platform 102 of FIG. 4. Shown in the example data models below are a data model for an audit object, a data model of a listing object, and listing field definitions. Examples of audit and listing objects based on the example data models are described in further detail below.

Audits:
id
location_id
source_id
field_audits
   field_id
   status
   state
   value (complex value object)
      string_value
      list_string—list of string values
      address
      business_hours—list of business hours
   error_message
score
opted_out
Listing:
id
opted_out
complete
tenant_id
location_id
listing_fields—map of field id to field
   value (complex value object)
      string_value
      list_string—list of string values
      address
      business_hours—list of business hours
   validation_errors
last_audited
last_exported—map of source id to last export date
aggregate_audit_score—sum of the scores of all of the audits for this listing
num_expected_audits—number of audits expected to have scores for this listing
last_updated—most recent time the listing fields were updated or listing was marked complete or opted out
valid
external_ids—map of source name to id
Listing field definition:
id
name
order—order in which fields should be displayed
industries—list of industries
display_groupings—how the fields are grouped in UI
scores—scores by industry for each field
importer—listing field importer
import_headers—headers for import
hidden—whether the field is hidden
exporters—exporters for the field
validators—validators for the field
normalizer—normalizer for the value
auditors—auditors for the value
Additional Business Listing Details
Example Industry-Specific Fields
The following are examples of industry-specific listing fields:
FIRST_NAME: in some embodiments, used only for medical professionals
MIDDLE_NAME: in some embodiments, used only for medical professionals
LAST_NAME: in some embodiments, used only for medical professionals
NPI: in some embodiments, used only for medical professionals
OFFICE_NAME: in some embodiments, used only for medical professionals TITLES: in some embodiments, used only for medical professionals PHONE_SERVICE: in some embodiments, used only for automotive locations (e.g., car dealerships, repair shops, etc.)

PHONE_SALES: only for automotive locations

PHONE_PARTS: only for automotive locations

Metadata Ruleset

The following is an example metadata rule that defines a listing field called "PHONE_MAIN," which, in some embodiments, is used to store the main/primary phone number for a listing. In some embodiments, the below metadata ruleset is an example of metadata ruleset 428 of platform 102 of FIG. 4.

In some embodiments, the first several lines are for the user interface (UI): In some embodiments, they contain the display name, order, and grouping, which, in some embodiments, determine where the field is placed in various UI elements.

In this example, this field has a score of 0.25 and it applies to all industries. In this example, it is wired to the PhoneNormalizer and PhoneValidator Java class.

In some embodiments, the field is audited for all sources, so the PhoneAuditor is wired in for all sources and industries.

In some embodiments, this field is exported for numerous sources. In some embodiments, the "exporters" field contains a map of source name to exporter rules, including the header, whether or not the phone number is required, and other special rules as needed. For example, the KNOWLEDGECAUCUS source does not export this field if the phone number does not match the specified regular expression "\\(8(00|88|77|66|55|44)\\)."

Example Field Definitions and Values id: the ID of the field displayName: the English name to show in the UI displayOrder: the order in which to display the field displayGroupings: which section of the onboarding form to display the field in industries: the industries this field pertains to scores: the score for this field in an audit, if correct, per industry importHeaders: acceptable header names for this field in an import CSV normalizer: the normalizer to use validators: the validator to use, per industry and source auditors: the auditors to use for this field, per source and then per industry exporters: rules controlling how to export this field, per source and then per industry

```
{
  "id": "PHONE_MAIN",
  "displayName": "Phone",
  "displayOrder": 9,
  "displayGroupings": {
    "DEFAULT": "Basic Listing Information"
  },
  "industries": ["DEFAULT"],
  "scores": {
    "DEFAULT": 0.25
  },
  "importHeaders": ["phone-main", "Main Phone"],
  "normalizer": {"@class":
"com.repplatform.listing.normalizer.PhoneNormalizer"},
  "validators": {
    "DEFAULT_SOURCE": {
      "DEFAULT": {"@class": "com.
repplatform.listing.validator.PhoneValidator", "required": true}
    }
  },
  "auditors": {
    "DEFAULT_SOURCE": {
      "DEFAULT": {"@class": "com.
repplatform.listing.auditor.PhoneAuditor"}
    }
  },
  "exporters": {
    "REPBIZ": {
      "DEFAULT": {"header": "phone-main", "@class":
"com.repplatform.listing.exporter.fieldExporter.SingleValueExporter"}
    },
    "IMPROVED_PHYSICIAN": {
      "DEFAULT": [{"header": "Phone Number", "required": true,
        "@class":
"com.repplatform.listing.exporter.fieldExporter.SingleValueExporter"}]
    },
    "PONG_LOCAL": {
      "DEFAULT": [{"header": "Main Phone", "order": 10, "required":
true, "@class":
"com.repplatform.listing.exporter.fieldExporter.SingleValueExporter"}]
    },
    "ROUND_CIRCLE": {
      "DEFAULT": [{"header": "Phone", "order": 10, "@class": "com.
repplatform.listing.exporter.fieldExporter.SingleValueExporter"}]
    },
    "YOUFIND_PLACES": {
      "DEFAULT": [{"header": "Primary phone", "order": 9, "required":
true, "@class":
"com.repplatform.listing.exporter.fieldExporter.SingleValueExporter"}]
    },
    "AUTO_REVIEWS": {
      "DEFAULT": [{"header": "Primary phone", "order": 9, "required":
true, "@class":
"com. . repplatform.listing.exporter.fieldExporter.SingleValueExporter"}]
    },
    "RANK_HEALTH": {
      "DEFAULT": [{"header": "Office Phone Number", "required":
true, "@class":
"com.repplatform.listing.exporter.fieldExporter.SingleValueExporter"}]
    },
    "KNOWLEDGECAUCUS": {
      "DEFAULT": [{"header": "Location Phone", "order": 11,
"exclusionRegex": "\\(8(00|88|77|66|55|44)\\)", "required": true, "@class":
"com.repplatform.listing.exporter.fieldExporter.SingleValueExporter"}]
    },
    "COMPARE!_HEALTH_CARE": {
      "DEFAULT": [{"header": "addr_phone", "@class":
"com.repplatform.listing.exporter.fieldExporter.SingleValueExporter"}]
    },
    "SIGNS": {
      "DEFAULT": [{"header": "addr_phone", "@class":
"com.repplatform.listing.exporter.fieldExporter.SingleValueExporter"}]
    },
    "NET_DOCS": {
      "DEFAULT": [{"header": "Office Phone", "order": 16, "required":
true, "@class":
"com.repplatform.listing.exporter.fieldExporter.SingleValueExporter"}]
    },
    "ACCURATE": {
      "DEFAULT": [{"header": "tel", "@class": "com.
repplatform.listing.exporter.fieldExporter.SingleValueExporter"}]
    }
  }
}
```

Example Metadata Rule

The following is an example metadata rule (e.g., included in metadata ruleset 428) for National Provider Identifier (NPI) numbers, which, in some embodiments, only pertain to certain industries. In some embodiments, these industries belong only to locations that represent physicians and other medical professionals. In some embodiments, this listing field is not audited, and only contains rules for validators and exporters.

```
{
    "id": "NPI",
    "displayName": "NPI",
    "displayOrder": 5,
    "displayGroupings": {
        "DEFAULT": "Basic Listing Information"
    },
    "industries": ["health-care-dentists", "health-care-physicians", "health-care-plastic-&-cosmetic-surgeons", "health-care-optometrist-&-opthamologist"],
    "scores": {
        "DEFAULT": 0
    },
    "importHeaders": ["npi"],
    "validators": {
        "DEFAULT_SOURCE": {
            "DEFAULT": "@class": "com.repplatform.listing.validator.NpiValidator", "required": true}
        }
    },
    "exporters": {
        "BUSINESSREP": {
            "DEFAULT": {"header":"npi", "@class": "com.repplatform.listing.exporter.fieldExporter.SingleValueExporter"}]
        },
        "IMPROVED_PHYSICIAN": {
            "DEFAULT": [{"header": "NPI Number", "required": true, "@class": "com.repplatform.listing.exporter.fieldExporter.SingleValueExporter"}]
        },
        "RANK_HEALTH": {
            "DEFAULT": [{"header": "NPI", "required": true, "@class": "com.repplatform.listing.exporter.fieldExporter.SingleValueExporter"}]
        },
        "COMPARE!_HEALTH_CARE": {
            "DEFAULT": [{"header": "npi", "required": true, "@class": "com.repplatform.listing.exporter.fieldExporter.SingleValueExporter"}]
        },
        "SIGNS": {
            "DEFAULT": [{"header": "npi", "required": true, "@class": "com.repplatform.listing.exporter.fieldExporter.SingleValueExporter"}]
        },
        "NETDOCS": {
            "DEFAULT": [{"header": "NPI", "order": 22, "required": true, "@class": "com.repplatform.listing.exporter.fieldExporter.SingleValueExporter"}]
        }
    }
}
```

Example Listing Object

The following is an example listing object. In some embodiments, the listing fields are stored by an identifier (ID), and they correspond to the ID of the listing field in the metadata rules.

```
{
    "_id' : ObjectId("12a34567b8c901d2e3f4ghi5"),
    "_class" : "com.repplatform.listing.domain.Listing",
    "o" : false,
    "c" : true,
    "tID" : 4365,
    "lID" : "4365_SB",
    "if" : {
        "BUSINESS_HOURS" : {
            "_class" : "com.repplatform.listing.domain.ListingField",
            "v" : {
                "b" : [
                    {
                        "dh" : [
                            {
                                "d" : 2,
                                "c" : false,
                                "tr" : [
                                    {
                                        "oh" : 0,
                                        "om" : 0,
                                        "ch" : 19,
                                        "cm" : 0
                                    }
                                ]
                            },
                            {
                                "d" : 3,
                                "c" : false,
                                "tr" : [
                                    {
                                        "oh" : 0,
                                        "om" : 0,
                                        "ch" : 19,
                                        "cm" : 0
                                    }
                                ]
                            },
                            {
                                "d" : 4,
                                "c" : false,
                                "tr" : [
                                    {
                                        "oh" : 0,
                                        "o" : 0,
                                        "ch" : 19,
                                        "cm" : 0
                                    }
                                ]
                            },
                            {
                                "d" : 5,
                                "c" : false,
                                "tr" : [
                                    {
                                        "oh" : 0,
                                        "om" : 0,
                                        "ch" : 19,
                                        "cm" : 0
                                    }
                                ]
                            },
                            {
                                "d" : 6,
                                "c" : false,
                                "tr" : [
                                    {
                                        "oh" : 0,
                                        "om" : 0,
                                        "ch" : 19,
                                        "cm" : 0
                                    }
                                ]
                            },
                            {
                                "d" : 7,
                                "c" : false,
                                "tr" : [
                                    {
                                        "oh" : 0,
                                        "om" : 0,
                                        "ch" : 19,
                                        "cm" : 0
                                    }
                                ]
                            },
```

```
        {
            "d" : 1,
            "c" : false,
            "tr" : [
                {
                    "oh" : 0,
                    "om" : 0,
                    "ch" : 0,
                    "cm" : 0
                }
            ]
        }
    ],
    "p" : false
    }
  ]
},
"LINK_TUBEWATCH" : {
    "_class" : "com.repplatform.listing.domain.ListingField"
},
"LINK_BIZNETWORK" : {
    "_class" : "com.repplatform.listing.domain.ListingField"
},
"PAYMENT_TYPES" : {
    "_class" : "com.repplatform.listing.domain.ListingField",
    "v" : {
        "ls" : [
            "CASH",
            "CREDIT_CARD"
        ]
    }
},
"LINK_YOUFACE" : {
    "_class" : "com.repplatform.listing.domain.ListingField",
    "v" : {
        "s" : "https ://www.youface.com/SuperBakery"
    }
},
"PHONE_ALTERNATIVE" : {
    "_class" : "com.repplatform.listing.domain.ListingField"
},
"DESCRIPTION_LONG" : {
    "_class" : "com.repplatform.listing.domain.ListingField"
},
"LINK_BOARDEM" : {
    "_class" : "com.repplatform.listing.domain.ListingField"
},
"PHONE_MOBILE" : {
    "_class" : "com.repplatform.listing.domain.ListingField"
},
"EMAIL" : {
    "_class" : "com.repplatform.listing.domain.ListingField"
},
"CATEGORIES" : {
    "_class" : "com.repplatform.listing.domain.ListingField",
    "v" : {
        "ls" : [
            "FOOD_BAKERIES"
        ]
    }
},
"NAME" : {
    "_class" : "com.repplatform.listing.domain.ListingField",
    "v" : {
        "s" : "Super Bakery"
    }
},
"WEB_URL" : {
    "_class" : "com.repplatform.listing.domain.ListingField",
    "v" : {
        "s" : "http ://www.superbakery.com"
    }
},
"LINK_CHATTER" : {
    "_class" : "com.repplatform.listing.domain.ListingField"
},
"LOCATION_CODE" : {
    "_class" : "com.repplatform.listing.domain.ListingField",
    "v" : {
        "s" : "SB"
    }
},
"ADDRESS" : {
    "_class" : "com.repplatform.listing.domain.ListingField",
    "v" : {
        "a" : {
            "streetAddress" : "123 Stockton Avenue",
            "locality" : "San Jose",
            "region" : "CA",
            "postalCode" : "95123",
            "country" : "US",
            "latitude" : 43.1234567,
            "longitude" : -156.2345678
        }
    }
},
"PHONE_MAIN" : {
    "_class" : "com.repplatform.listing.domain.ListingField",
    "v" : {
        "s" : "(555) 123-4567"
    }
},
"PHONE_FAX" : {
    "_class" : "com.repplatform.listing.domain.ListingField"
},
"PHOTOS" : {
    "_class" : "com.repplatform.listing.domain.ListingField"
},
"DESCRIPTION_SHORT" : {
    "_class" : "com.repplatform.listing.domain.ListingField",
    "v" : {
        "s" : "Super Bakery's Authentic Entremets Company has increased the range and variety of entremets available, including thinner entremets with more layers, with future plans to include oversize entremets with over 30 layers, plus we are open to our customers' suggestions and feedback."
    }
},
"la" : ISODate("2015-10-29T23 :5721.725Z"),
"as" : 6.947368421052637,
"ne" : 21,
"lu" : ISODate("2015-10-29T23 :57 :21.047Z"),
"v" : true,
"cDate" : ISODate("2015-08-17T165130.274Z"),
"cID" : 0,
"uDate" : ISODate("2015-10-29T23 :5721.729Z"),
"uID" : -1,
"rem" : false
}
```

Example Audit Object

The following is an example audit object. In some embodiments, the fields are stored in a manner similar to the way they are stored in the listing object, but, in some embodiments, they include a status ("s") and a state ("st").

In some embodiments, the status indicates whether or not they are believed to match, and the status stores information about whether the user has accepted or rejected the value.

```
{
    "_id" : ObjectId("55b1093be4b0885f781840ef"),
    "_class" : "com.repplatform.listing.domain.Audit",
    "tID" : 4365,
    "lID" : "4365_BR",
    "sID" : "MAUVE_SHEETS",
    "url" : "http://www.mauvesheets.com/san-city-ca/mip/bakery-rave-12345678lid=12345678",
```

```
-continued

"fa" : {
  "BUSINESS_HOURS" : {
    "fid" : "BUSINESS_HOURS",
    "s" : "Missing",
    "st" : "NONE"
  },
  "ADDRESS" : {
    "fid" : "ADDRESS",
    "s" : "Correct",
    "st" : "NONE",
    "v" : {
      "a" : {
        "streetAddress" : "123 Battery St",
        "locality" : "San City",
        "region" : "CA",
        "postalCode" : "94555",
        "latitude" : 0,
        "longitude" : 0
      }
    }
  },
  "PHONE_MAIN" : {
    "fid" : "PHONE_MAIN",
    "s" : "Correct",
    "st" : "NONE",
    "v" : {
      "s" : "(555) 777-6767"
    }
  },
  "DESCRIPTION_LONG": {
    "fid" : "DESCRIPTION_LONG",
    "s" : "Missing",
    "st" : "NONE"
  },
  "CATEGORIES" : {
    "fid" : "CATEGORIES",
    "s" : "Incorrect",
    "st" : "NONE",
    "v" :{
      "ls" : [
        "Bake Goods and Glow Sticks",
        "Dessert Party Restaurants"
      ]
    }
  },
  "NAME" : {
    "fid" : "NAME",
    "s" : "Correct",
    "st" : "AUTO_ACCEPTED",
    "v" : {
      "s" : "Bakery Rave"
    },
    "1" : "SMART_MATCH"
  },
  "WEB_URL" : {
    "fid" : "WEB_URL",
    "s" : "Correct",
    "st" : "NONE",
    "v" : {
      "s" : "http://www.baskinrobbins.com"
    }
  }
},
"s" : 0.9,
"o" : false,
"cDate" : ISODate("2015-07-23T15:3315.052Z"),
"cID" : 0,
"uDate" : ISODate("2015-08-26T21:1635.576Z"),
"uID" : -1,
"rem" : true
}
```

Additional User Interface Examples

Figure 8:
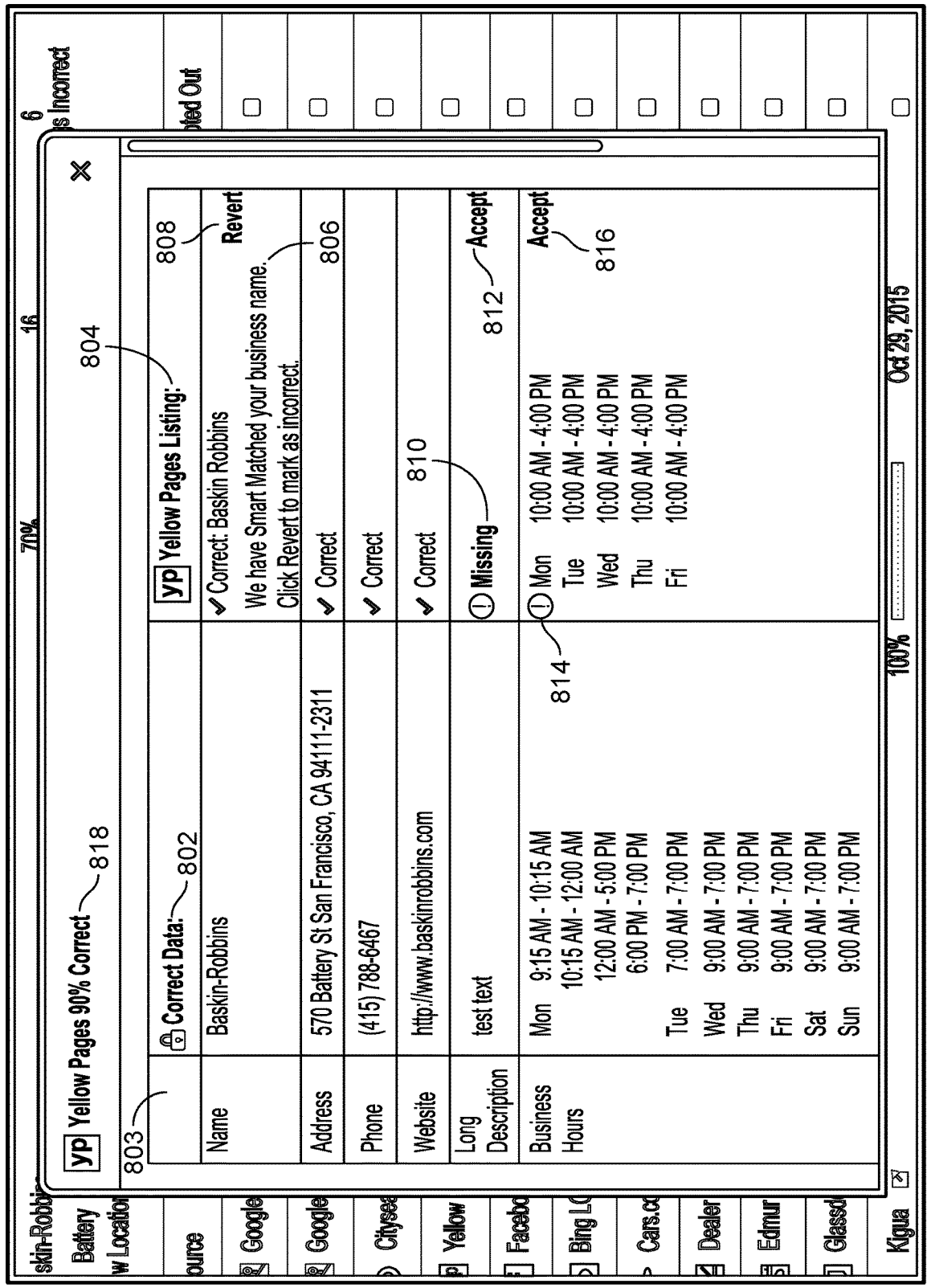
FIG. 8 illustrates an example embodiment of a user interface for audit reporting.

FIG. 8 illustrates an example embodiment of a user interface for audit reporting. In this example, a user interface displaying the results of an audit for a Baskin-Robbins location on the source Yellow Pages is shown. In some embodiments, the audit results shown in the example user interface of FIG. 8 are determined using process 500 of FIG. 5A. At 802, the "correct" or provided reference or expected values for the location attributes (803) are shown. For each attribute, an indication of whether the data on the Yellow Pages listing for the location matches or does not match is shown at 804. As shown in the example, the Yellow Pages listing has the correct data values for the attributes of address, phone, and website. The name value on the Yellow Pages listing has also been determined to be correct and a match to the provided reference value. At 806, an indication is shown that while correct, the match that was determined was a smart or fuzzy match, because the name listed on the Yellow Pages listing does not have a hyphen, whereas the reference or "correct" data does have a hyphen in the name. As the name is a smart match, an option to revert the audit's determination of the listing being correct is provided at 808.

At 810, the Yellow Pages listing is indicated as having a missing long description. An option is presented at 812 to accept the missing long description. At 814, a mismatch between the "correct" business hours and the hours listed on the Yellow Pages listing is also indicated. An option is presented at 816 to accept the mismatched hours.

A score for the audit (based on the comparison of the individual attributes) is shown at 818.

FIGS. 9A-9D illustrate example embodiments of user interfaces for obtaining location profile information. Users can use the interfaces shown to enter the expected values for location profile attributes. In some embodiments, interfaces 9A-9D are examples of interfaces used to capture reference location data for a location listing at 552 of process 550 of FIG. 5B.

FIGS. 10A-10D collectively illustrate an example embodiment of an exported comma separated values (CSV) file. As described above, the exported values are "correct" values for attributes of a location that are to be used to fix invalid or missing data on a profile page of the location on a source, as described above.

Normalization

Described below are further details regarding normalization of location or listing attribute values. In some embodiments, the techniques for normalization described below are utilized by normalization engine 220 of FIG. 2 and normalization engines 406 and 418 of FIG. 4.

As described above, normalization of location or listing data (either tenant-provided reference data or data collected from profile pages on various sources) is performed during both the autofinding process and auditing of business listings. In some embodiments, normalizers are configured in a metadata ruleset (e.g., metadata ruleset 428). In various embodiments, examples of normalizers include:

name normalizers
    phone number normalizers
    physical address normalizers
    category normalizers
    email normalizers
    payment type normalizers
    title normalizers
    web URL normalizers.

In some embodiments, third party services can be used to perform normalizing. For example, the following services can be used:

Address Normalization: Smarty Streets (https://smartystreets.com/) and the Google Geocoder API
    Phone Number Normalization: Google LibPhoneNumber (https://github.com/googlei18n/libphonenumber)

For the remaining normalizers, custom normalizers are written/utilized, such as the normalizers described herein to perform normalization of names.

In some embodiments, in a rule, the normalizers are specified by a "normalizer" key, such as the following:

```
{
  "id": "NAME",
  "displayName": "Name",
  "displayOrder": 1,
  "displayGroupings":
      "DEFAULT": "Basic Listing Information"
  },
  "industries": ["DEFAULT"],
  "scores":
      "DEFAULT": 0.25
  },
  "importHeaders": ["name", "Business Name"],
  "normalizer": {"@class": "com.reputation.listing.normalizer.NameNormalizer" },
```

Entity Extraction (Name Normalization and Name Matching)

Described below are example details regarding entity extraction, which includes name normalization and the matching of names. Using the normalization and matching techniques described herein, the names of various entities, such as individuals or businesses, can be fuzzy or smart matched, even if their original values are not exactly the same. As will be described in further detail below, name matching includes tokenizing names (e.g., splitting names into pieces), and comparing the tokens of the names against each other.

Figure 11:
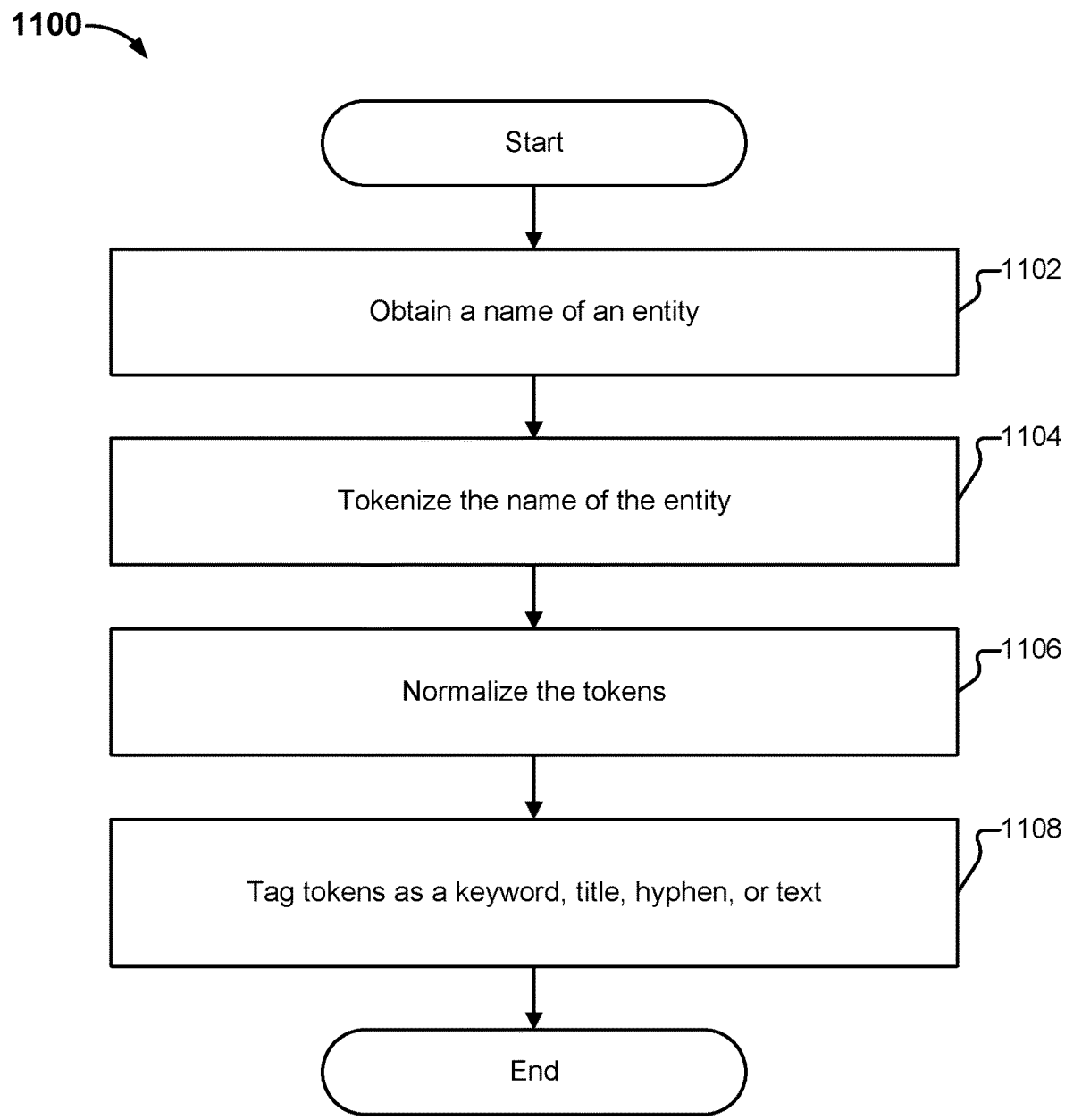
FIG. 11 is a flow diagram illustrating an embodiment of a process for entity extraction and name normalization.

FIG. 11 is a flow diagram illustrating an embodiment of a process for entity extraction (name normalization and matching). In some embodiments, process 1100 is executed by platform 102 of FIG. 1, FIG. 2, and FIG. 4. The process begins at 1102 when a name of an entity is received. For example, a reference listing or location name is obtained (e.g., by a tenant of platform 102 providing the expected name for a tenant location). As another example, a name collected from a page profile of a location is obtained (e.g., by scraping the page or as results of a query for the profile page).

At 1104, the obtained name is tokenized. In some embodiments, tokenizing the name of the entity includes splitting the name on certain breaker characters, such as white spaces and punctuation other than hyphens. In some embodiments, certain punctuation such as periods and commas are ignored. Other characters such as parentheses and brackets are also ignored. In some embodiments, special treatment of hyphens is performed. For example, if a hyphen is encountered or found in a name, then the two words immediately surrounding the hyphen are treated as two separate tokens. For example, the tokenization of the name "Dabskin-Bobpins" would result in the set of tokens [Dabskin, Bopbins] containing two tokens corresponding to the words surrounding the hyphen in the name.

At 1106, the tokens are normalized. As one example of token normalization, abbreviations are expanded (e.g., "dept" is expanded to "department, "ctr" is expanded to "center," etc.). In some embodiments, a mapping or list of abbreviations to equivalent full words is used to perform the expansion. In some embodiments, some abbreviations are ignored. As one example, for a law firm, the abbreviation "LLP" (Limited Liability Partnership) can be ignored. Other examples of abbreviations that can be dropped include "LLC," "INC," etc.

As another example of normalization, diacritics are removed (e.g., "a" is normalized to "a," "ñ" is normalized to "n," etc.). As one example, the Unicode character encoding is used, which allows for the removal of diacritics to obtain a basic character.

As another example of normalization, the characters in the tokens are converted to lowercase. As another example of normalization, stop words (e.g., "the," "and," 'a,' etc.) are removed (as their use may be inconsistent across sources, where, for example, some sources include a "the" but other sources may drop the "the"). Another example of normalization is one in which a tab, whitespace, or new line is placed in the middle of a person's name.

At 1108, the tokens are tagged. The tokens can be tagged as either KEYWORD (e.g., if it matches a list of predefined keywords), TITLE (e.g., professional title belonging to a person), HYPHEN, or TEXT. In some embodiments, if a token is tagged as a KEYWORD, pointers to matching keyword rules are added to a key word definition. [

One example of a matching keyword rule is as follows:
Matches: "Mercedes", "Mercedes-Benz", "Mercedes"
Critical: true In the above example, the first field contains a list of words the keyword will match. The second field, "critical," determines the importance of the keyword for matching. In some embodiments, when matching two names, at least one of the critical keywords must match. Keyword matching rules can be defined in source code.

In some embodiments, a mapping of keywords and their equivalents are used to identify tokens in names that are keywords. The keywords can include multiple words or tokens. For example, a sub-string match can be tagged as a keyword. The keywords can include specialized business keywords. As one example, the word "dentist" can be treated as a keyword which is also mapped to the equivalent keyword "dentistry." As another example, the keywords "realtor" and "realtors" can be mapped to each other as equivalents.

As another example, suppose that an auto brand is named "Mondaro-Frenz." This can be treated as a keyword that is also equivalent to "Mondaro" and "Mondaro Frenz" (no hyphen). If these keywords are encountered in names being compared, they are treated as equivalent or a match based on the keyword mapping. Thus, such mappings of keywords can be used to account for the different ways the same business may be named (e.g., on different sources). An example of a list of keywords and their equivalents is provided below.

In some embodiments, every token has exactly one tag. In some embodiments, the above tags are enumerated in order of precedence (e.g., KEYWORD then TITLE then HYPHEN then TEXT in descending precedence). If more than one tag can be applied to a token, then the tag with the highest precedence is assigned to the token.

In some embodiments, a set of tokens representative of the name is provided as output. As will be described in further detail below, in some embodiments, when determining whether two names match, a comparison of token sets generated using process 1100 that represent the names to be compared is performed.

Figure 12A:
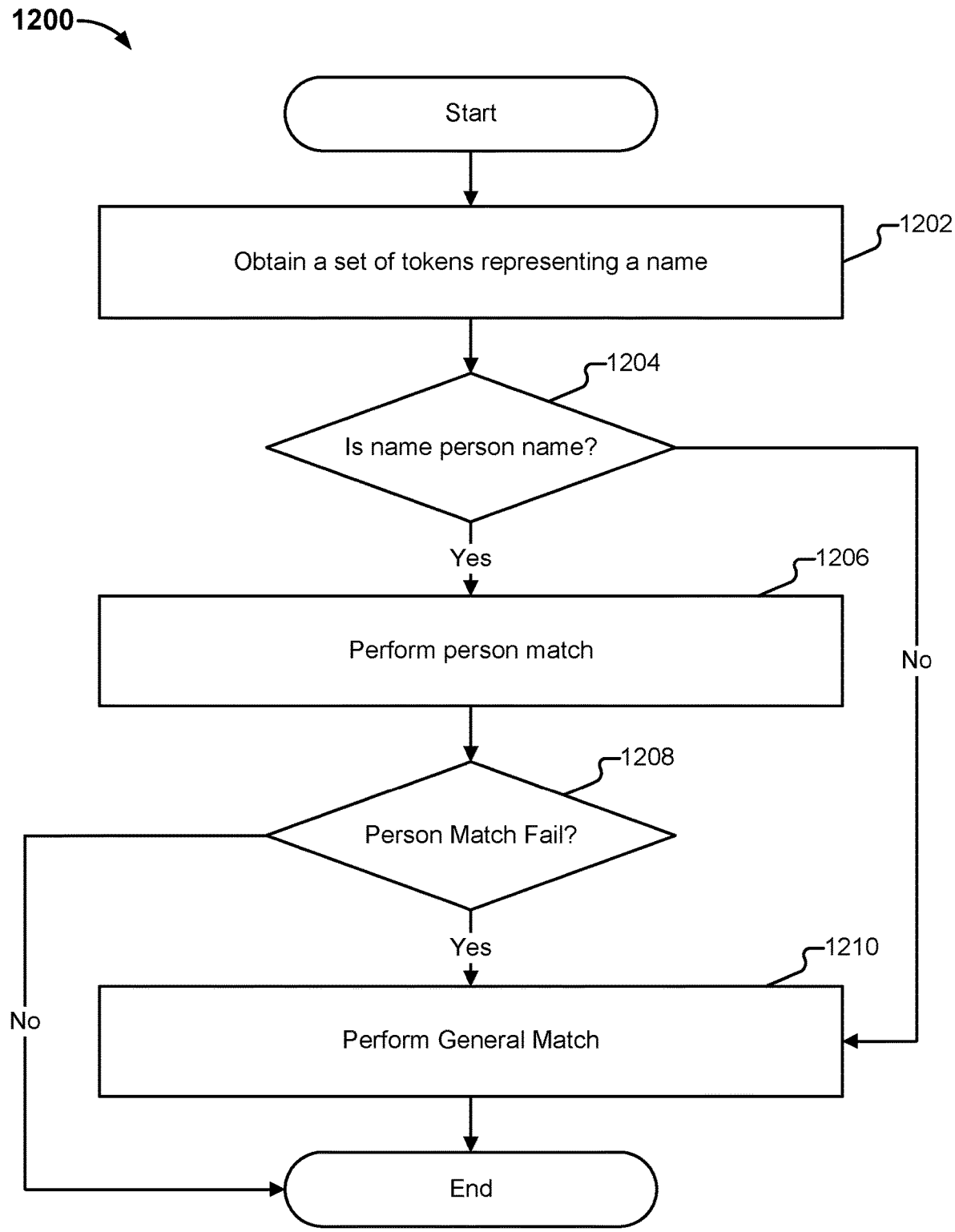
FIG. 12A is a flow diagram illustrating an embodiment of a process for matching names.

FIG. 12A is a flow diagram illustrating an embodiment of a process for matching names. In some embodiments, process 1200 is executed by platform 102 of FIG. 1, FIG. 2, and FIG. 4. The process begins at 1202 when a set of tokens representing a name on which a match is to be determined (e.g., with another name as part of autofinding and/or auditing of listings as described above) is obtained. In some embodiments, the obtained set of tokens is generated using process 1100 of FIG. 11.

At 1204, it is determined whether the name represented by the set of tokens is the name of the person. In some embodiments, determining whether the name represented by the set of tokens is the name of the person includes determining whether the set of tokens representing the name contains a token tagged as TITLE. If a token tagged as TITLE is included in the set of tokens representing the name (i.e., the presence of a title is detected), then the name is determined to be a person's name, and the process continues to 1206, where a person match is attempted or performed. As another example, if a location is assigned certain industries, such as physician, dentist, optometrist, etc. (e.g., industries representative of individuals/persons), it is determined that the name is a person's name. If the name is not determined to be a person's name, then the process continues to 1210, where a general name match is attempted or performed. For example, if the set of tokens contains titles associated with people (e.g., mrs., mr., dr., esq., dds., etc.), then the name can be identified as a person's or individual's name. Matching rules for performing person name matching can then be obtained (e.g., from metadata ruleset 428 of FIG. 4).

At 1206, a person match is performed. An example process for performing a person match is described in further detail below in conjunction with FIG. 12B. At 1208, if the person match fails, then the process continues to 1210. If the person match is a success, then a match to another name (e.g., represented by a corresponding set of tokens, for example, generated using process 1100 of FIG. 11) has been found and the process ends.

At 1210, a general name match is performed. An example process for performing a general name match is described in further detail below in conjunction with FIG. 12C. In some embodiments, if a general name match is not found, then a person name match is performed to determine whether a match using the person name matching can be identified (even if the name was not determined to be a person's name at 1204). Similarly, if a name being matched is determined to be a person's name, but no match is found, a general name match can be performed. If a match between names is found with either the person name matching or general name matching, the names are determined to match.

As described above, name normalization and matching is one example of an attribute for which normalization and matching is performed. While it may be possible for the names of two different entities to match, they are less likely to also match on multiple other elements, such as address and phone number, where match scores reflect how well locations and listings match to profile pages based on the aggregate comparison of various combinations of multiple elements.

Person Name Match

Figure 12B:
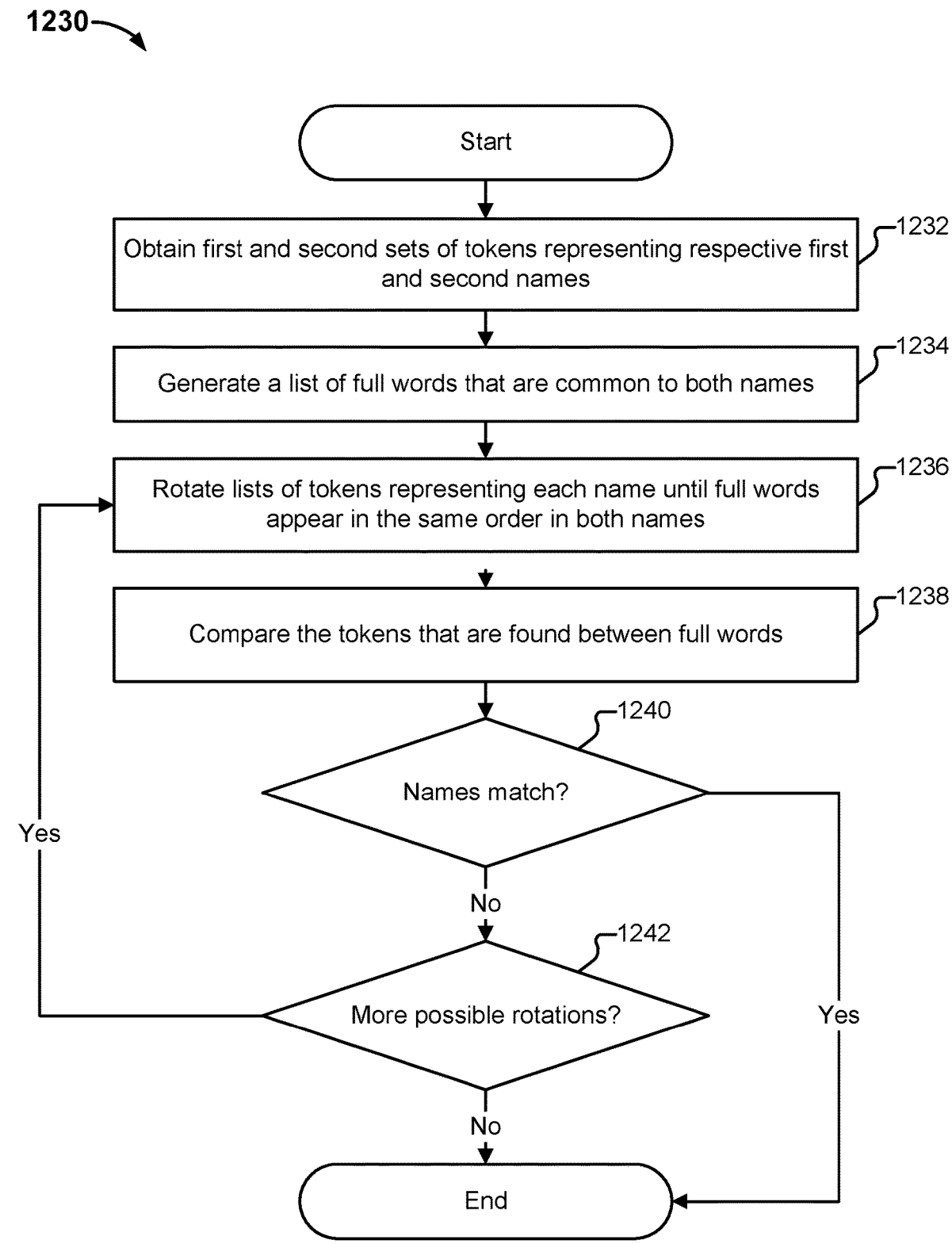
FIG. 12B is a flow diagram illustrating an embodiment of a process for person name matching.

FIG. 12B is a flow diagram illustrating an embodiment of a process for person name matching. In some embodiments, process 1230 is executed by platform 102 of FIG. 1, FIG. 2, and FIG. 4. In some embodiments, process 1230 is used to implement step 1206 of process 1200 of FIG. 12A. The process begins at 1232 when first and second sets of tokens representing respective first and second names are obtained. In some embodiments, the sets of tokens obtained at 1232 are generated using process 1100 of FIG. 11.

At 1234, the list of the full words (i.e., words longer than one letter) that are common to both names is built or generated. In some embodiments, titles and hyphens are ignored (e.g., in order to properly compare hyphenated surnames).

At 1236, the lists or sets of tokens representing each name are rotated (e.g., last element becomes the first element, etc.) until the full words generated at 1234 appear in the same order in both names.

At 1238, the tokens that are found in the "gaps" between the full words are compared, on a gap-by-gap basis. The comparison is performed according to various criteria, such as the following:

If both gaps contain tokens, the tokens must match exactly if they consist of more than one letter. In some embodiments, if one of the tokens is a single letter, its corresponding token in the other name must start with the same letter. This, for example, is assumed to be a first or middle initial.

If one gap contains tokens but one does not, it is considered a match. This accounts for the possibility of one name containing middle names and initials while the other does not.

In some embodiments, every possible rotation of the names is checked until a match is found. For example, if a match is found at 1240, the names are immediately considered a match, and no more rotations are compared. If, at 1240, the names are not determined to be a match, then the process continues to 1242, where it is determined whether there are any more possible rotations of the names that can be performed. If there are no more possible rotations that can be performed, then the process ends. If there are still more possible rotations, then the process returns to 1236, where the lists of tokens representing each name are rotated again until full words (previously generated at 1234) appear in the same order in both names.

In some embodiments, the person name matching steps of process 1230 are performed according to person name matching rules specified in a metadata ruleset such as metadata ruleset 428 of FIG. 4.

Example Name Match

Figure 13:
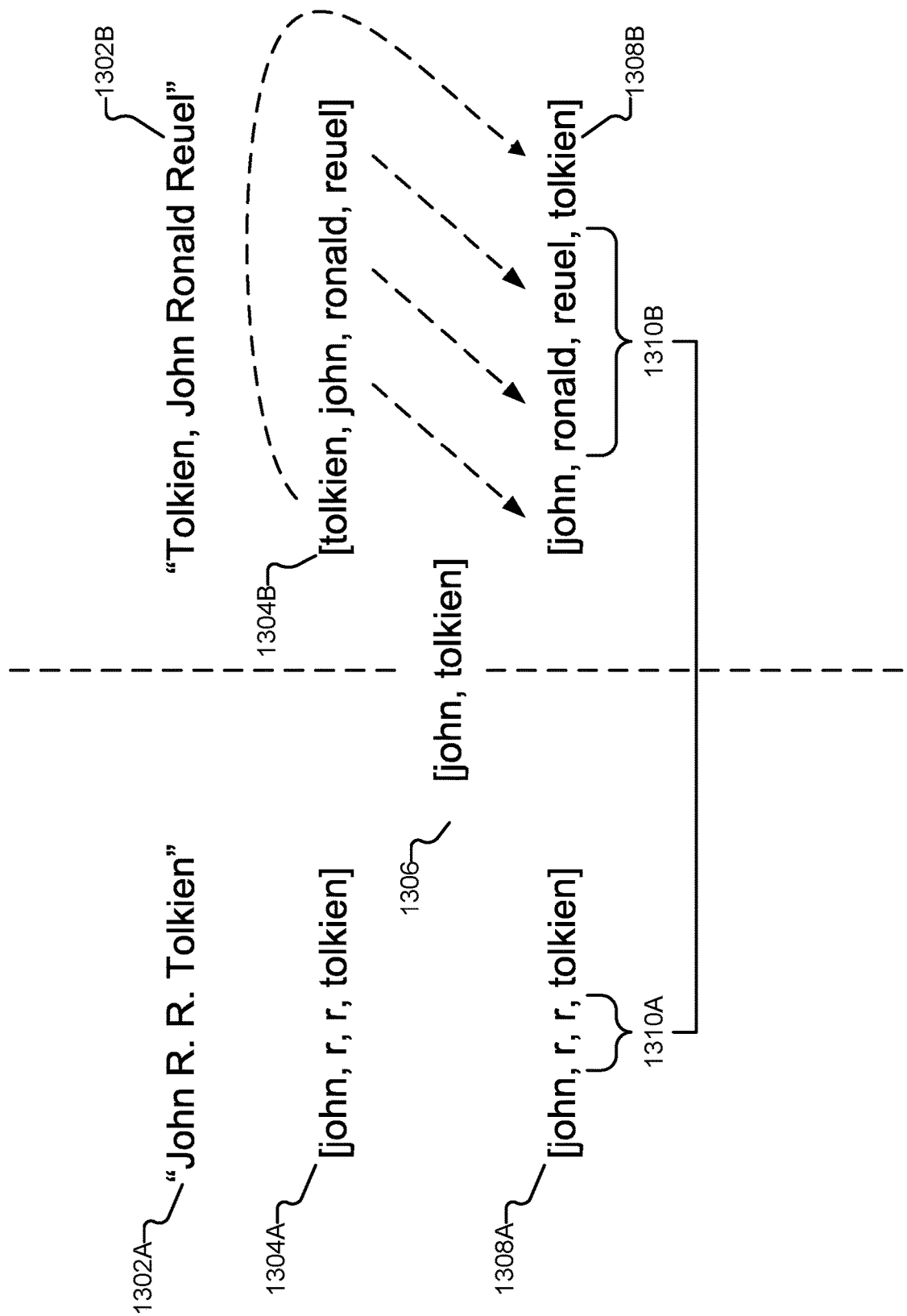
FIG. 13 illustrates an example embodiment of performing a person name match.

The following is an example of normalizing and matching a person's name. In this example, permutations of the name "J. R. R. Tolkien" will be tokenized and compared with each other. The below example is also illustrated in FIG. 13.

The following are two example representations of the name "J. R. R. Tolkien":

(1) "John R. R. Tolkien" (shown at 1302A)

(2) "Tolkien, John Ronald Reuel" (shown at 1302B)

Names (1) and (2) are tokenized, into two respective sets of tokens, for example, using process 1100 of FIG. 11 (e.g., commas and periods removed, all characters made lowercase, tagging of keywords performed). In some embodiments, a set of tokens is represented as an array. The resulting token sets are shown below.

(1) "John R. R. Tolkien" is tokenized into the first array of tokens [john, r, r, tolkien] (1304A)

(2) "Tolkien, John Ronald Reuel" is tokenized into the second array of tokens [tolkien, john, ronald, reuel] (1304B)

Name matching is then performed using the two tokenized sets. For example, process 1230 of FIG. 12B is used to perform name matching. In this example, a list of all of the full words that are longer than one letter or character that are common to both names is obtained. In this example, this includes the set [john, tolkien] (1306).

The two token sets are then rearranged so that the identified common words are in the same order in both token sets. For example:

(1) the first array of tokens [john, r, r, tolkien] (1304A) is kept at [john, r, r, tolkien] (1308A).

(2) the second array of tokens [tolkien, john, ronald, reuel] (1304B) is rotated until the tokens "john" and "tolkien" are in the same position as the first array, resulting in the rotated second array of tokens [john, ronald, reuel, tolkien] (1308B).

The tokens or elements in the two token sets/arrays that are not common words are then compared. The portions of the two arrays in between the common words that are not the same are then evaluated.

For example, [r; r] (1310A) of the first array of tokens is compared with [ronald; reuel] (1310B) of the rotated second array of tokens. In this example, because the uncommon portions of the array occur between the two common words, they are treated as representations of middle names, which are often abbreviated. In this example, it is determined whether the letters in [r; r] match to the first letters of the tokens in the same position in the other array [ronald; reuel]. In this example, the letters in the first array match to the first letters in the words of the second array in the corresponding positions.

In this example, all common words (i.e., that have more than one character) must match. A name matching rule has been specified where, while two elements can match if one element is a single letter (not a word) that matches to the first letter of the other element (if it is a word with more than one character), if both elements in the same corresponding position are longer than a single character, then they must both match exactly.

Thus, a match is determined between the names "John R. R. Tolkien" and "Tolkien, John Ronald Reuel." The match is a fuzzy match, because the two names are not exactly the same, but have nonetheless been determined to be a match using the processing described above.

In the above example, the array [tolkien; john; ronald; reuel] is rotated until it becomes the array [john; ronald; reuel; tolkien], where "john" and "tolkien" are in the same order is in the other token set [john; r; r; tolkien] (the other array could have been rotated instead to produce the same ordering). In some embodiments, if it is not possible for the identified common words in two token sets to be ordered in the same manner, then the two names are determined to be a mismatch (i.e., not a match).

As shown above, normalization and matching rules can be designed to accommodate scenarios in which surnames are placed before given names, which can be accounted for even if commas are not placed to delineate between the surnames and given names.

In some embodiments, matching of names in various languages can also be supported, with the techniques described herein adapted accordingly. For example, a rule for Chinese names can take into account that surnames are commonly placed before given names. As another example, some doctors may provide their name to platform 102 where their last name is fully spelled out but only the initial of their first name is provided, while on a profile page on a source, their first name is fully spelled out.

Additional Example Name Match

As another example of name matching, the names of doctors and other people can be matched using a process such as process 1230 of FIG. 12B that can handle variations in the order of the name, middle initials, and hyphenated surnames. In some embodiments, professional titles are not considered part of the name for matching purposes. The following example names are all considered a match:

"Dr. Kirsten Kaiser Duncan"
"Dr. Kirsten M Kaiser Duncan"
"Dr. Kirsten Kaiser-Duncan"
"Dr. Kirsten M Kaiser-Duncan"
"Kirsten Kaiser Duncan MD"
"Kirsten M Kaiser Duncan MD"
"Kirsten Kaiser-Duncan MD"
"Kirsten M Kaiser-Duncan MD"
"Kaiser Duncan, Kirsten MD"
"Kaiser Duncan, Kirsten M MD"
"Kaiser-Duncan, Kirsten MD"
"Kaiser-Duncan, Kirsten M MD"

General Name Match

Figure 12C:
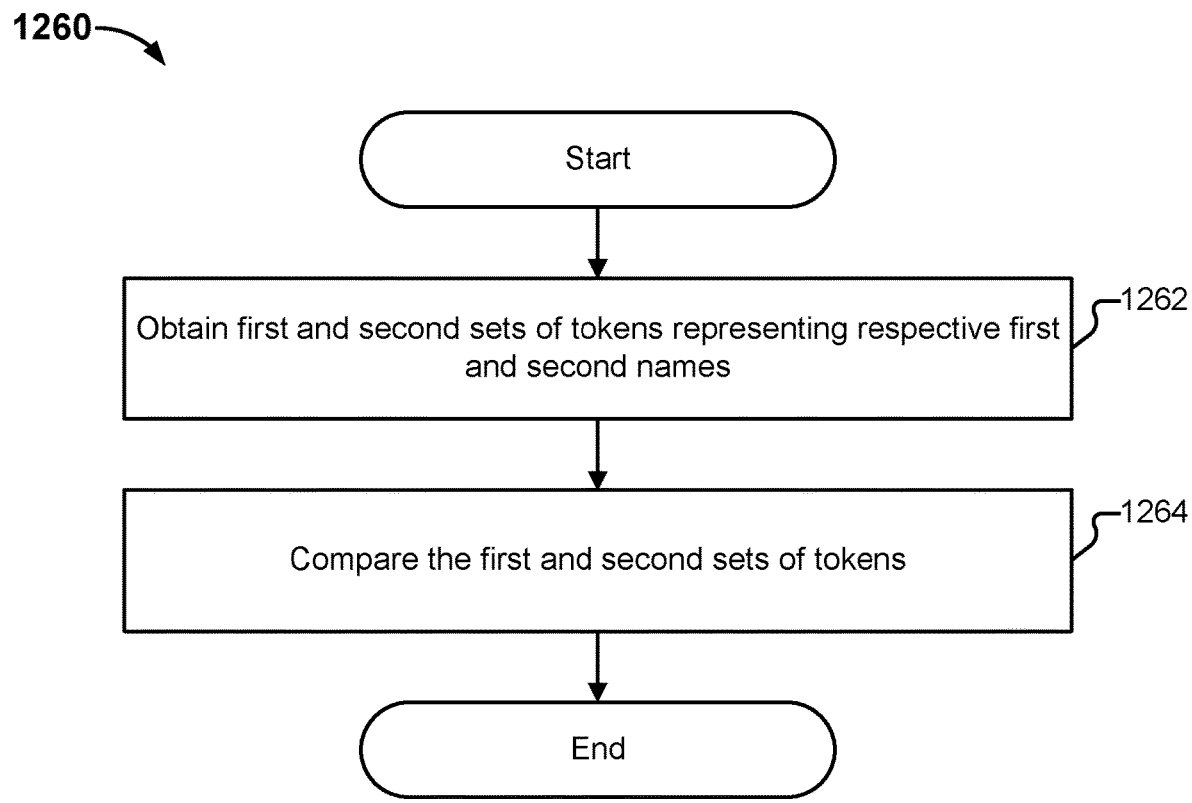
FIG. 12C is a flow diagram illustrating an embodiment of a process for general name matching.

FIG. 12C is a flow diagram illustrating an embodiment of a process for general name matching. In some embodiments, process 1260 is executed by platform 102 of FIG. 1, FIG. 2, and FIG. 4. In some embodiments, process 1260 is used to implement step 1210 of process 1200 of FIG. 12A. The process begins at 1262 when first and second sets of tokens representing respective first and second names are obtained. The names can include general names, such as names of individuals, businesses, etc. In some embodiments, the sets of tokens obtained at 1262 are generated using process 1100 of FIG. 11.

At 1264, the first and second sets of tokens are compared. In some embodiments, the tokens which are not keywords must be found in both names in the same order. The tokens which are tagged as KEYWORD (e.g., at 1108 of process 1100 of FIG. 11) can be compared, for example, in two ways, depending on how the keywords have been defined in the ruleset. In some embodiments, some keywords are designated or treated as "critical" and others as "normal." In some embodiments, at least one of the "critical" keywords must be found in both names. For example, suppose that the auto brands "Acme Motors," "Beta Cars," and "Foxtrot Vehicles" have been tagged as keywords that have also been designated as being critical keywords. Suppose also that the names "Jasons Vale Acme Motors Foxtrot Vehicles" and "Jasons Vale Acme Motors Beta Cars" are being compared.

"Jasons Vale Acme Motors Foxtrot Vehicles" would be tokenized (e.g., using process 1100 of FIG. 11) into the set of tokens [jasons vale acme motors foxtrot vehicles], where acme motors and foxtrot vehicles are tagged as KEYWORDS.

"Jasons Vale Acme Motors Beta Cars" would be tokenized (e.g., using process 1100 of FIG. 11) into the set of tokens [jasons vale acme motors beta cars], where acme motors and beta cars are tagged as KEYWORDs.

Suppose for example, that rule(s) for matching auto dealerships (e.g., industry-specific matching rules established in metadata ruleset 428 of FIG. 4) specify that two dealerships (that may be multi-brand, as in the example above) are determined to be the same if the two names have at least one car brand (tagged as a keyword) in common (where the common car brand is determined using keyword mappings of equivalents), where the tokens that are not keywords must match.

Based on these rules, the names "Jasons Vale Acme Motors Foxtrot Vehicles" and "Jasons Vale Acme Motors Beta Cars" would match, because they have the critical keyword [acme motors] in common, and the tokens that are not keywords [jasons vale] match.

Names such as "Jasons Vale Acme Motors" and "Jasons Vale Beta Cars" would not match, however, because there is no match of critical keywords (or tokens tagged as KEYWORD s).

In some embodiments, the "normal" keywords are matched less strictly. For example, in some embodiments, if one name contains "normal" keywords and the other does not, the names are considered a match. An example would be rental car companies, whose names often contain variants of "rent-a-car", "car rental", "rental cars," etc. Sometimes only the name of the business is provided. In order for these variants to match, a "normal" keyword is defined. Therefore, "Bob's Car Rental", "Bob's Rent-A-Car", and "Bob's" would all match, even though the keyword is not present in all of the names.

In some embodiments, if both names contain "normal" keywords, at least one of the keywords must be found in both names.

In the above example, normalizer rules for a particular industry, car dealerships, were described. Rules can be added for any other industry as appropriate. As new industries are added, new normalization and matching rules for those industries can be added as well. In various embodiments, new name matching rules can be added (e.g., to metadata ruleset 428 of FIG. 4) either manually or automatically. As one example, new normalization and matching rules can be added based on natural language processing and machine learning. New normalizing and matching rules can be tested and tuned to improve name matching. For example, new normalizing and matching rules can be used to identify strings or keywords that are equivalent to each other (e.g., to build a list of keywords and their equivalents).

Example Normalizer Keywords

The following are examples of normalizer keywords such as those used to tag tokens at 1108 of process 1100 of FIG. 11. Shown below are normalizer keywords for example auto brand names and words (or groups of words) that are represented multiple ways and have multiple equivalents:

"okara"
"owdi"
"alv"
"curvedly"
"newick"
"madillacc"
"trevrolet", "trevy"
"trysler"
"podge"
"herrari"
"miat"
"acme motors"
"flb"
"londa"
"myundai"
"infinitus"
"ocelot"
"willy"
"qia"
"terra *firma* traverser"
"plexus"
"foxtrot vehicles"
"bosserati"
"my-bach"
"frazda"
"mondaro frenz", "mondaro-frenz", "mondaro"
"storage", "mini storage", "mini-storage", "self storage", "self-storage"
"mini"
"mini mart", "mini market", "mini-mart", "mini-market", "market", "mart"
"ritzubishi"
"frissan"
"mor-sha"
"pram"
"dolls joyce", "dolls Joyce"
"tyonn"
"smrt"
"moobaru"
"tezuki"
"edison"
"toyoba"
"wagon people"
"volov"
"apartment", "apartments", "apt", "apts", "villas", "luxury apartments", "luxury villas"
"real estate", "realtors", "realtor", "realty", "realty group", "properties"
"dentistry", "dental", "dental group", "dental care", "dental practice", "dental surgery", "dental surgeons", "dental center", "dental centre", "dental clinic", "dental health", "dental spa"

The following are example usages of the normalizer keywords such as those described above to perform name matching (e.g., using process 1200 of FIG. 12A):

"Jasons Vale Mondaro" and "Jasons Vale Mondaro-Frenz" are equivalent because "Mondaro" and "Mondaro-Frenz" are part of the same keyword, and therefore equivalent.

"Jasons Vale Acme Motors Foxtrot Vehicles" and "Jasons Vale Acme Motors" are equivalent because "Acme Motors" and "Foxtrot Vehicles" are both keywords, and both names have one keyword in common: "Acme Motors."

"Las Vegas Mini" and "Las Vegas Mini Mart" are NOT equivalent, because "Mini" and "Mini Mart" are different keywords, and the platform 102 can use the keyword mapping to determine that they are not the same.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      periodically access a link associated with a profile of an entity and obtain reputation data associated with the profile that is associated with the link;
      detect a threshold number of failures in accessing the link associated with the profile of the entity; and
      in response to detecting the threshold number of failures in accessing the link associated with the profile of the entity, fix the link at least in part by determining a replacement link, wherein determining the replacement link comprises:
         obtaining reference location data for location attributes of the entity; and
         performing a search for a corresponding profile of the entity on a source using at least some of the obtained reference location data, wherein the replacement link is determined based at least in part on the search; and
   a memory coupled to the one or more processors and configured to provide the one or more processors with instructions.

2. The system recited in claim 1, wherein the one or more processors are further configured to determine a cause of a failure in accessing the link.

3. The system recited in claim 2, wherein the one or more processors are configured to determine that the cause of the failure in accessing the link is a source associated with the link having gone down.

4. The system recited in claim 2, wherein the one or more processors are configured to determine that the cause of the failure in accessing the link is the link having been modified by, or removed from, a source.

5. The system recited in claim 2, wherein the one or more processors are configured to determine whether the cause of the failure is a recoverable error or a non-recoverable error.

6. The system recited in claim 1, wherein the one or more processors are configured to:
- determine, at least in part by performing a query, a plurality of entities associated with the link; and
- for each entity in the plurality of entities, perform a search for a corresponding profile of a given entity using reference location data associated with the given entity.

7. The system recited in claim 1, wherein the one or more processors are configured to:
- add the link to a blacklist, wherein the blacklist is associated with a corresponding identifier of the entity;
- in a subsequent search, receive the link as a result of the subsequent search; and
- based at least in part on the link having been added to the blacklist, prevent the link from being further accessed.

8. A method, comprising:
- periodically accessing a link associated with a profile of an entity and obtaining reputation data associated with the profile that is associated with the link;
- detecting a threshold number of failures in accessing the link associated with the profile of the entity; and
- in response to detecting the threshold number of failures in accessing the link associated with the profile of the entity, fixing the link at least in part by determining a replacement link, wherein determining the replacement link comprises:
  - obtaining reference location data for location attributes of the entity; and
  - performing a search for a corresponding profile of the entity on a source using at least some of the obtained reference location data, wherein the replacement link is determined based at least in part on the search.

9. The method of claim 8, further comprising determining a cause of a failure in accessing the link.

10. The method of claim 9, further comprising determining that the cause of the failure in accessing the link is a source associated with the link having gone down.

11. The method of claim 9, further comprising determining that the cause of the failure in accessing the link is the link having been modified by, or removed from, a source.

12. The method of claim 9, further comprising determining whether the cause of the failure is a recoverable error or a non-recoverable error.

13. The method of claim 8, further comprising:
- determining, at least in part by performing a query, a plurality of entities associated with the link; and
- for each entity in the plurality of entities, performing a search for a corresponding profile of a given entity using reference location data associated with the given entity.

14. The method of claim 8, further comprising:
- adding the link to a blacklist, wherein the blacklist is associated with a corresponding identifier of the entity;
- in a subsequent search, receiving the link as a result of the subsequent search; and
- based at least in part on the link having been added to the blacklist, preventing the link from being further accessed.

15. A computer program product embodied in a non-transitory computer readable storage medium and comprising computer instructions for:
- periodically accessing a link associated with a profile of an entity and obtaining reputation data associated with the profile that is associated with the link;
- detecting a threshold number of failures in accessing the link associated with the profile of the entity; and
- in response to detecting the threshold number of failures in accessing the link associated with the profile of the entity, fixing the link at least in part by determining a replacement link, wherein determining the replacement link comprises:
  - obtaining reference location data for location attributes of the entity; and
  - performing a search for a corresponding profile of the entity on a source using at least some of the obtained reference location data, wherein the replacement link is determined based at least in part on the search.

\* \* \* \* \*